May 17, 1966 N. A. BOLTON 3,252,132

SUPERVISORY TRAFFIC CONTROL SYSTEM

Filed Dec. 3, 1962 39 Sheets-Sheet 1

INVENTOR.
N. A. BOLTON
BY [signature]
HIS ATTORNEY

May 17, 1966 N. A. BOLTON 3,252,132

SUPERVISORY TRAFFIC CONTROL SYSTEM

Filed Dec. 3, 1962 39 Sheets-Sheet 2

INVENTOR.
N.A. BOLTON
BY Forest B. Hitchcock
HIS ATTORNEY

INVENTOR.
N. A. BOLTON
BY Forest B. Hitchcock
HIS ATTORNEY

FIG. 5

| ZONE | TYPE OF SWITCHER | LOCATION DESIGNATION | SIGN FUNCTIONS | | | | | | | | | | |
|---|---|---|---|---|---|---|---|---|---|---|---|---|---|
| | | | SF1 | SF2 | SF3 | SF4 | SF5 | SF6 | SF7 | SF8 | SF9 | SF10 | SF11 |
| NBZ1 | S-L | NBL1 | X | | X | X | X | X | X | X | X | | X |
| NBZ2 | S-R | NBL2 | X | X | X | X | X | | | | | | X |
| | S-L | NBL3 | X | | X | X | X | X | X | X | X | | X |
| NBZ3 | R | NBL4 | X | X | | | | | | | | | |
| | S-R | NBL5 | X | | X | X | X | | | | | | X |
| | S-L | NBL6 | X | | X | X | X | X | X | X | X | X | X |
| NBZ4 | S-L | NBL7 | X | | X | X | X | X | X | X | X | | X |
| NBZ5 | S-R | NBL8 | X | X | X | X | X | | | | | | X |
| | S-R | NBL9 | X | | X | X | X | | | | | | X |
| | S-L | NBL10 | X | | X | X | X | X | X | X | X | | X |
| NBZ6 | R | NBL11 | X | X | | | | | | | | | |
| | S-R | NBL12 | X | | X | X | X | | | | | | X |
| | S-L | NBL13 | X | | X | X | X | X | X | X | X | | X |
| SBZ1 | S-R | SBL1 | X | X | X | X | X | | | | | | X |
| | S-L | SBL2 | X | | X | X | X | X | X | X | X | | X |
| SBZ2 | S-R | SBL3 | X | X | X | X | X | | | | | | X |
| | S-R | SBL4 | X | | X | X | X | | | | | | X |
| | S-L | SBL5 | X | | X | X | X | X | X | X | X | | X |
| SBZ3 | R | SBL6 | X | X | | | | | | | | | |
| | S-R | SBL7 | X | | X | X | X | | | | | | X |
| | S-L | SBL8 | X | | | | | X | X | X | X | | |
| SBZ4 | S-R | SBL9 | X | X | X | X | X | | | | | | X |
| | S-L | SBL10 | X | | X | X | X | X | X | X | X | X | X |
| SBZ5 | S-L | SBL11 | X | | X | X | X | X | X | X | X | | X |
| | S-R | SBL12 | X | | X | X | X | | | | | | X |
| | R | SBL13 | X | X | | | | | | | | | |

LEGEND:-
S-L= SPEED-LANE
S-R= SPEED-RAMP
R = RAMP

X= PRESENT AT LOCATION

FIG. 4

| POLAR CODE ASSIGNMENT | SIGN FUNCTIONS | | | | | | | | | | |
|---|---|---|---|---|---|---|---|---|---|---|---|
| | SF1 SIGN POWER | SF2 ON RAMP | SF3 25 | SF4 40 | SF5 55 | SF6 LANE 1 | SF7 LANE 2 | SF8 LANE 3 | SF9 LANE 4 | SF10 LANE 5 | SF11 SPEED SIGN |
| (+) ON CONTROL | ON | OPEN | ON | ON | ON | ↑ | ↑ | ↑ | ↑ | ↗ | ON |
| (−) OFF CONTROL | OFF | CLOSE | OFF | OFF | OFF | X | X | X | X | X | OFF |

INVENTOR.
N. A. BOLTON
BY Forest B. Hitchcock
HIS ATTORNEY

SUPERVISORY TRAFFIC CONTROL SYSTEM

Filed Dec. 3, 1962 39 Sheets-Sheet 5

INVENTOR.
N. A. BOLTON
BY
Forest B. Hitchcock
HIS ATTORNEY

INVENTOR.
N.A. BOLTON
BY
HIS ATTORNEY

INVENTOR.
N. A. BOLTON
BY Forest B. Hitchcock
HIS ATTORNEY

INVENTOR.
N. A. BOLTON
BY
Forest B. Hitchcock
HIS ATTORNEY

INVENTOR.
N. A. BOLTON
BY
Forest B. Hitchcock
HIS ATTORNEY

May 17, 1966 N. A. BOLTON 3,252,132

SUPERVISORY TRAFFIC CONTROL SYSTEM

Filed Dec. 3, 1962 39 Sheets-Sheet 10

INVENTOR.
N. A. BOLTON
BY
[signature]
HIS ATTORNEY

INVENTOR.
N. A. BOLTON
BY Forest B. Hitchcock
HIS ATTORNEY

May 17, 1966 N. A. BOLTON 3,252,132

SUPERVISORY TRAFFIC CONTROL SYSTEM

Filed Dec. 3, 1962 39 Sheets-Sheet 12

INVENTOR.
N.A.BOLTON
BY
Forest B. Hitchcock
HIS ATTORNEY

INVENTOR.
N.A. BOLTON
BY
Forest B. Hitchcock
HIS ATTORNEY

SUPERVISORY TRAFFIC CONTROL SYSTEM

Filed Dec. 3, 1962 39 Sheets-Sheet 14

INVENTOR.
N.A.BOLTON
BY
Forest B. Hitchcock
HIS ATTORNEY

May 17, 1966 N. A. BOLTON 3,252,132

SUPERVISORY TRAFFIC CONTROL SYSTEM

Filed Dec. 3, 1962 39 Sheets-Sheet 15

INVENTOR.
N. A. BOLTON
BY Forest B. Hitchcock
HIS ATTORNEY

May 17, 1966 N. A. BOLTON 3,252,132

SUPERVISORY TRAFFIC CONTROL SYSTEM

Filed Dec. 3, 1962 39 Sheets-Sheet 16

INVENTOR.
N.A. BOLTON

BY Forest B. Hitchcock

HIS ATTORNEY

INVENTOR.
N.A.BOLTON
BY
*Forest B. Hitchcock*
HIS ATTORNEY

INVENTOR.
N. A. BOLTON
BY Forest B. Whitlock
HIS ATTORNEY

SUPERVISORY TRAFFIC CONTROL SYSTEM

Filed Dec. 3, 1962 39 Sheets-Sheet 19

INVENTOR.
N. A. BOLTON
BY [signature]
HIS ATTORNEY

SUPERVISORY TRAFFIC CONTROL SYSTEM

Filed Dec. 3, 1962

INVENTOR.
N. A. BOLTON
BY
Forest B. Hitchcock
HIS ATTORNEY

INVENTOR.
N. A. BOLTON
BY
Forest B. Whitlock
HIS ATTORNEY

SUPERVISORY TRAFFIC CONTROL SYSTEM

Filed Dec. 3, 1962

INVENTOR.
N. A. BOLTON

BY Forest B. Hitchcock

HIS ATTORNEY

SUPERVISORY TRAFFIC CONTROL SYSTEM

Filed Dec. 3, 1962 39 Sheets-Sheet 23

INVENTOR.
N. A. BOLTON
BY [signature]
HIS ATTORNEY

SUPERVISORY TRAFFIC CONTROL SYSTEM

Filed Dec. 3, 1962 39 Sheets-Sheet 24

INVENTOR.
N. A. BOLTON
BY
Forest B. Hitchcock
HIS ATTORNEY

SUPERVISORY TRAFFIC CONTROL SYSTEM

Filed Dec. 3, 1962

INVENTOR.
N.A. BOLTON
BY [signature]
HIS ATTORNEY

INVENTOR.
N. A. BOLTON
BY Forest B. Hitchcock
HIS ATTORNEY

INVENTOR.
N. A. BOLTON
BY Forest W. Hitchcock
HIS ATTORNEY

SUPERVISORY TRAFFIC CONTROL SYSTEM

Filed Dec. 3, 1962 39 Sheets-Sheet 28

INVENTOR.
N. A. BOLTON
BY Forest B. Hitchcock
HIS ATTORNEY

INVENTOR.
N.A. BOLTON
BY Forest B. Hitchcock
HIS ATTORNEY

INVENTOR.
N.A. BOLTON
BY Forest B. Hitchcock
HIS ATTORNEY

May 17, 1966 N. A. BOLTON 3,252,132

SUPERVISORY TRAFFIC CONTROL SYSTEM

Filed Dec. 3, 1962 39 Sheets-Sheet 31

INVENTOR.
N. A. BOLTON

BY Forest B. Hitchcock

HIS ATTORNEY

INVENTOR.
N. A. BOLTON
BY Forest B. Hitchcock
HIS ATTORNEY

INVENTOR.
N. A. BOLTON
BY Forest B. Hitchcock
HIS ATTORNEY

INVENTOR.
N.A.BOLTON
BY Forest B. Whitlock
HIS ATTORNEY

May 17, 1966 N. A. BOLTON 3,252,132

SUPERVISORY TRAFFIC CONTROL SYSTEM

Filed Dec. 3, 1962 39 Sheets-Sheet 35

INVENTOR.

N. A. BOLTON

BY [signature]

HIS ATTORNEY

INVENTOR.
N. A. BOLTON
BY Forest B. Hitchcock
HIS ATTORNEY

INVENTOR.
N. A. BOLTON
BY
Forest B. Hitchcock
HIS ATTORNEY

| | | | | | | | | |
|---|---|---|---|---|---|---|---|---|
| | | FIG.6G | FIG.6K | FIG.6O | FIG.6S | FIG.6W | FIG.6AA | FIG.6EE |
| FIG.6A | FIG.6D | FIG.6H | FIG.6L | FIG.6P | FIG.6T | FIG.6X | FIG.6BB | FIG.6FF |
| FIG.6B | FIG.6E | FIG.6I | FIG.6M | FIG.6Q | FIG.6U | FIG.6Y | FIG.6CC | FIG.6GG |
| FIG.6C | FIG.6F | FIG.6J | FIG.6N | FIG.6R | FIG.6V | FIG.6Z | FIG.6DD | FIG.6HH |

INVENTOR.
N. A. BOLTON
BY Forest B. Hitchcock
HIS ATTORNEY

INVENTOR.
N. A. BOLTON
BY Forest B. Hitchcock
HIS ATTORNEY

United States Patent Office 3,252,132
Patented May 17, 1966

3,252,132

SUPERVISORY TRAFFIC CONTROL SYSTEM

Norman A. Bolton, Scottsville, N.Y., assignor to General Signal Corporation

Filed Dec. 3, 1962, Ser. No. 241,927
1 Claim. (Cl. 340—31)

This invention relates to a supervisory traffic control system, and, more particularly, pertains to such a system for directing the flow of vehicular traffic on highways according to observed conditions affecting traffic flow thereon.

One of the purposes of a complex multi-lane highway system is to provide a way for an expected maximum volume of traffic. Certain conditions irregularly occur, however, which produce periods of traffic congestion thus limiting substantially the maximum volume of traffic that a given multi-lane highway system can reasonably handle for such periods. Such conditions include the many weather factors which, singly and in combination, affect the maximum safe speed at which vehicles can safely move over the highway as well as other unpredictable occurrences, each acting to slow or impede traffic flow. The many weather factors affecting the maximum safe speed of vehicles may include the visibility, the adhesion of the highway surface, the illumination of the highway, etc., while such unpredictable occurrences in a given section of highway may include the number of vehicles present, the respective speeds of slow moving vehicles, the presence of a vehicle stopped within a traffic lane thereof due to mechanical difficulties or its involvement in an accident, etc.

To achieve the expected maximum volume of traffic on a multi-lane highway in spite of such conditions, it has been proposed to use traffic directing signs in the form of variable speed signs and lane signs suitably positioned respectively along such highway and relative to traffic lanes for given sections thereof to direct the flow of traffic according to the operation of positioned sensing and measuring apparatus caused by variations in the above-noted conditions. More particularly, it has been proposed to use sensing and measuring apparatus positioned at selected points along a given highway for measuring the variations in the different weather factors which tend to affect the maximum safe speed of vehicles travelling thereon and, accordingly, controlling variable speed signs positioned along the highway to display the existing maximum safe period. Moreover, it has been further proposed to use a lane sign for each lane in a multi-lane highway system in combination with sensing devices suitably positioned at points along the highway for determining traffic conditions thereat which are interrelated so as to direct vehicles into the proper lane. In each instance, however, the traffic directing sign employed is controlled in response to interrelated conditions measured by one or more sensing devices positioned at points along one specific section of a given length of highway.

Although the past attempts when used to regulate traffic flow on a multi-lane highway have not been entirely unsuccessful, it remains that sensing and measuring apparatus as positioned at selected points provides indications of variable conditions only in the immediate vicinity thereof or, in other words, serves to provide a "spot check" of an area or highway section. Inasmuch as such conditions oftentimes vary considerably throughout a given section of highway, such "spot checking" thereof may be instrumental in causing control of one or more traffic directing signs to a condition wherein traffic volume is unnecessarily limited within the entire highway section. Moreover, the fact that control of all traffic directing signs in one section is suggested to be entirely independent of control of traffic directing signs positioned relative to other adjacent sections, all comprising a given length of highway, acts at times to further unnecessarily limit traffic volume.

It is proposed in the present invention to provide a supervisory traffic control system including traffic directing signs positioned relative to highway sections comprising a given length of highway and controlled according to variable conditions observed throughout such length of highway in a manner to overcome the above noted limitations. More particularly, it is proposed to provide a system wherein supervisory control is effected from a remote location to selectively control each of a plurality of traffic directing signs positioned relative to highway sections comprising a given length of highway in response to variable conditions observed throughout such length of highway.

Different methods by which substantially complete observation or surveillance of a given length of highway can be achieved have been suggested. One method is to place observers in strategic points such as in a helicopter or a scout car in order that each entire section of the sections comprising a length of highway can be observed. Another method is to employ a closed circuit television system wherein television cameras are suitably positioned at different locations along the highway so that all sections of the given length of highway are scanned. The information thus conveyed as to the existence of all variable conditions for the entire length of highway may be utilized in effecting control of traffic directing signs accordingly to thus maintain possible traffic volume throughout the given length of highway at all times.

It is suggested that the method of television surveillance be employed herein to provide the necessary information by which an operator can fully utilize the system of this invention and thus direct traffic flow along a given length of highway. More particularly, it is suggested that television cameras be positioned at selected points along the given length of highway so that one or more television cameras can scan traffic flowing in opposite directions for a particular section of the given length of highway. An operator observing television monitors corresponding thereto then has a comprehensive view of the complete length of highway so that he may initiate corrective actions in response to any variations in the above-mentioned conditions in any highway section thereof suggesting a slow-up or halting of traffic flow.

According to the embodiment disclosed herein, a section of highway includes one or more locations for each direction of vehicular flow, while each location is comprised of one or more traffic directing signs suitably positioned thereat. For each direction of vehicular flow, one or more adjacent locations as selected comprise a "zone," the number of "zones" in one direction of vehicular flow being variable with respect to the number of "zones" in the opposite direction of vehicular flow, all in combination for both flow directions defining a given length of highway. Traffic directing signs positioned at the various locations and within particular "zones" for both directions of vehicular flow are controlled distinctively by the novel system of this invention to provide traffic directing information in the form of function aspect displays to maintain a maximum permissible traffic volume throughout the given length of highway.

Generally speaking, and without attempting to define the exact nature or scope of this invention, it is proposed to provide a system wherein selection is made of one or more zones each of which includes one or more locations whereat at least one traffic directing sign is located and of one or more functions, such selections being effective to establish a particular operation of the system when it is activated for controlling affected traffic directing signs to display corresponding aspects. Accordingly, it is proposed that the system of this invention be operative to remotely control a traffic directing sign at a location comprising a zone to display a selected aspect where an automatic correspondence check is made between that aspect displayed and the function selected. It is further proposed that the system of the invention be operative to remotely control at least one traffic directing sign at each of several locations comprising a zone where such signs are similar or different to display given aspects. It is further proposed that the system of this invention be operative to remotely control at least two traffic directing signs at a single location with a zone where the signs are similar or different to display given aspects. It is still further proposed that the system of this invention be operative to remotely control at each of several locations within a zone at least two traffic directing signs where such signs are similar or different to display given aspects. It is further proposed that the system of this invention be operative to remotely control at least one traffic directing sign for at least one location in each of several zones where such signs for all zones selected are controlled in a predetermined sequence. It is a further purpose that the system of this invention be operative to provide a correspondence check between the last function selected for each traffic directing sign as compared to that aspect displayed thereby with such operation being effected ether automatically or manually and a warning indication being given where at least one out-of-correspondence condition is detected.

It follows that the time elapsing after observation of a variable condition requiring corrective action and until such corrective action is completed must be a minimum so as to maintain maximum possible traffic flow over a given highway. To limit such elapsed time to a minimum, the novel control system herein employs two modes of operation, each being dependent upon a distinctive designation made by an operator. In a first mode of operation responsive to selection of a zone having one or more locations and to selection of a plurality of functions at each location, the system is halted for each selected location in a predetermined sequence whereat control energy for each of the plurality of selected functions is transmitted to corresponding signs in a given sequence. In the second mode of operation responsive to selection of a plurality of zones and to selection of one or more functions, the system is halted for each selected function in a predetermined sequence wherat control energy for that function is transmitted to the selected locations in a given sequence for controlling corresponding signs. The first mode of operation will be hereinafter referred to as a location-function mode, while the second mode of operation will be hereinafter referred to as a function-location mode.

Thus, one object of this invention is to provide a system to control traffic directing signs positioned relative to a multi-lane highway in response to variable conditions observed to constantly maintain thereon a maximum permissible volume of traffic.

Another object of this invention is to provide a system for controlling a traffic directing sign positioned at a location comprising a zone of a multi-lane highway for directing traffic flow in such zone according to observed variable conditions affecting traffic flow therein.

Another object of this invention is to provide a system for controlling a traffic directing sign at each of several locations comprising a zone of a multi-lane highway where such signs display similar or different aspects for directing traffic flow therein according to observed conditions.

Another object of this invention is to provide a system for controlling at least two traffic directing signs assigned to one location within a zone of a multi-lane highway to display similar or different aspects for directing the flow of vehicular traffic in proximity to that location.

Another object of this invention is to provide a system for controlling at least one traffic directing sign in each of a plurality of locations where each location is assigned to a different zone of a multi-lane highway with similar and different signs being controlled to display given aspects for directing vehicular traffic flow in such zones according to observed variable conditions affecting traffic flow therein.

Another object of this invention is to provide a system having an identifying display indicator for each traffic directing sign positioned relative to a multi-lane highway for indicating a condition of correspondence therebetween where control of the system is initiated automatically or manually and a warning is given where at least one out-of-correspondence condition is detected.

Other objects, purposes and characteristic features of the present invention will be in part obvious from the accompanying drawings, and in part pointed out as the description of the invention progresses.

For the purpose of simplifying the illustrations and facilitating in the explanation, the various parts and circuits constituting the embodiment of the invention have been shown diagrammatically and certain conventional illustrations have been employed, the drawings having been made more with the purpose of making it easy to understand the principles and mode of operation rather than with the idea of illustrating the specific construction and arrangement of parts that would be employed in practice. Thus, the various relays and their contacts are illustrated in a conventional manner, and the symbols (+) and (−) are used to indicate connections to the terminals of batteries, or other sources of electric current, instead of showing all of the wiring connections to these terminals with ground being used to indicate an intermediate terminal.

In describing the invention in detail, reference will be made to the accompanying drawings in which like reference characters designate corresponding parts throughout the several views, and in which:

FIG. 4 is a chart showing the control energy code assignment for the sign control functions relative to control and indication;

FIG. 5 is a chart showing the number of locations assigned to each zone and sign control functions employed with such locations for all zones defining the length of multi-lane highway;

Figure 6A:
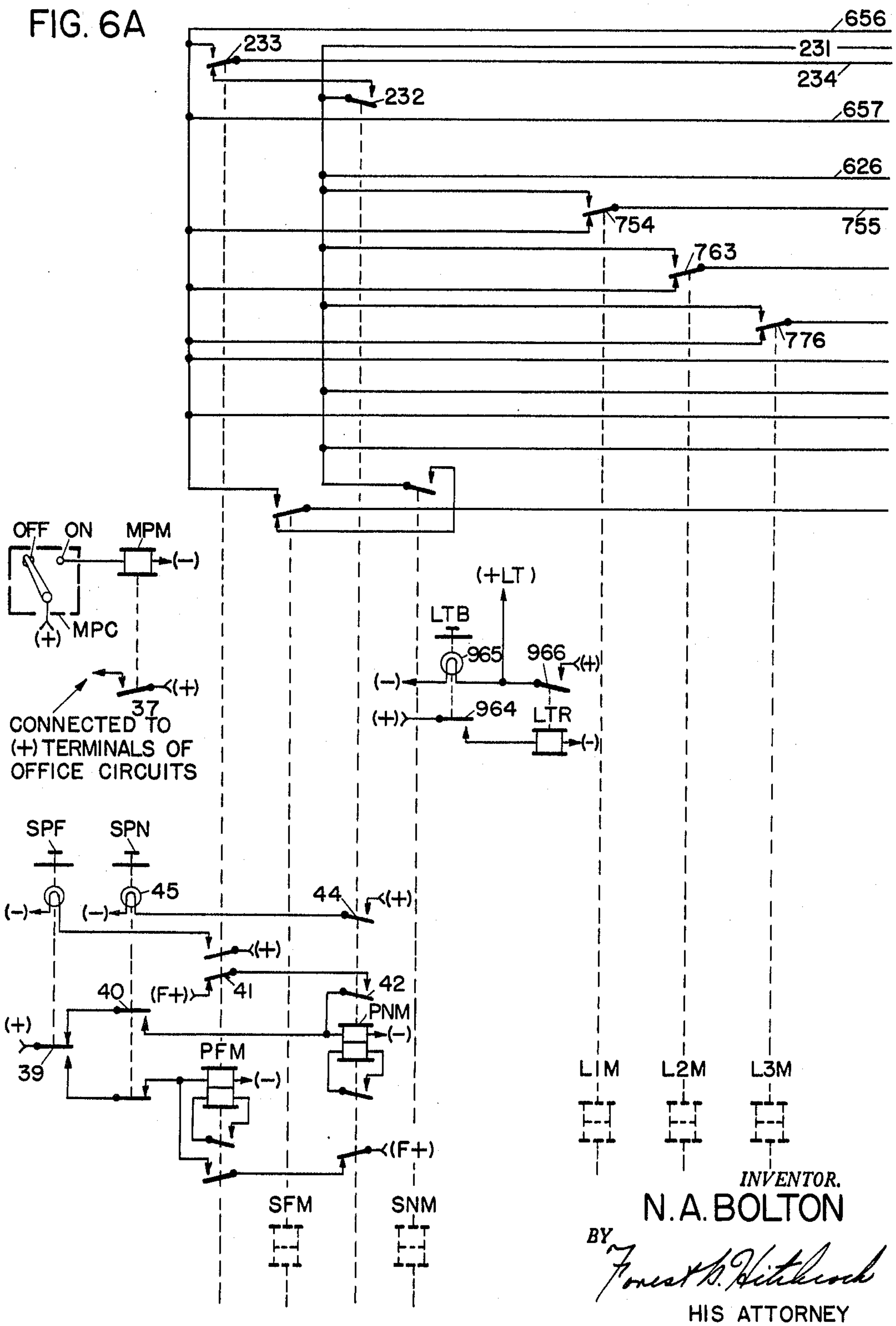
Figure 6B:
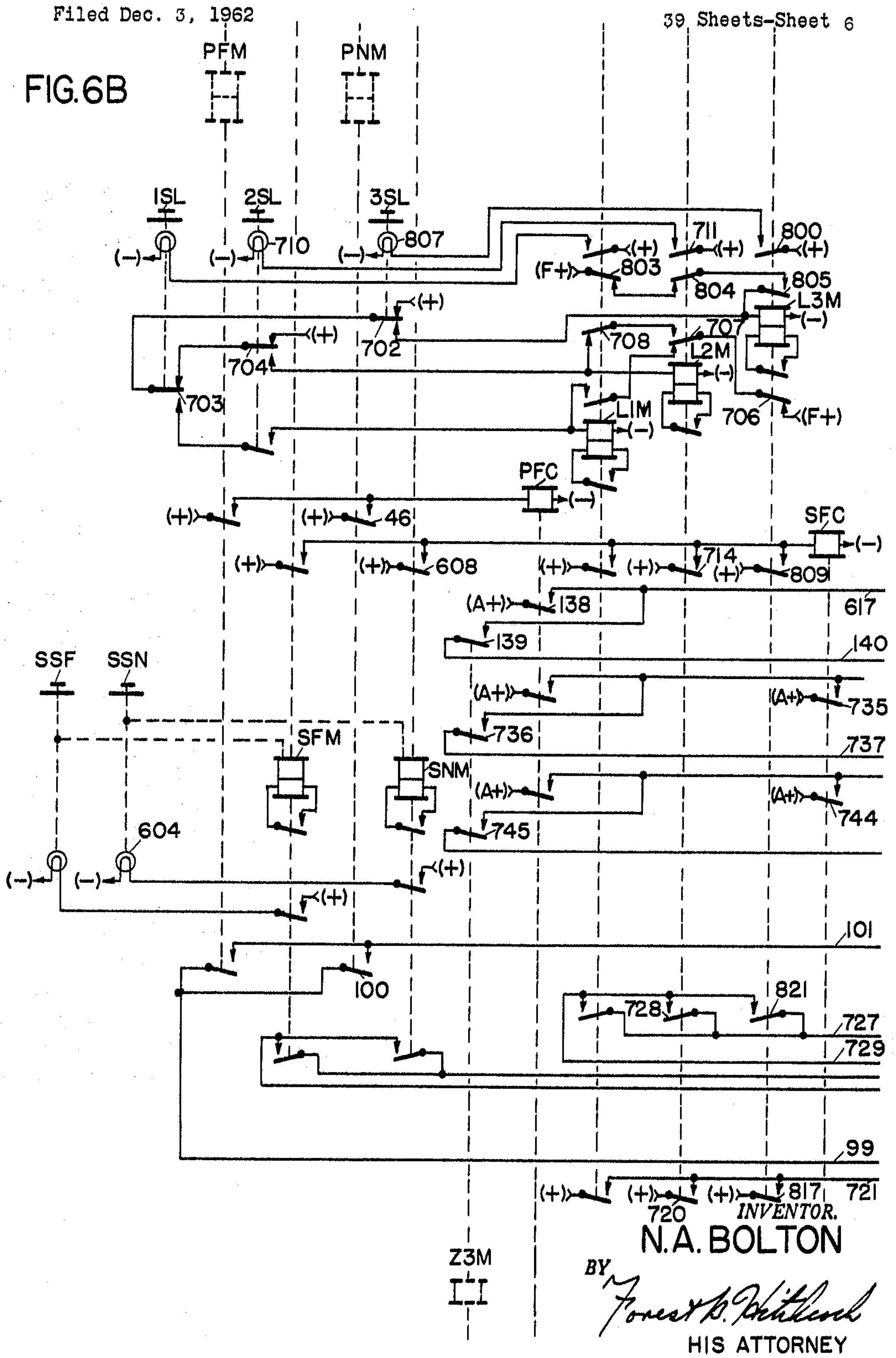
Figure 6C:
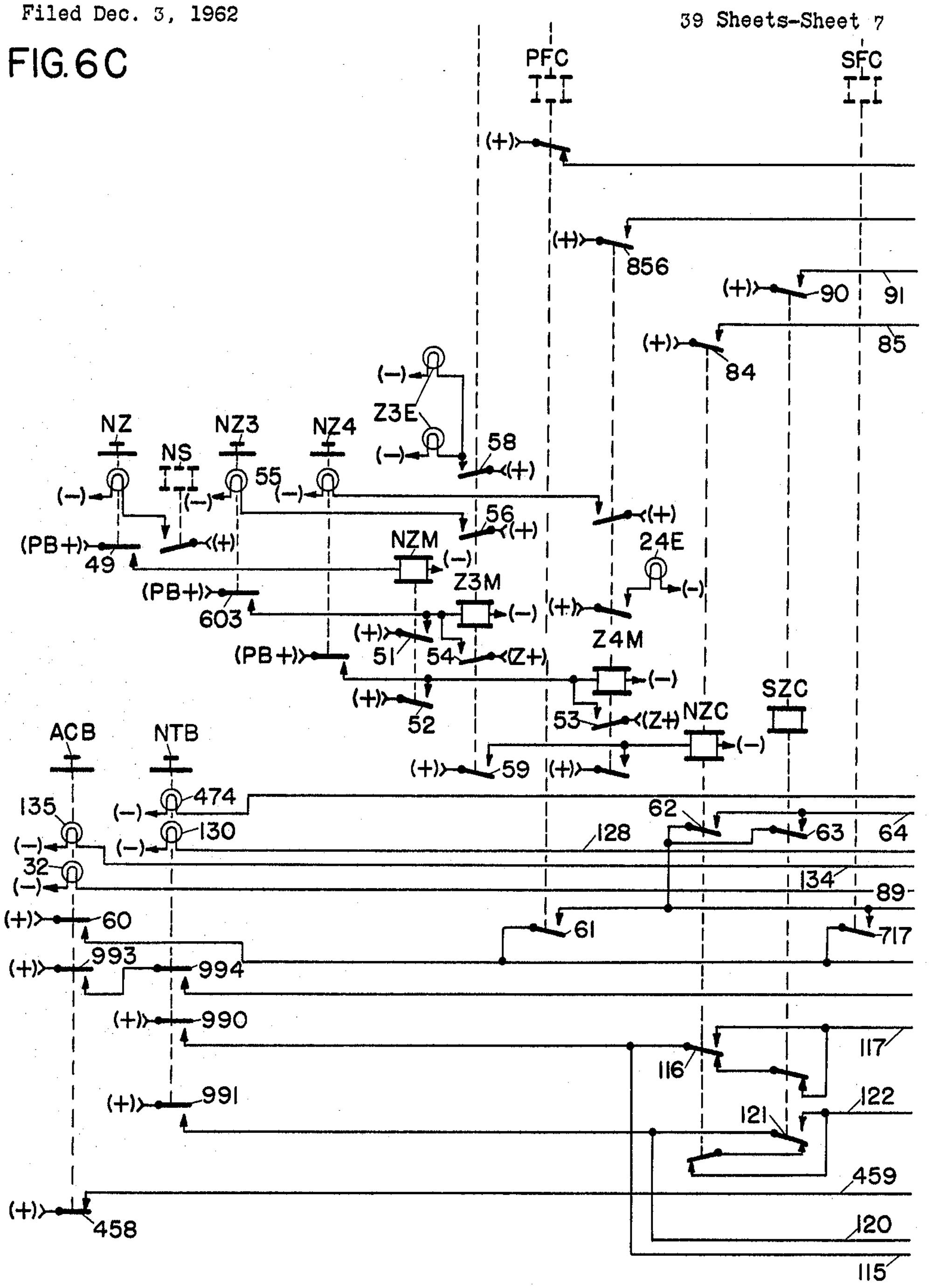
Figure 6D:
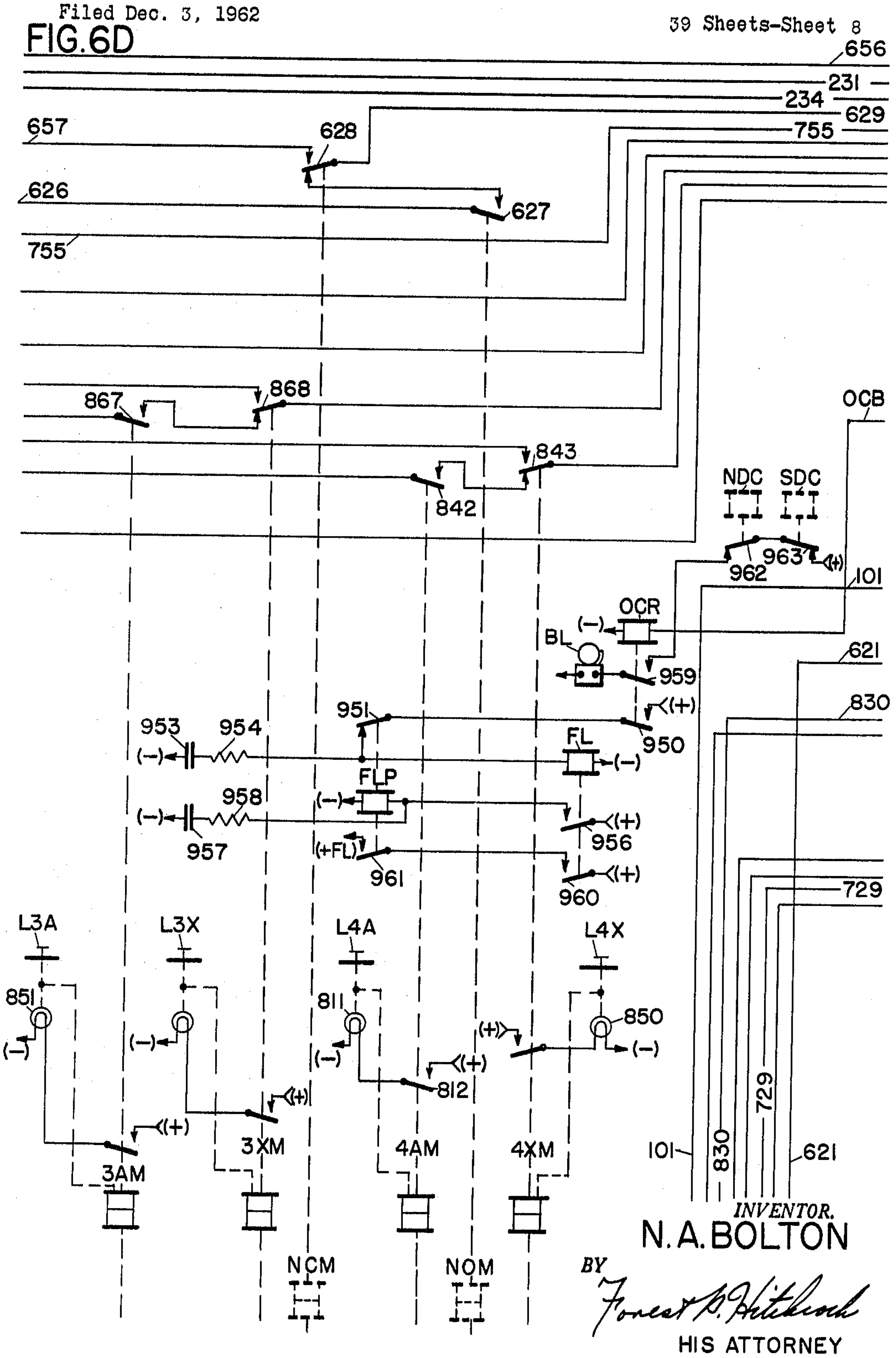
Figure 6E:
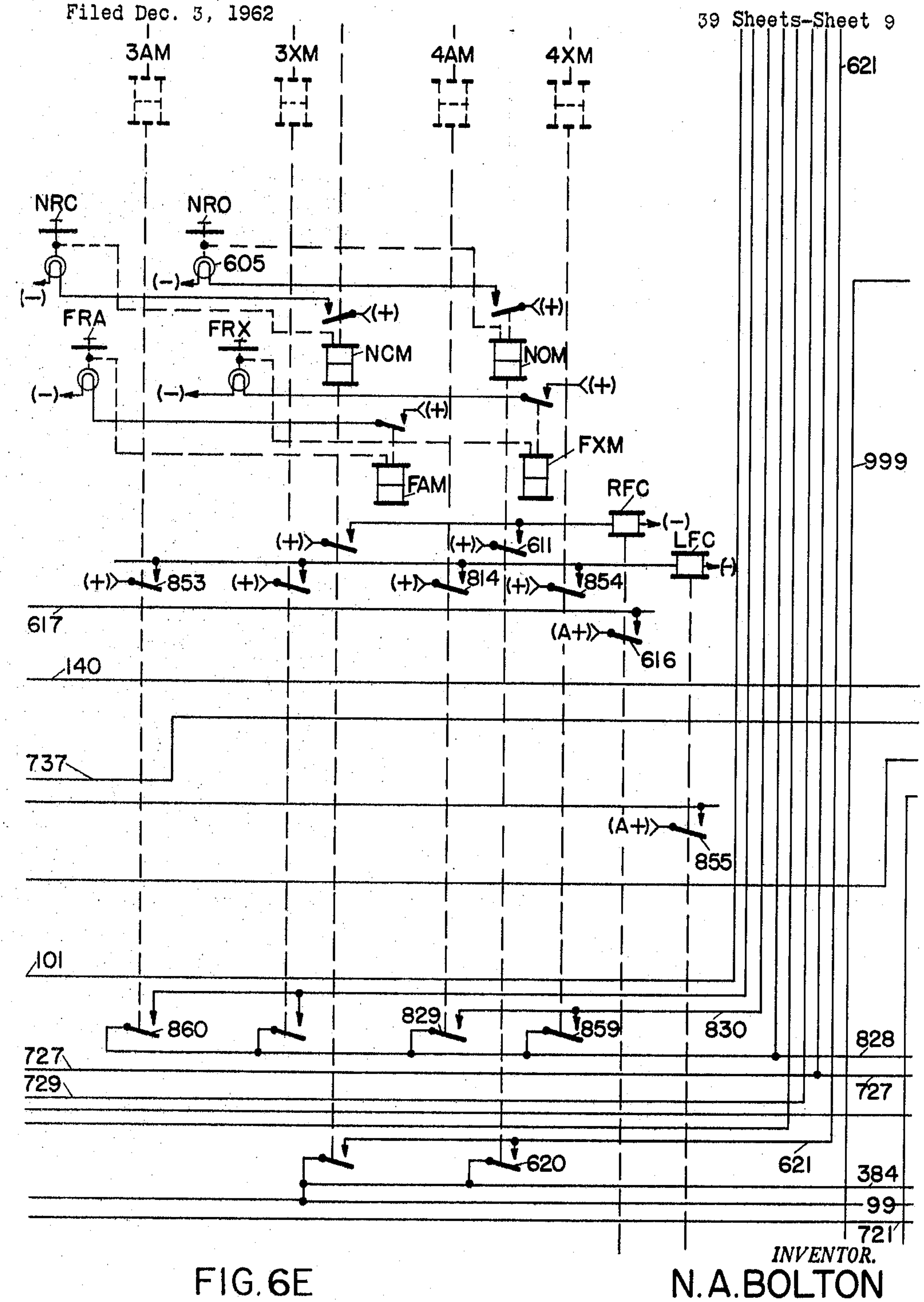
Figure 6F:
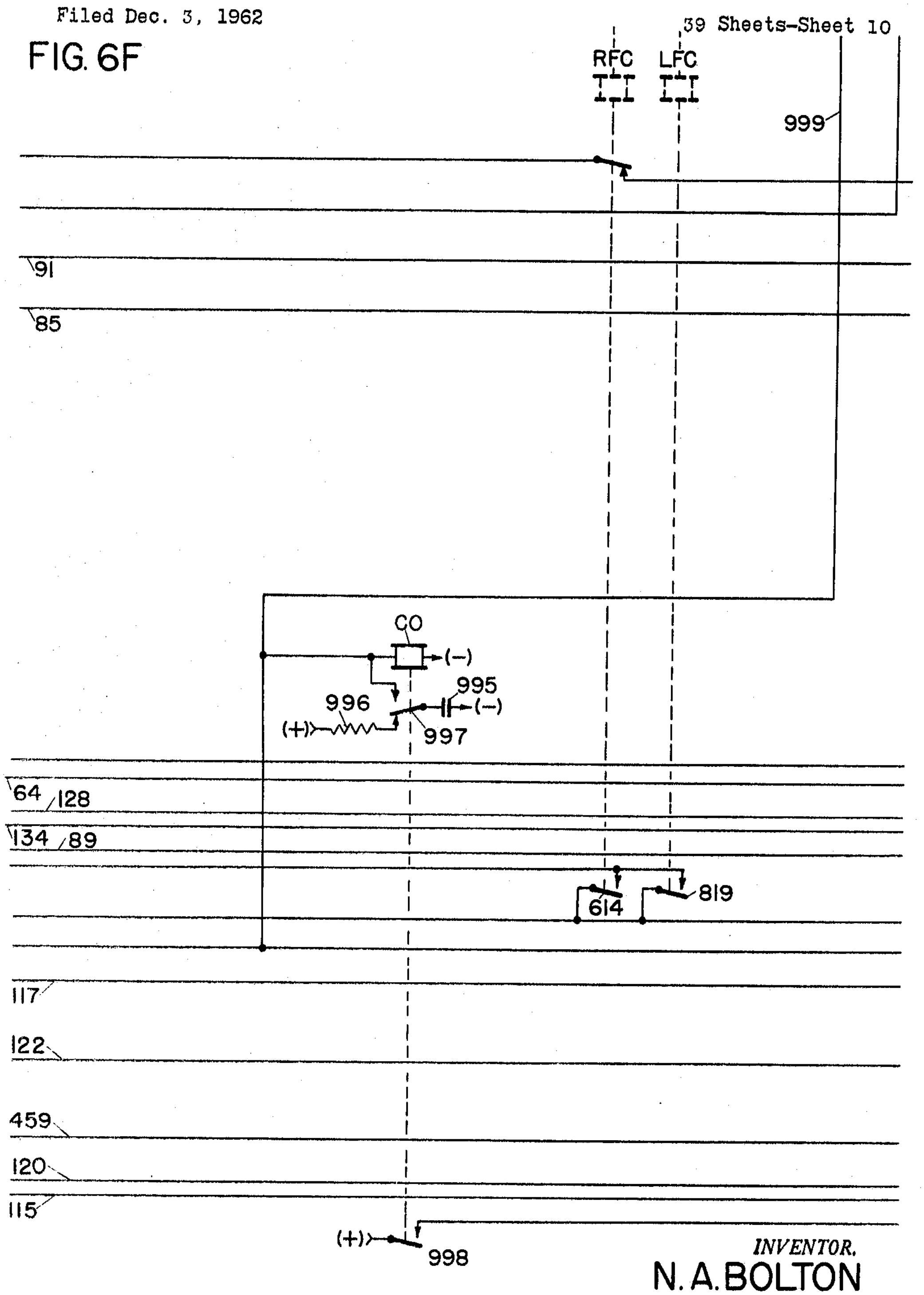
Figure 6G:
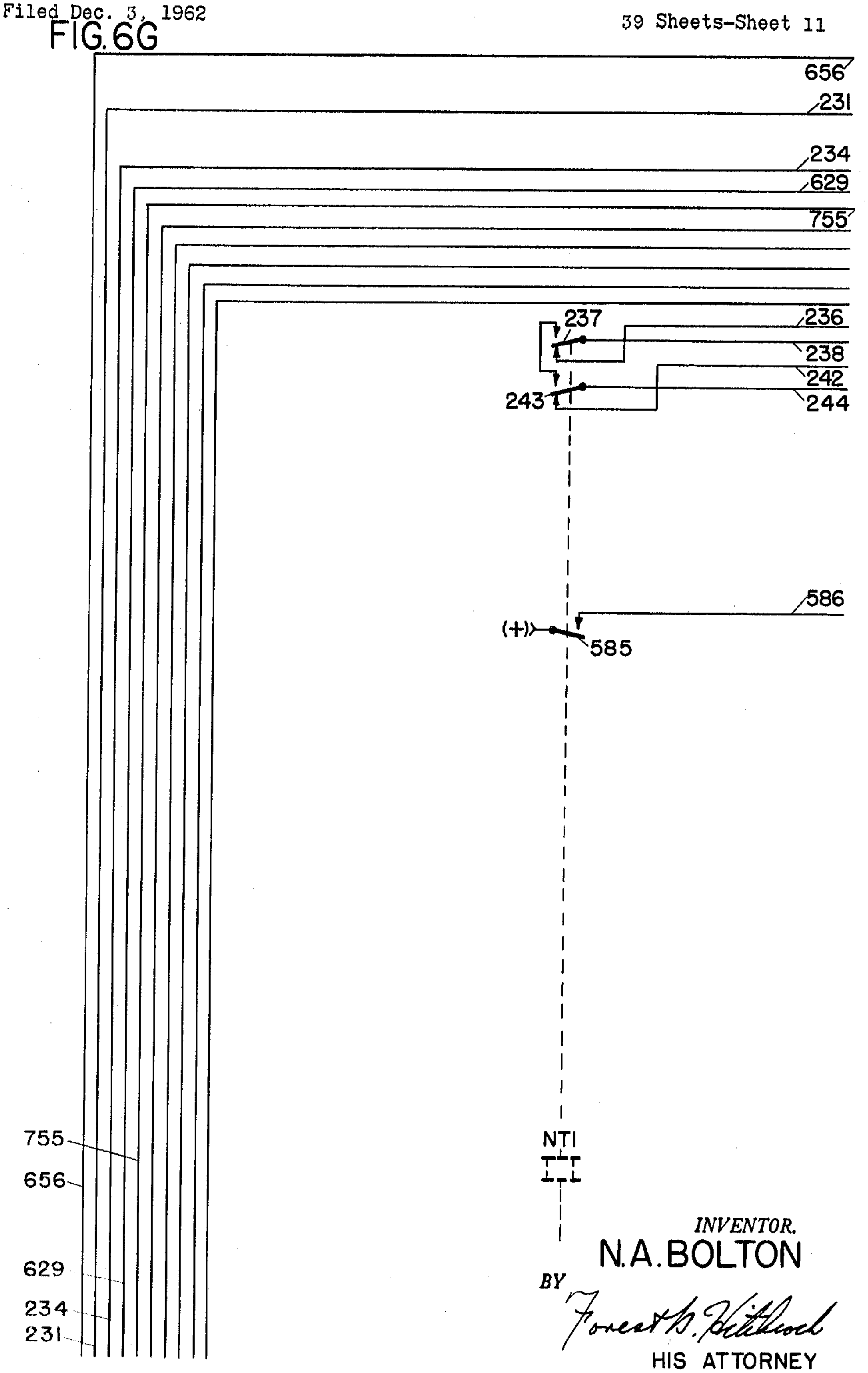
Figure 6H:
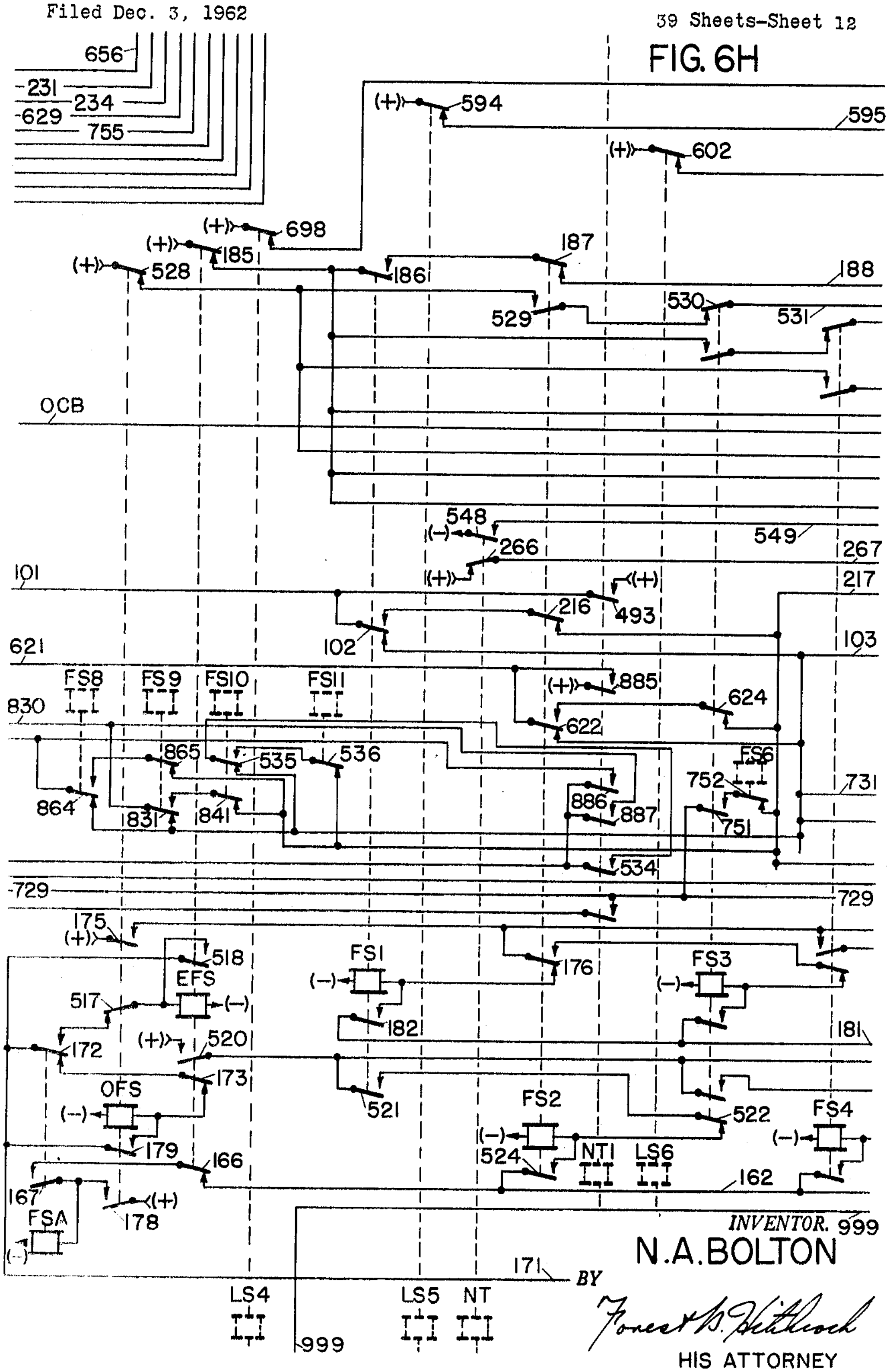
Figure 6I:
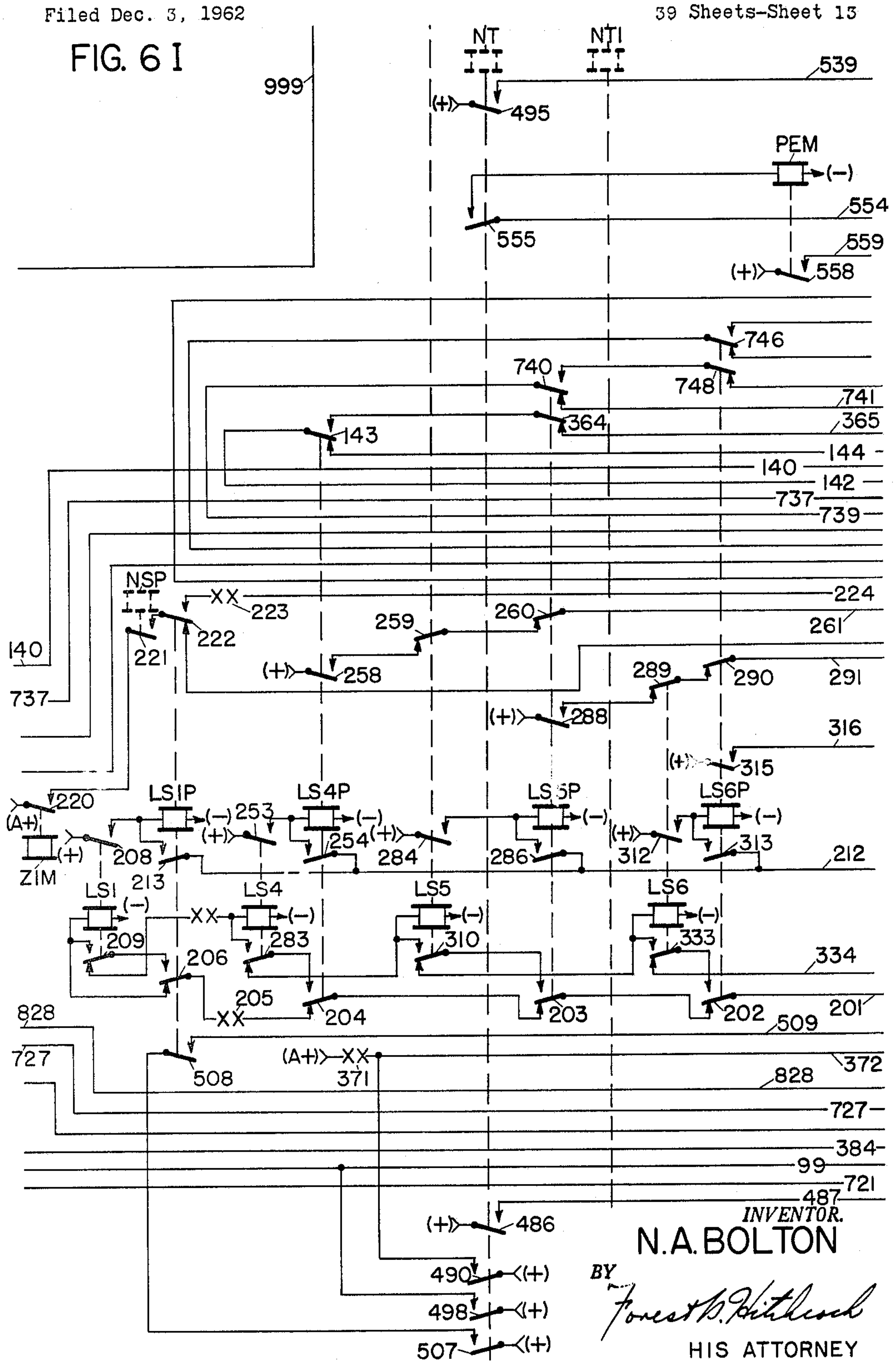
Figure 6J:
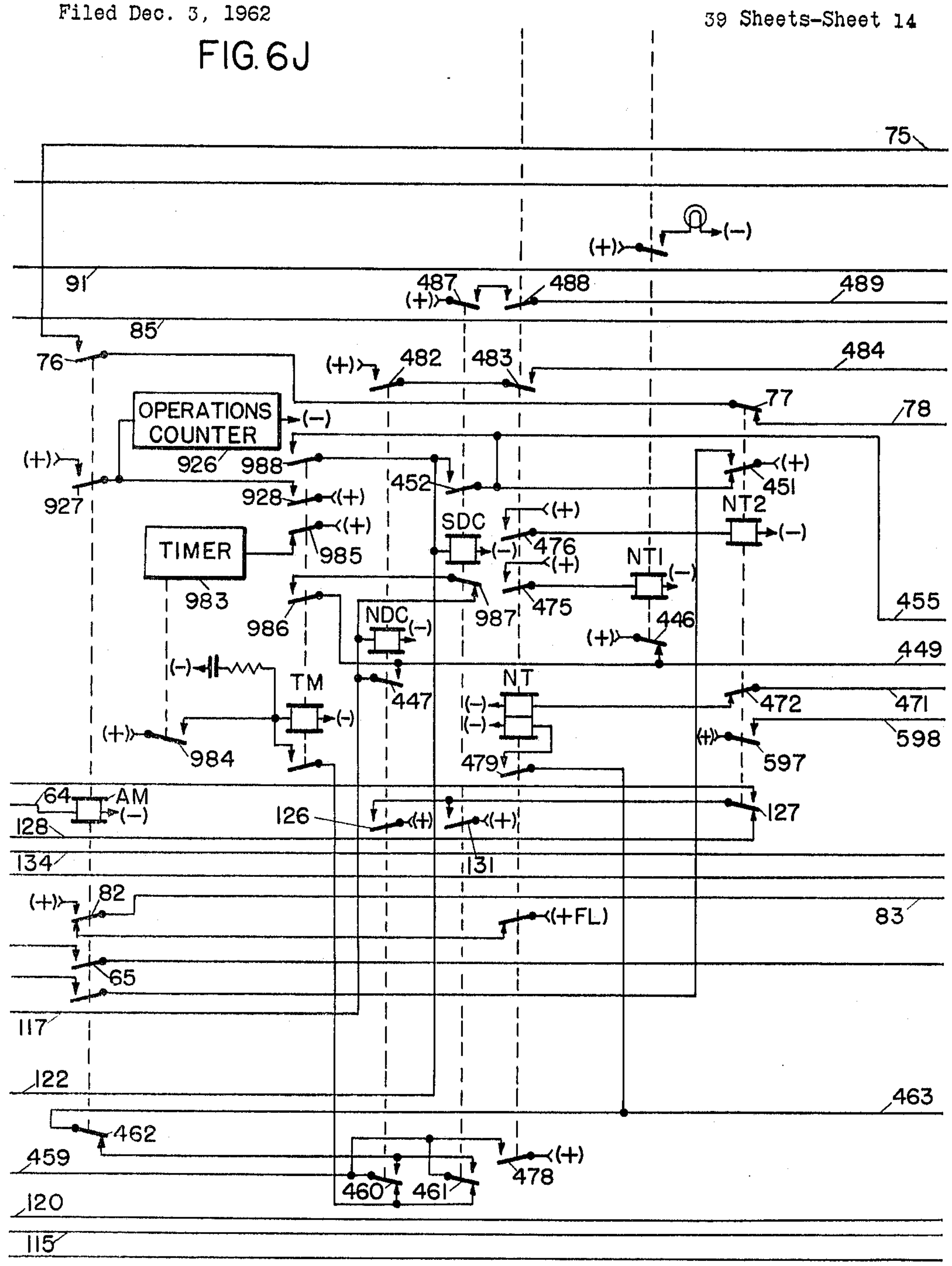
Figure 6K:
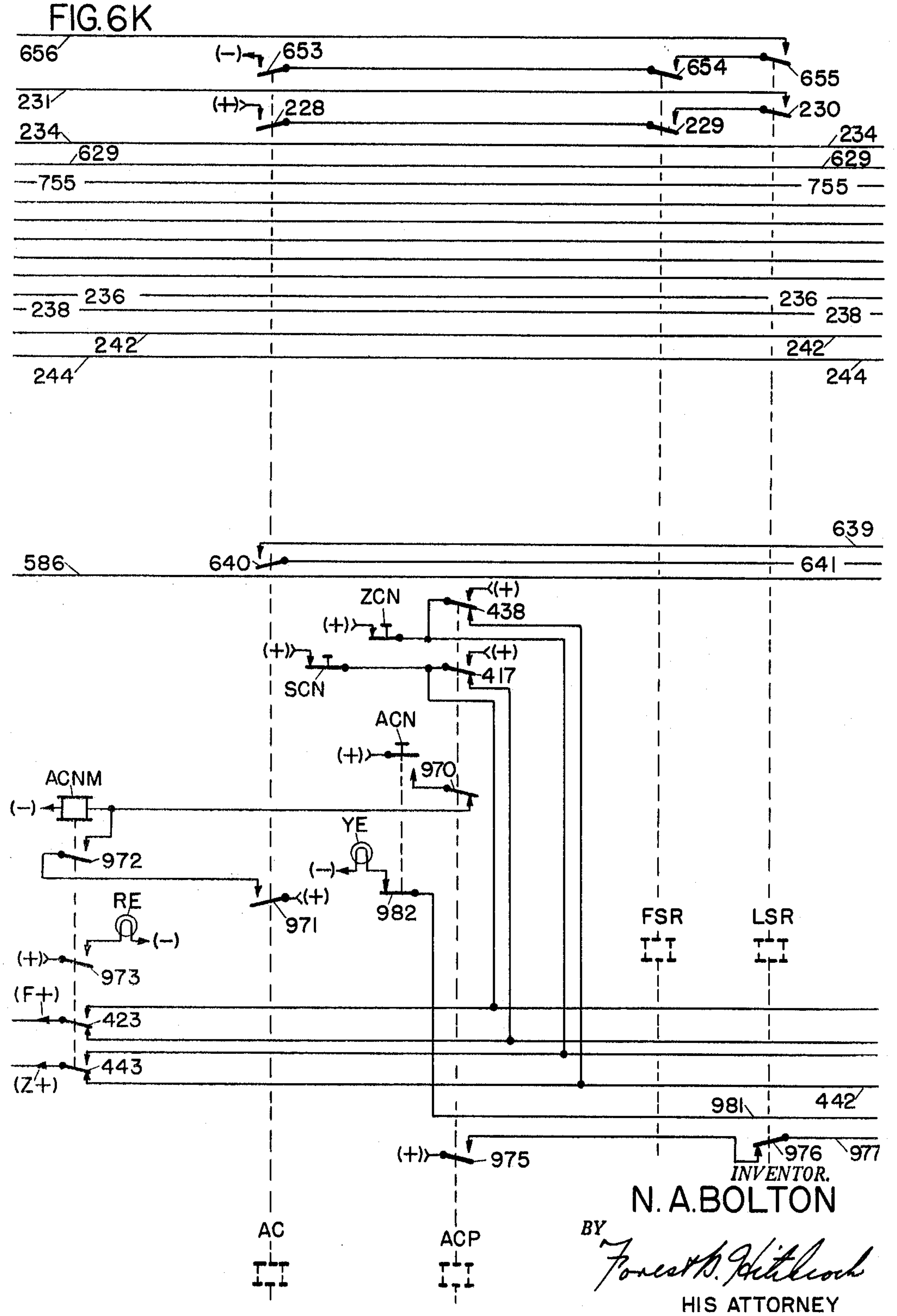
Figure 6L:
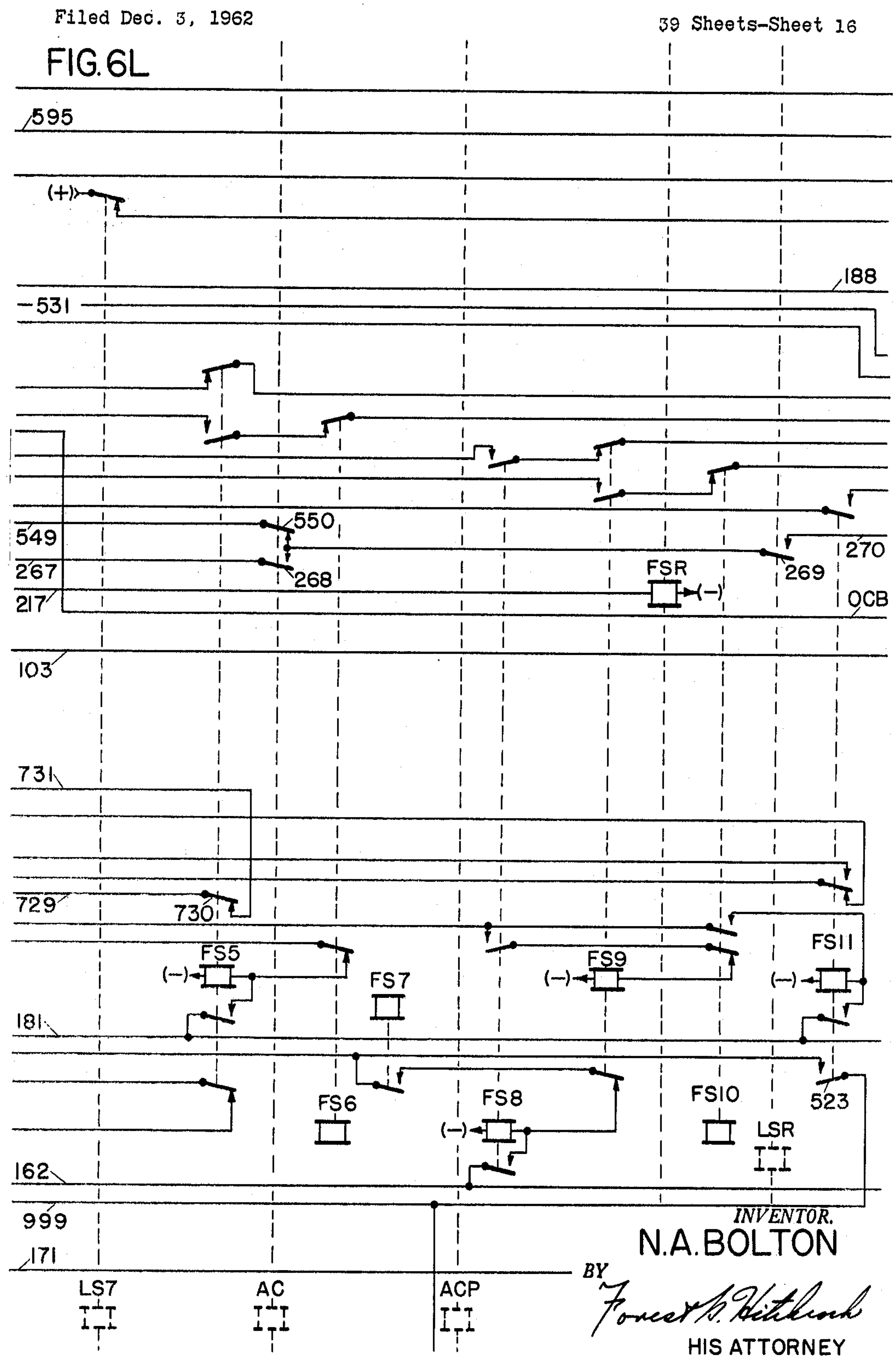
Figure 6M:
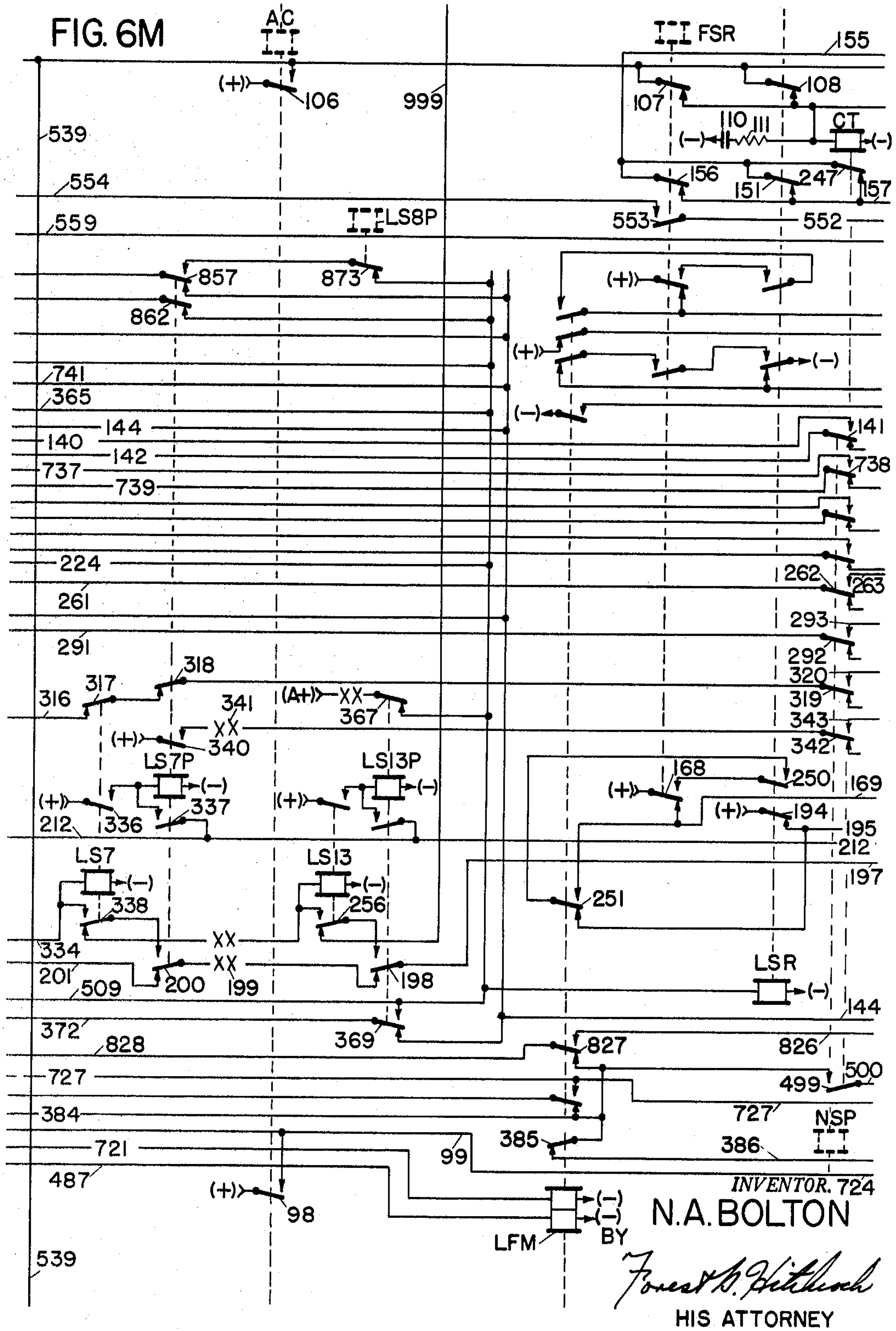
Figure 6N:
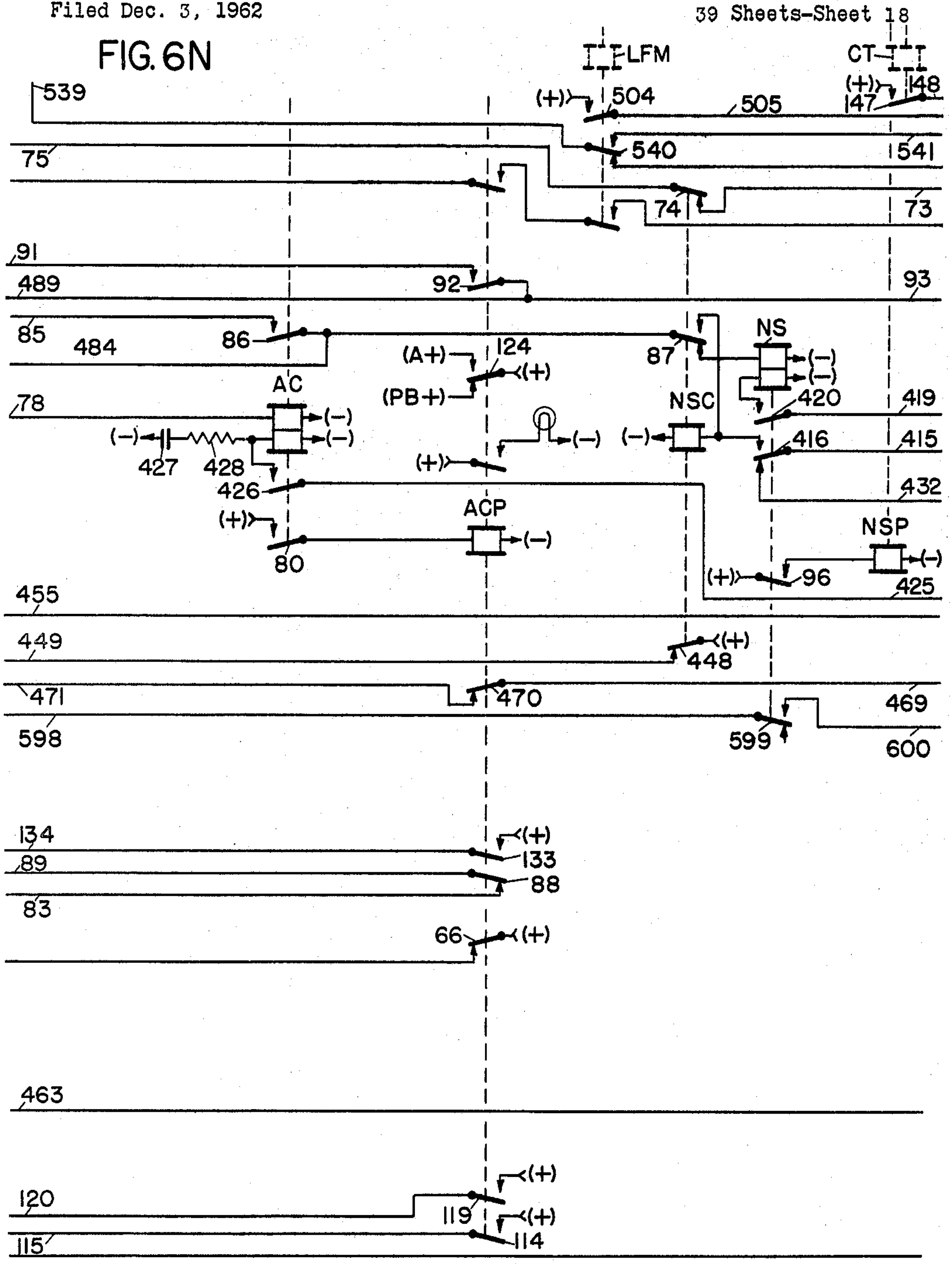
Figure 6O:
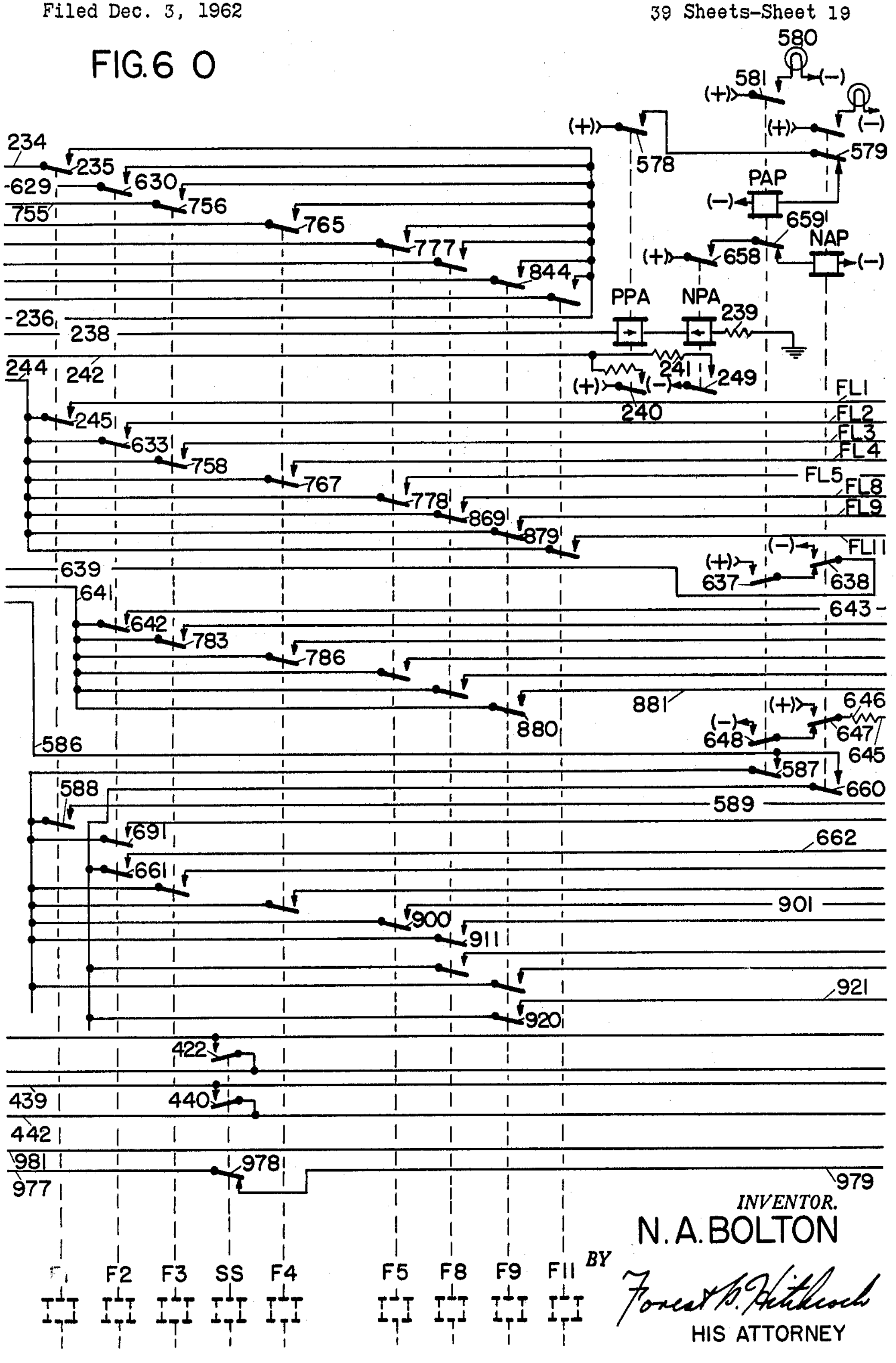
Figure 6P:
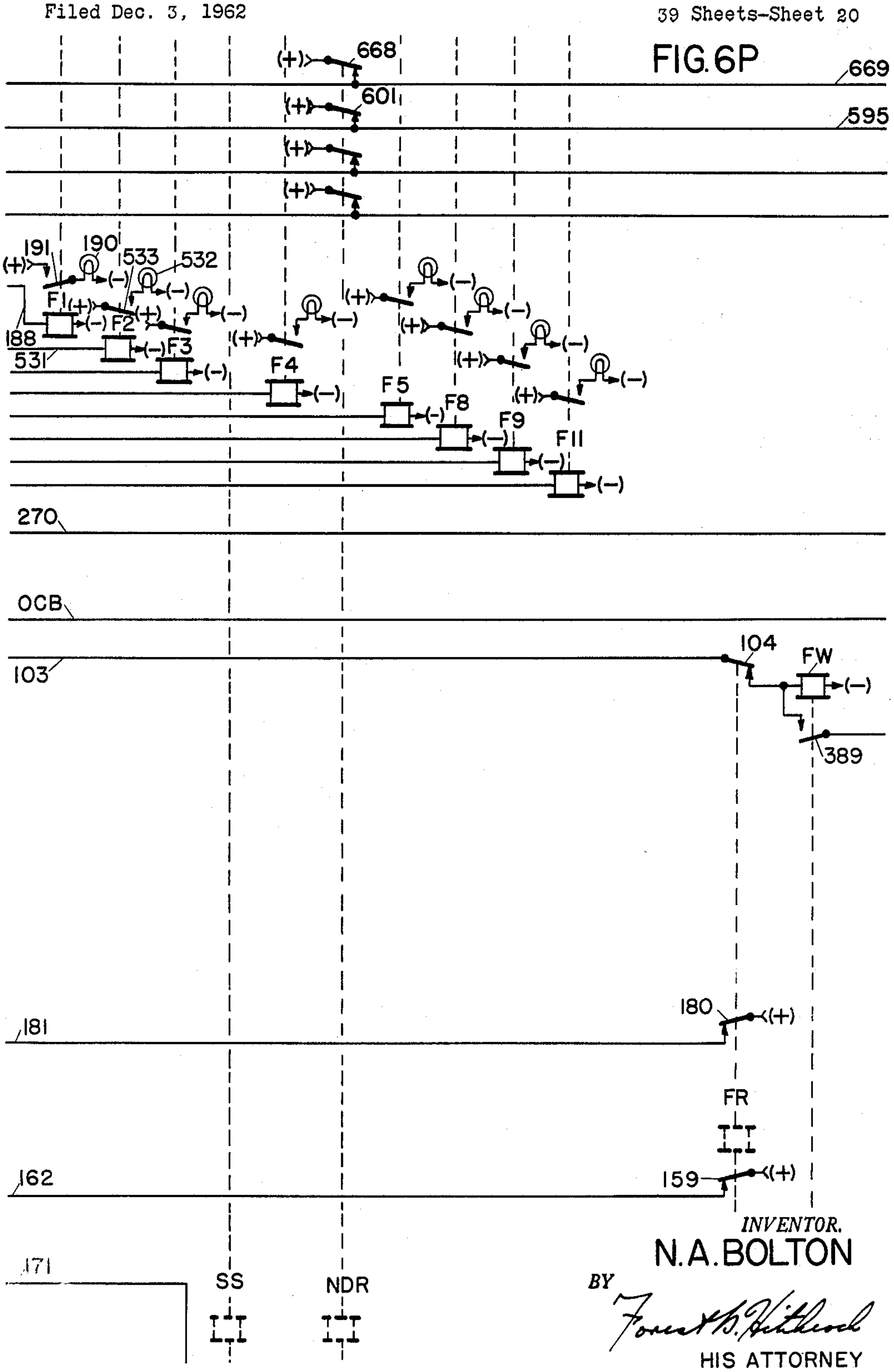
Figure 6Q:
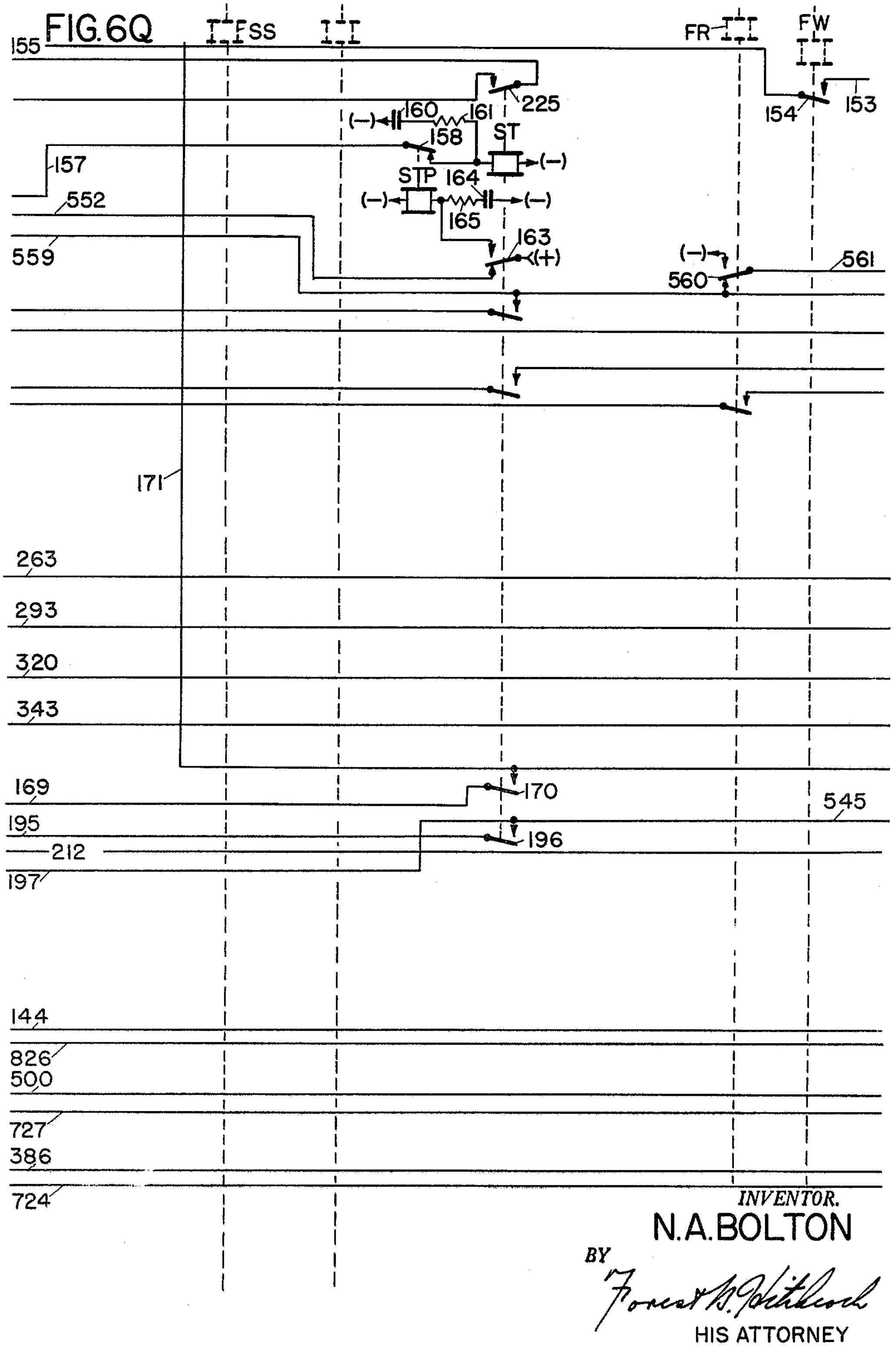
Figure 6R:
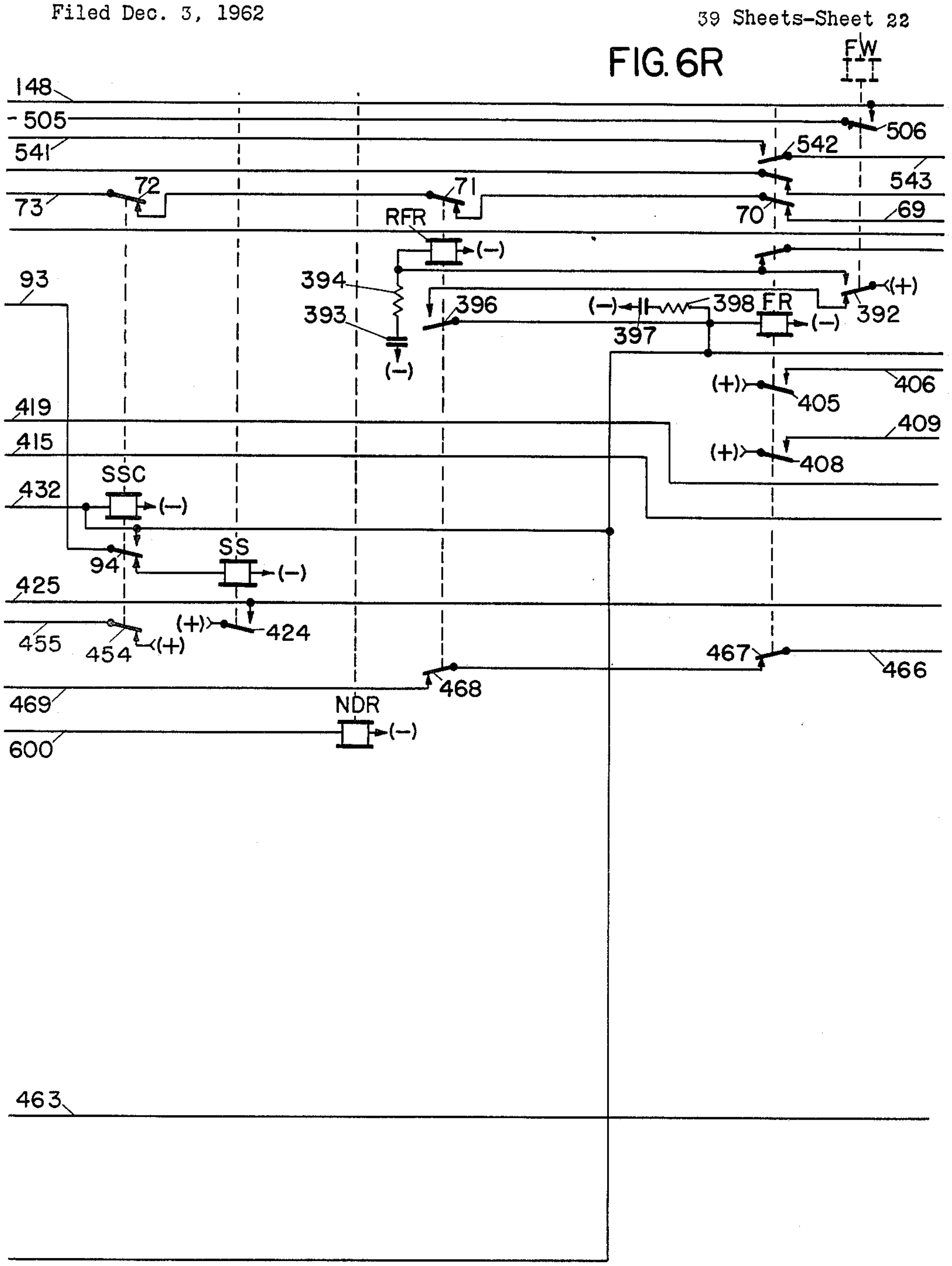
Figure 6S:
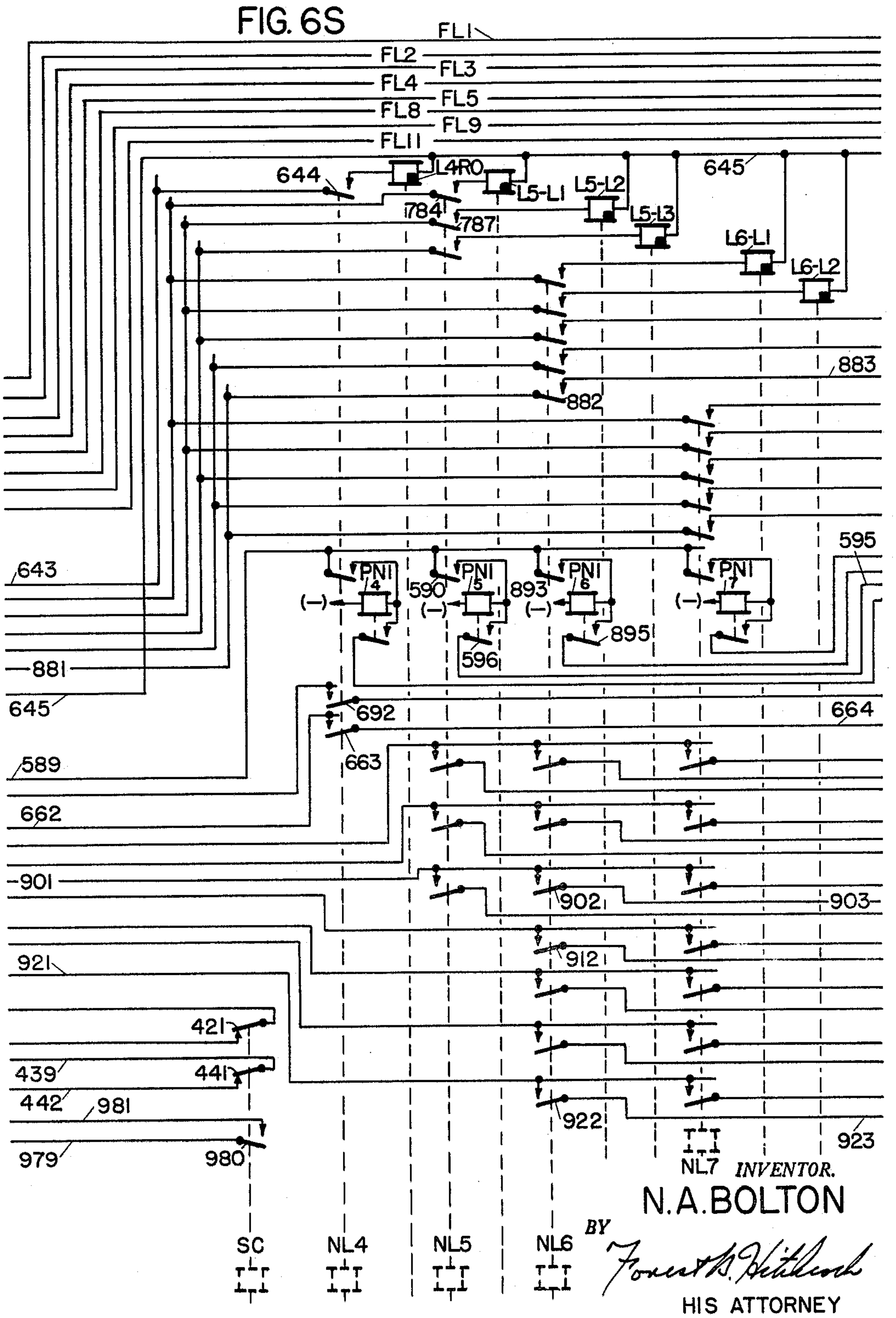
Figure 6T:
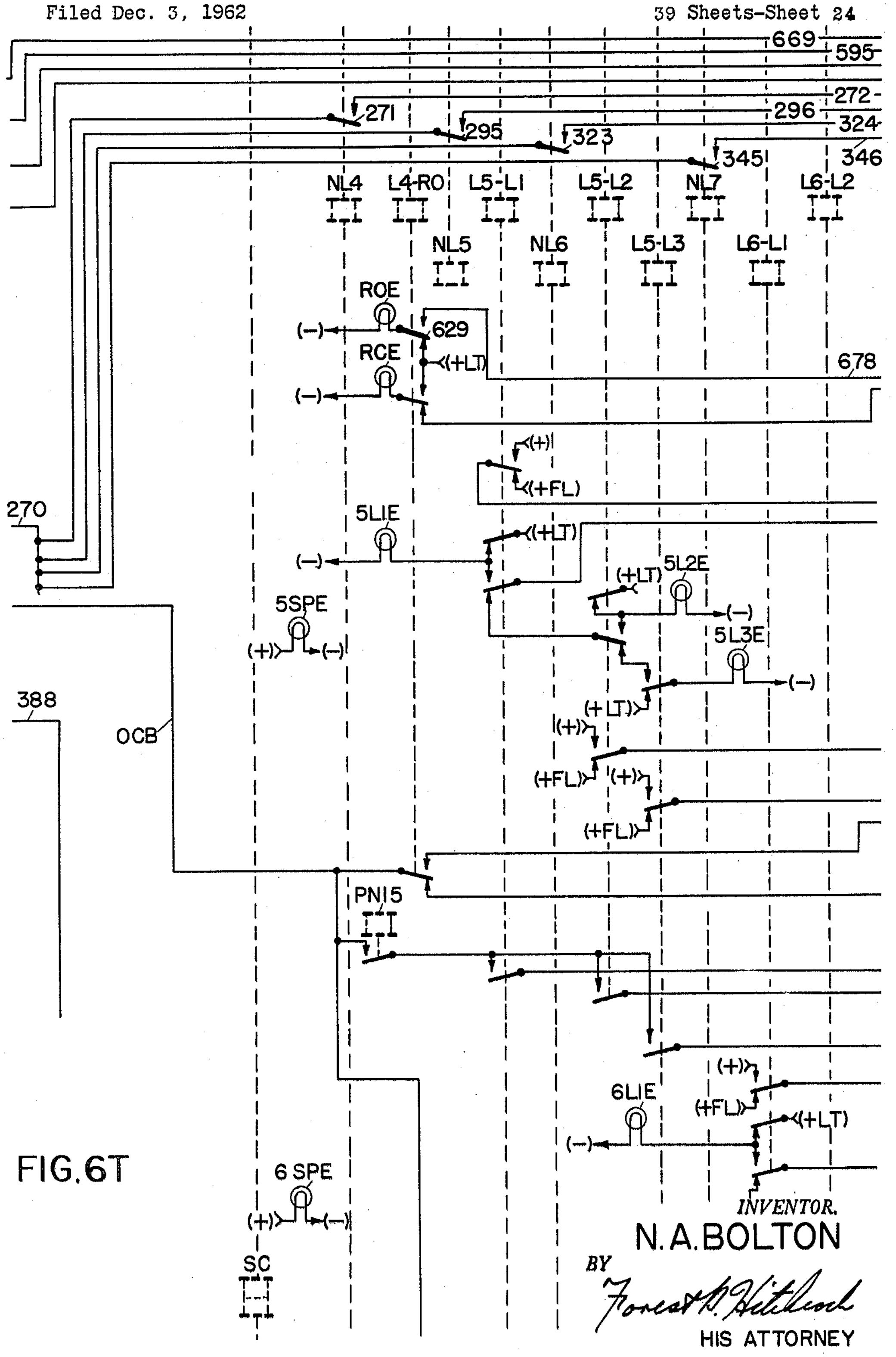
Figure 6U:
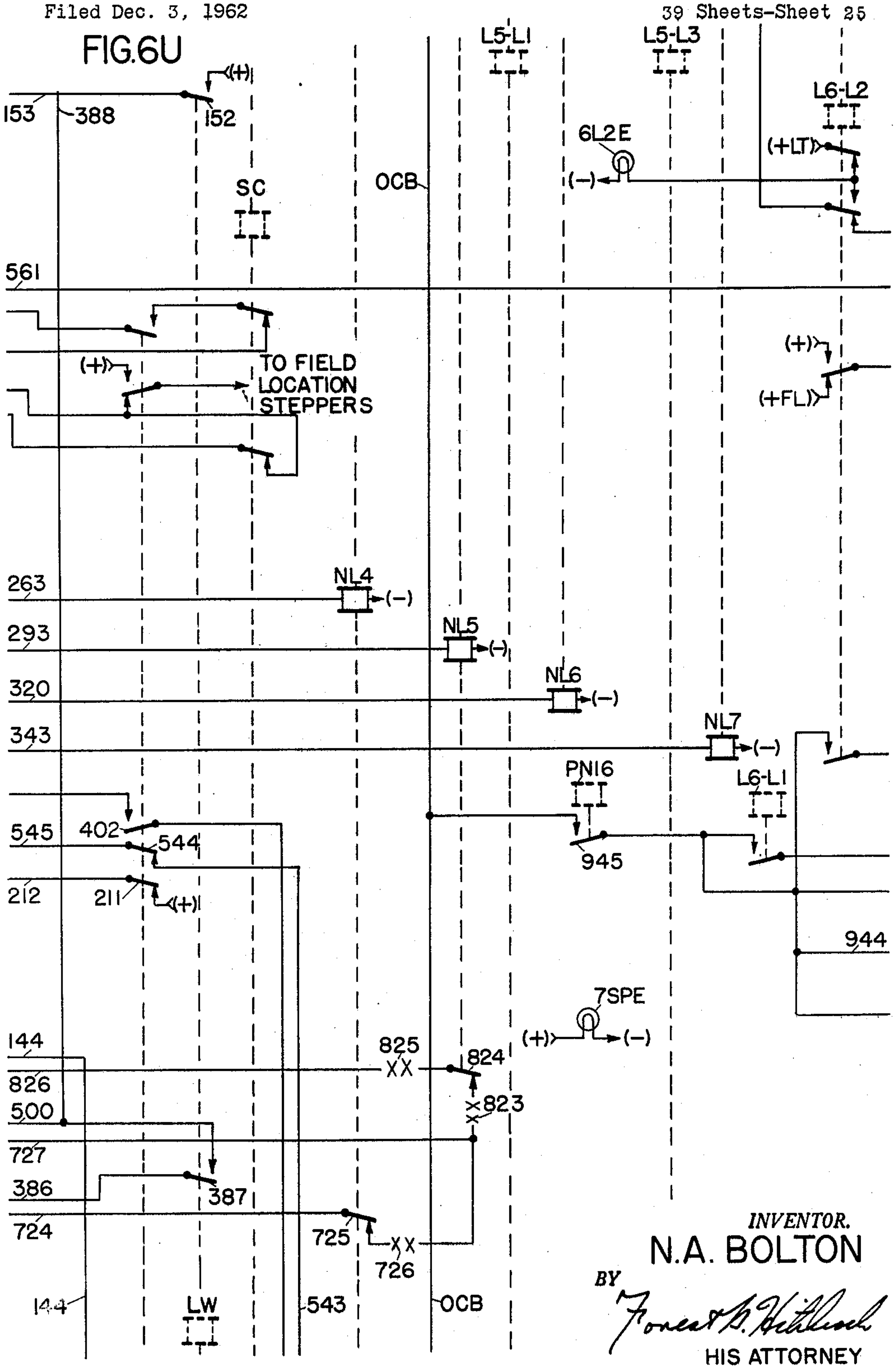
Figure 6V:
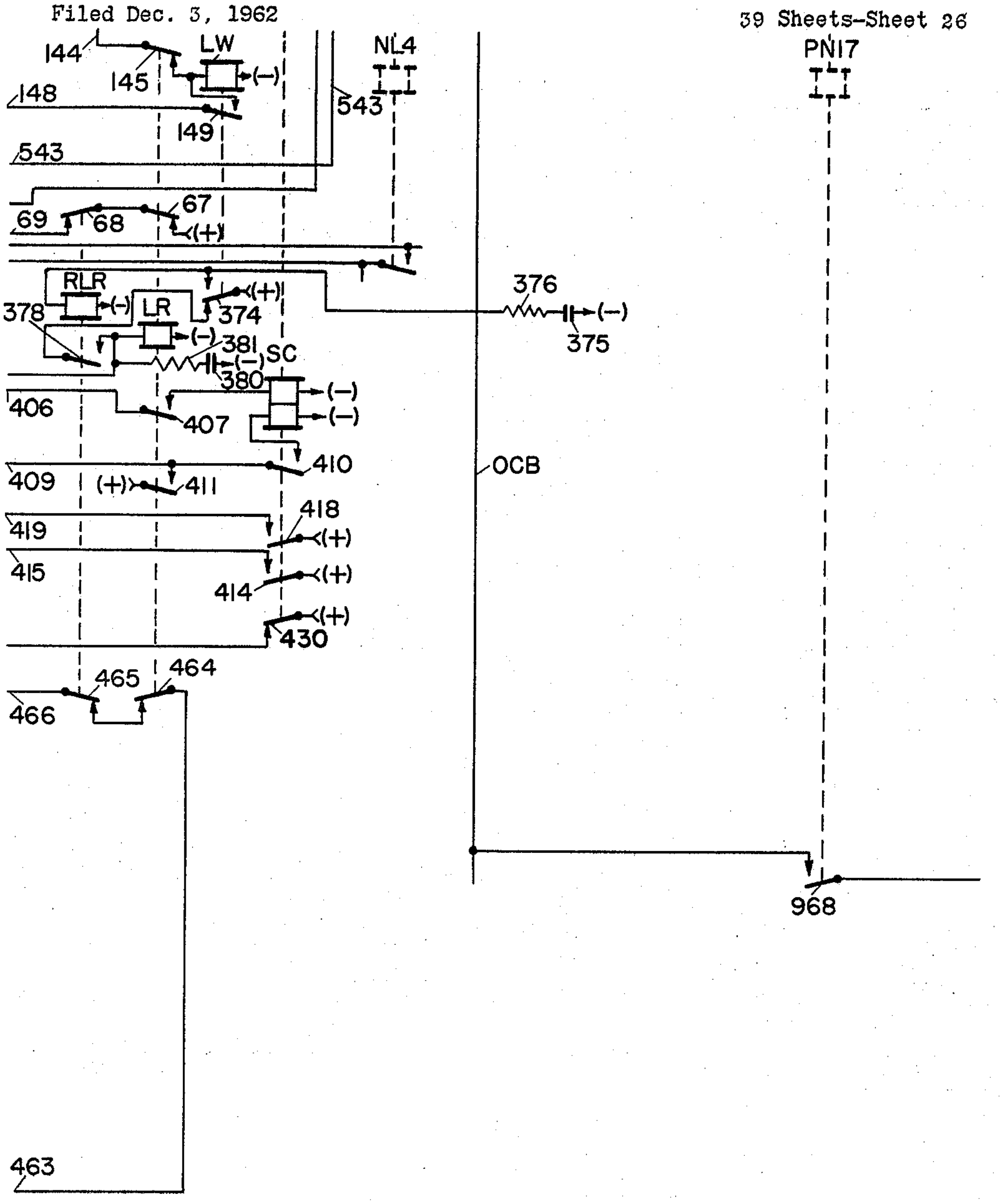
Figure 6W:
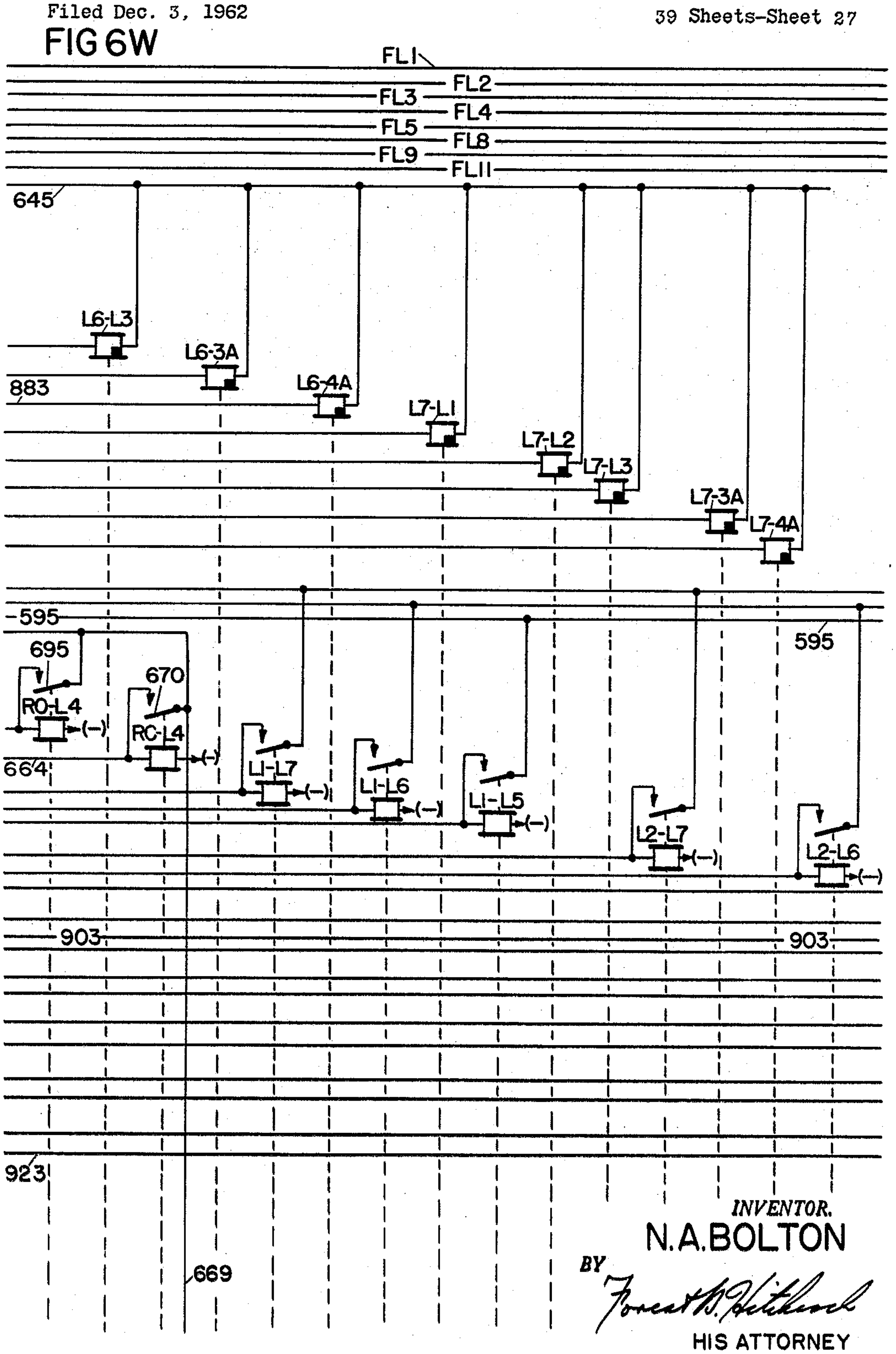
Figure 6X:
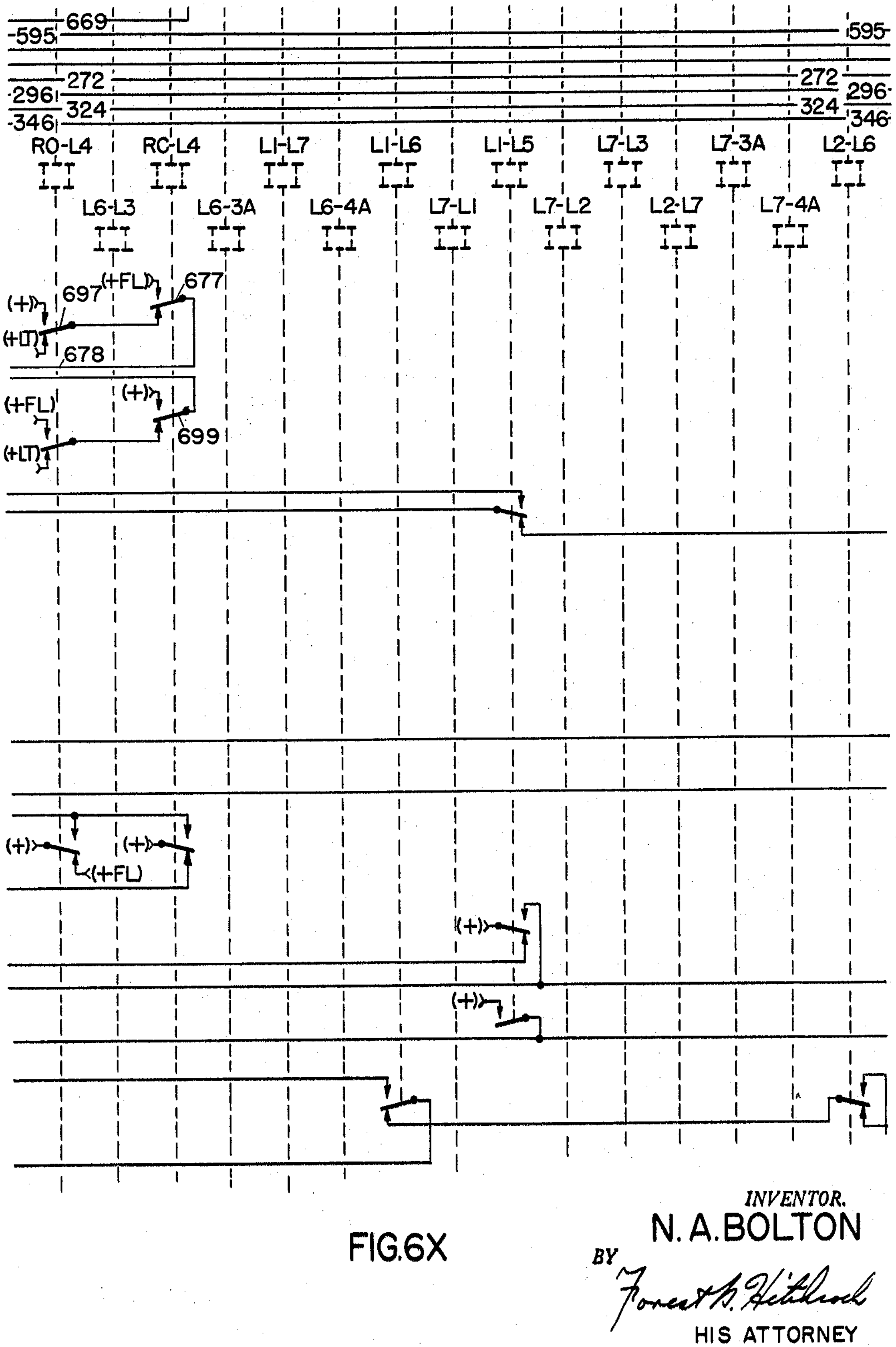
Figure 6Y:
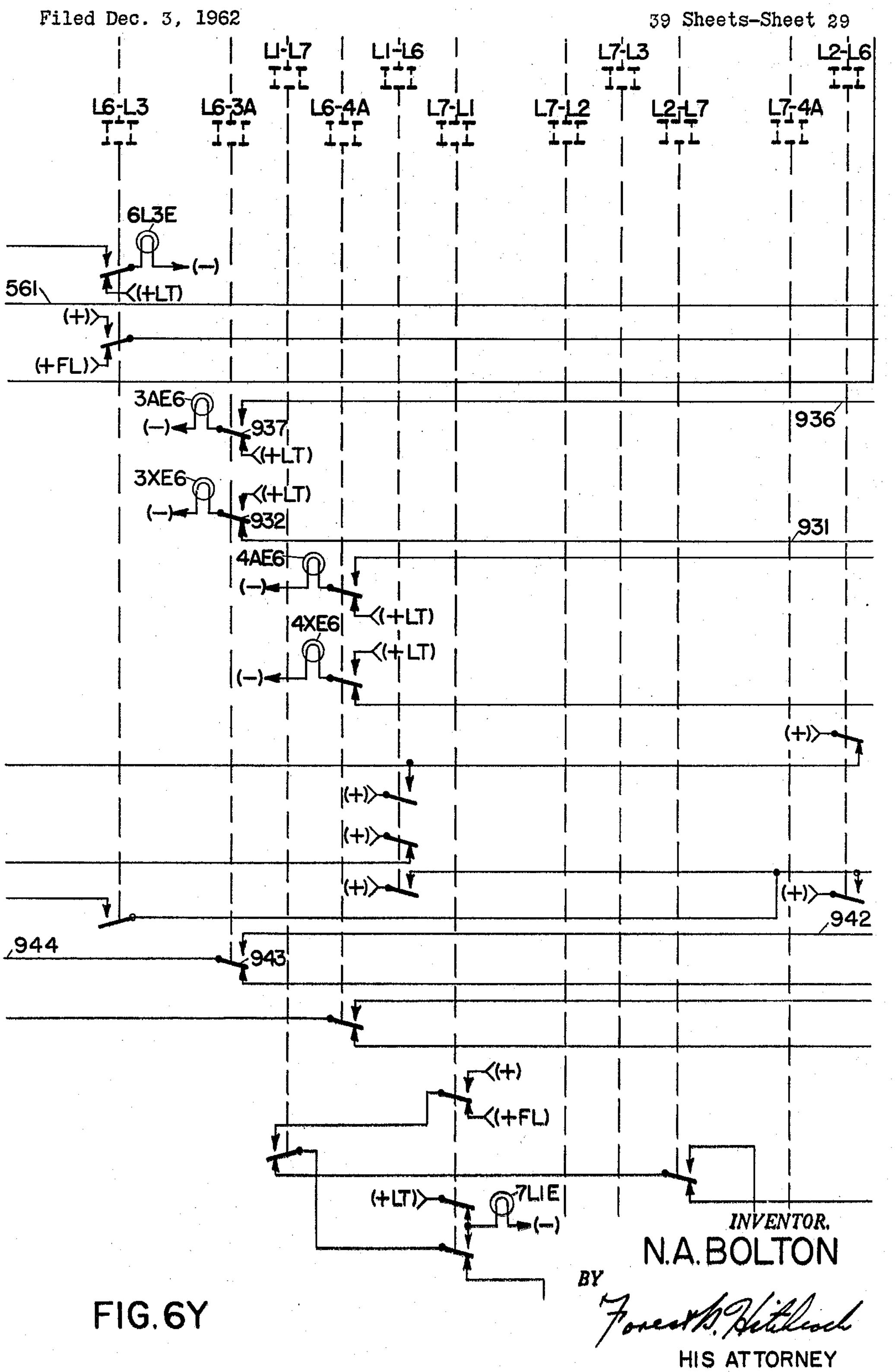
Figure 6Z:
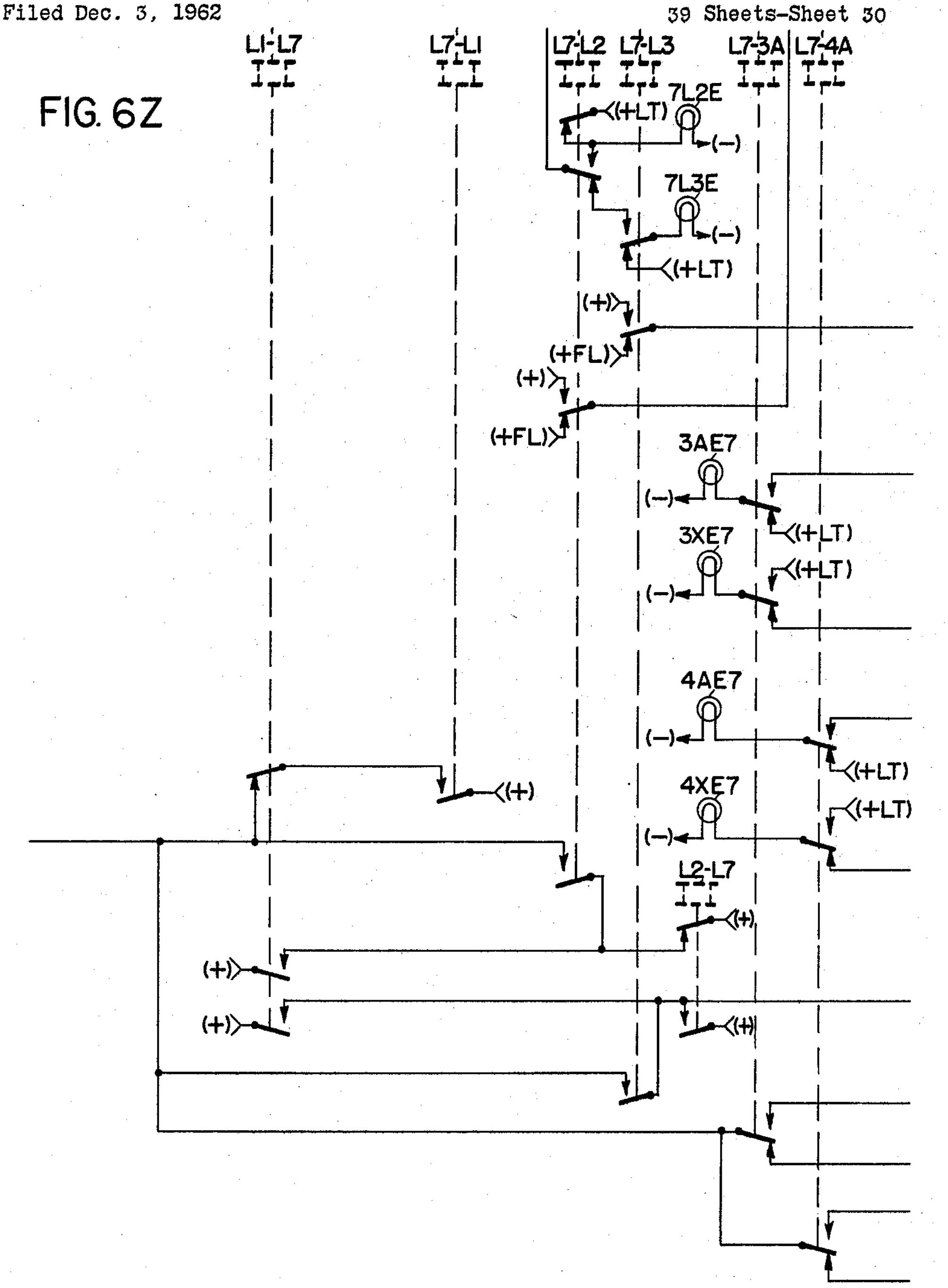
Figure 6A:
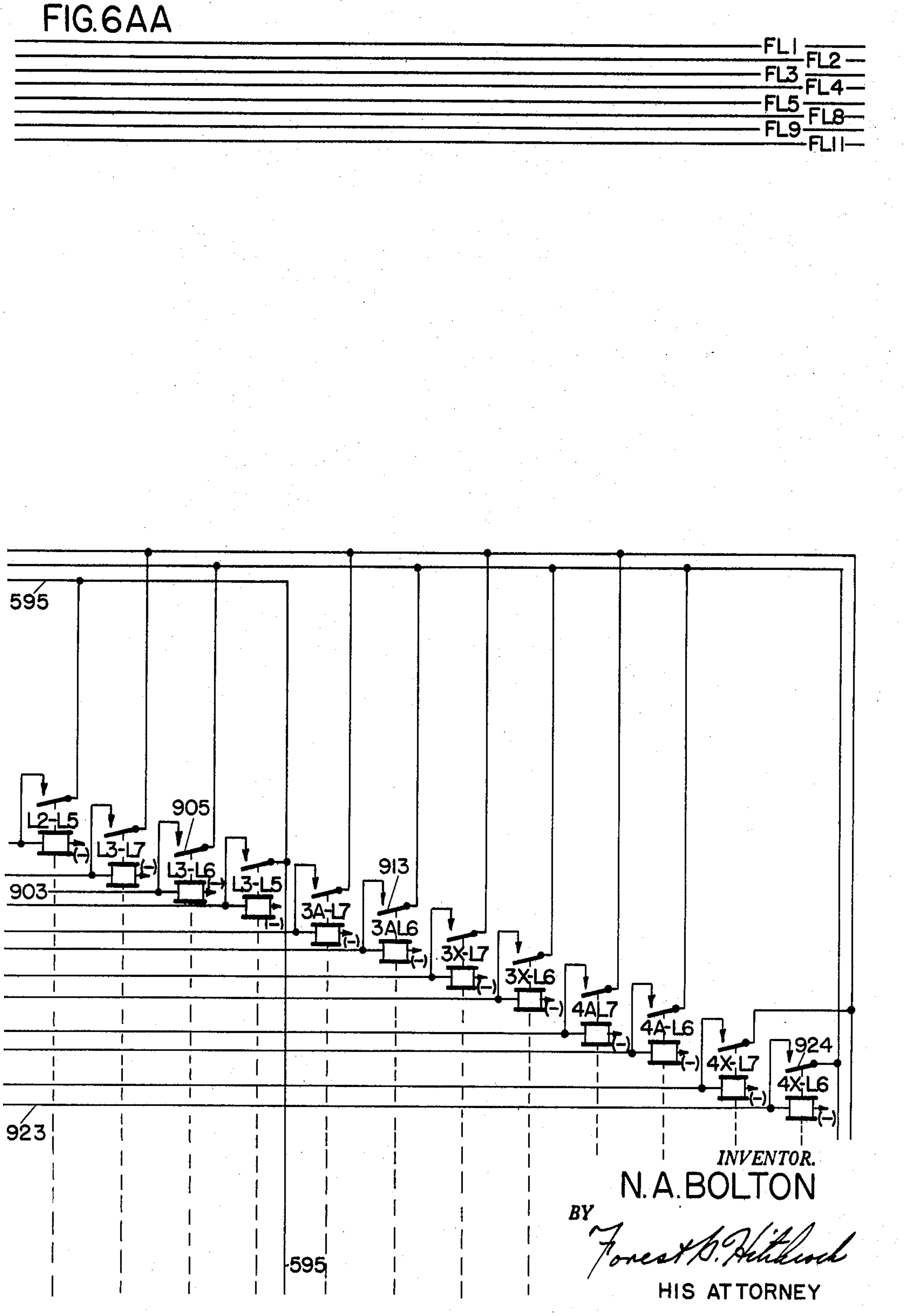
Figure 6B:
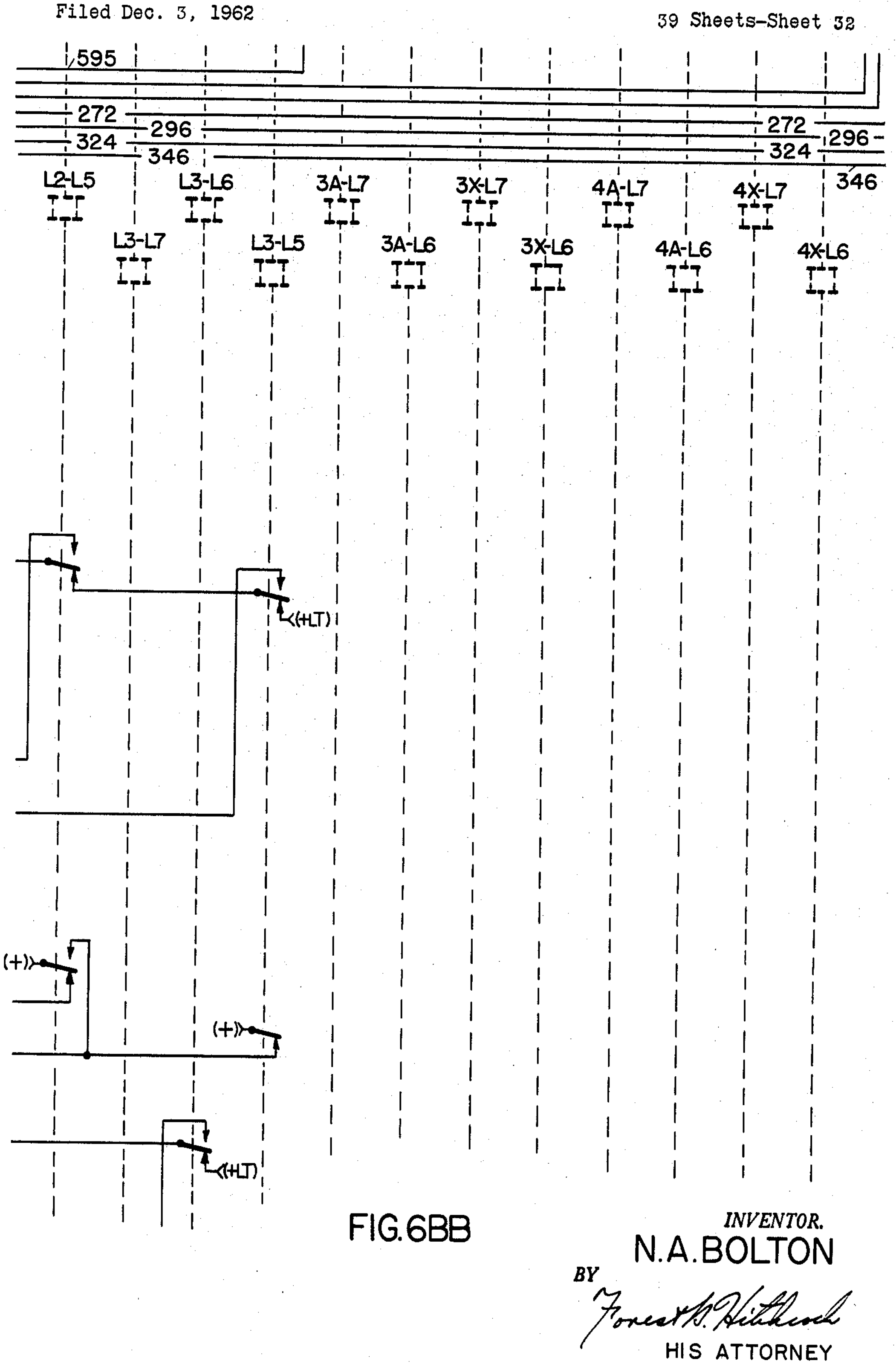
Figure 6C:
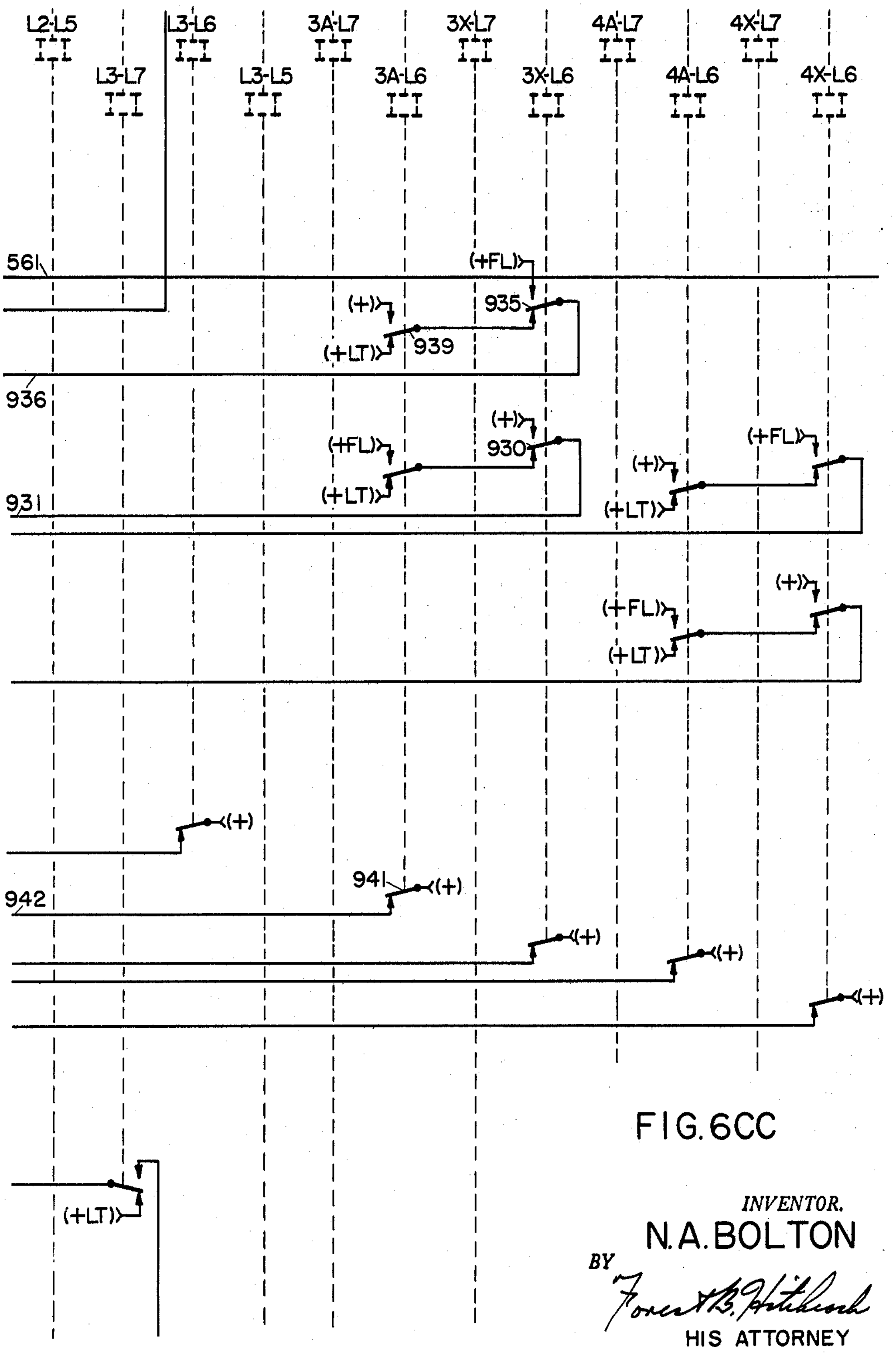
Figure 6D:
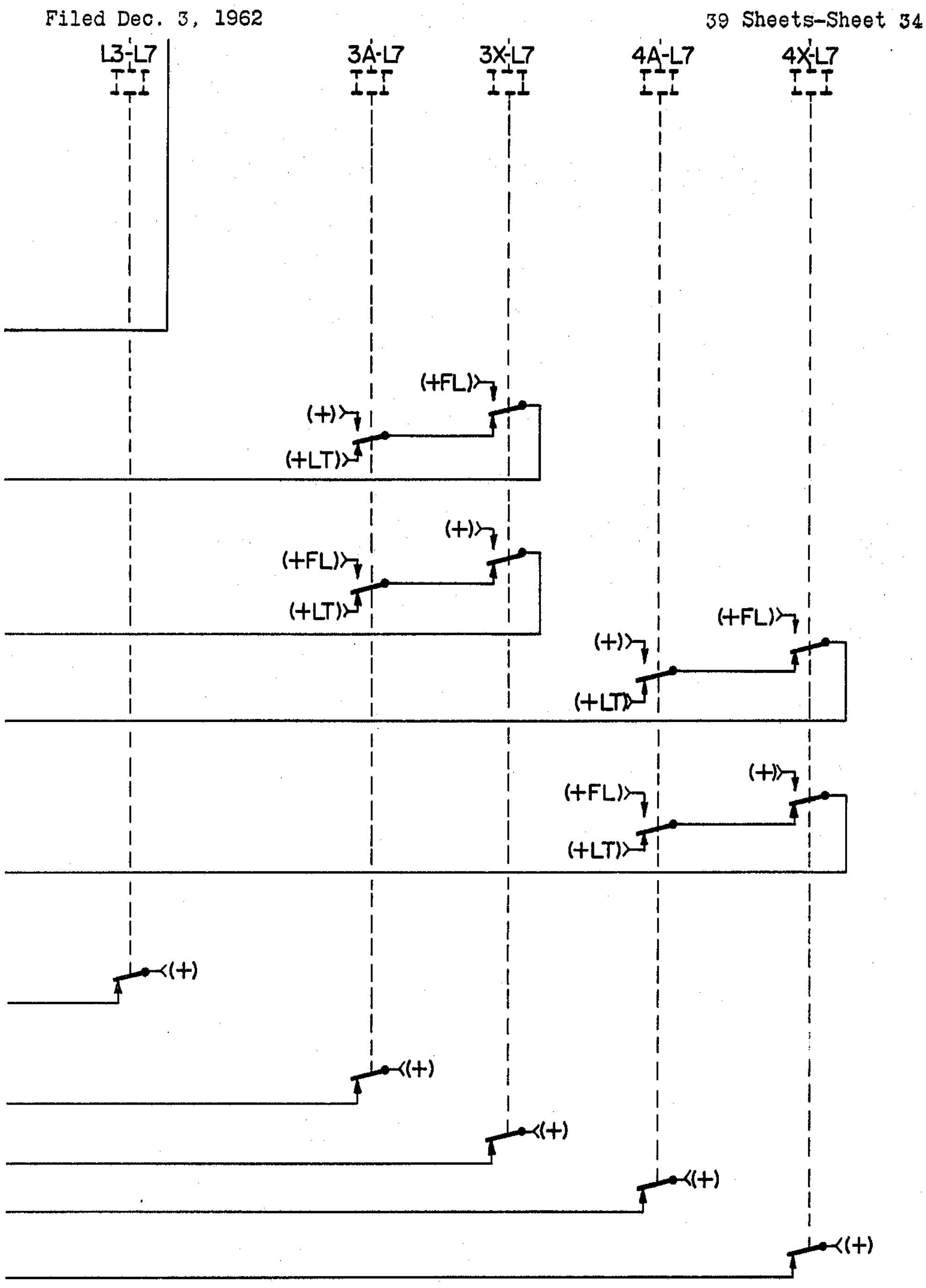
Figure 6E:
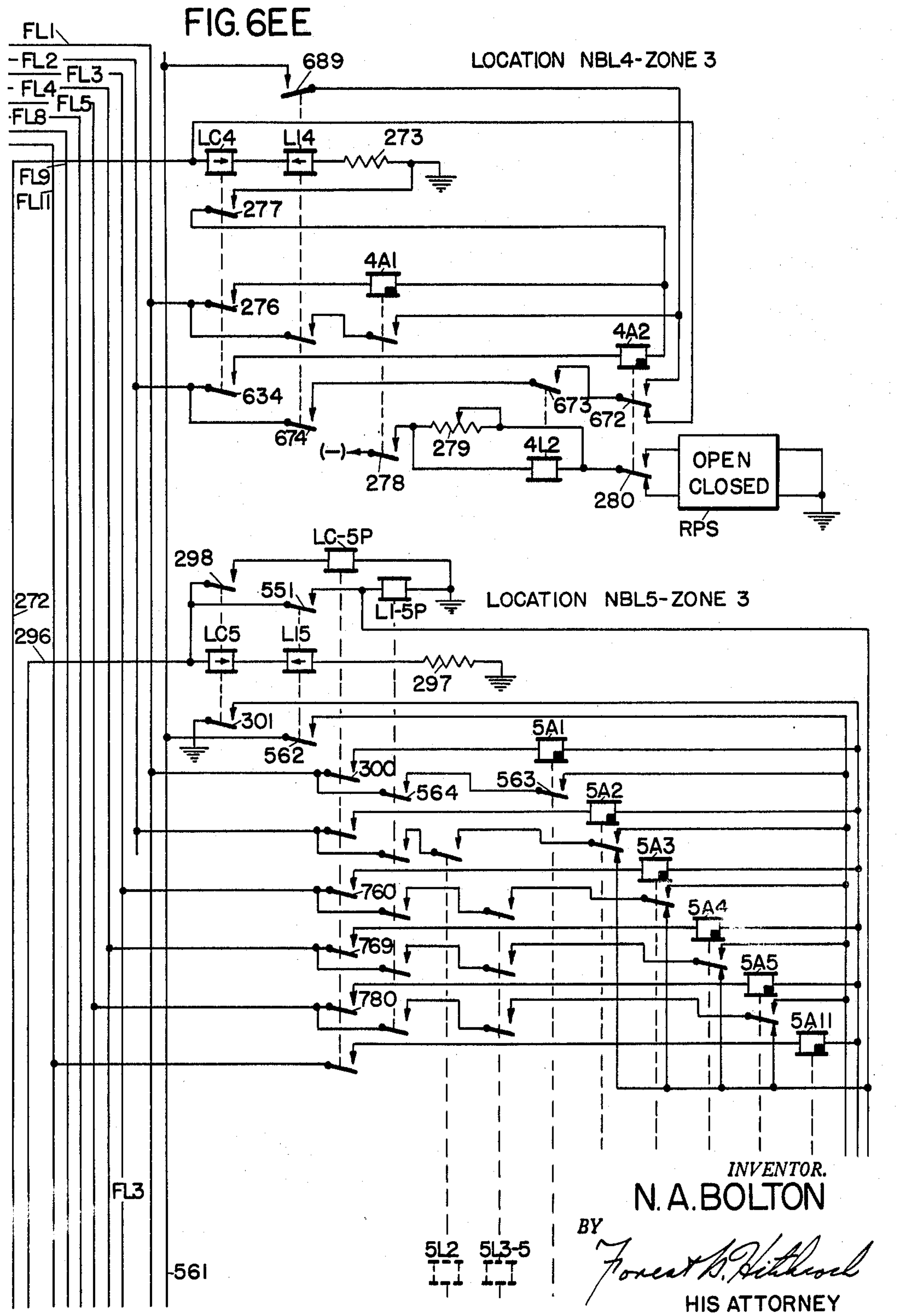
Figure 6F:
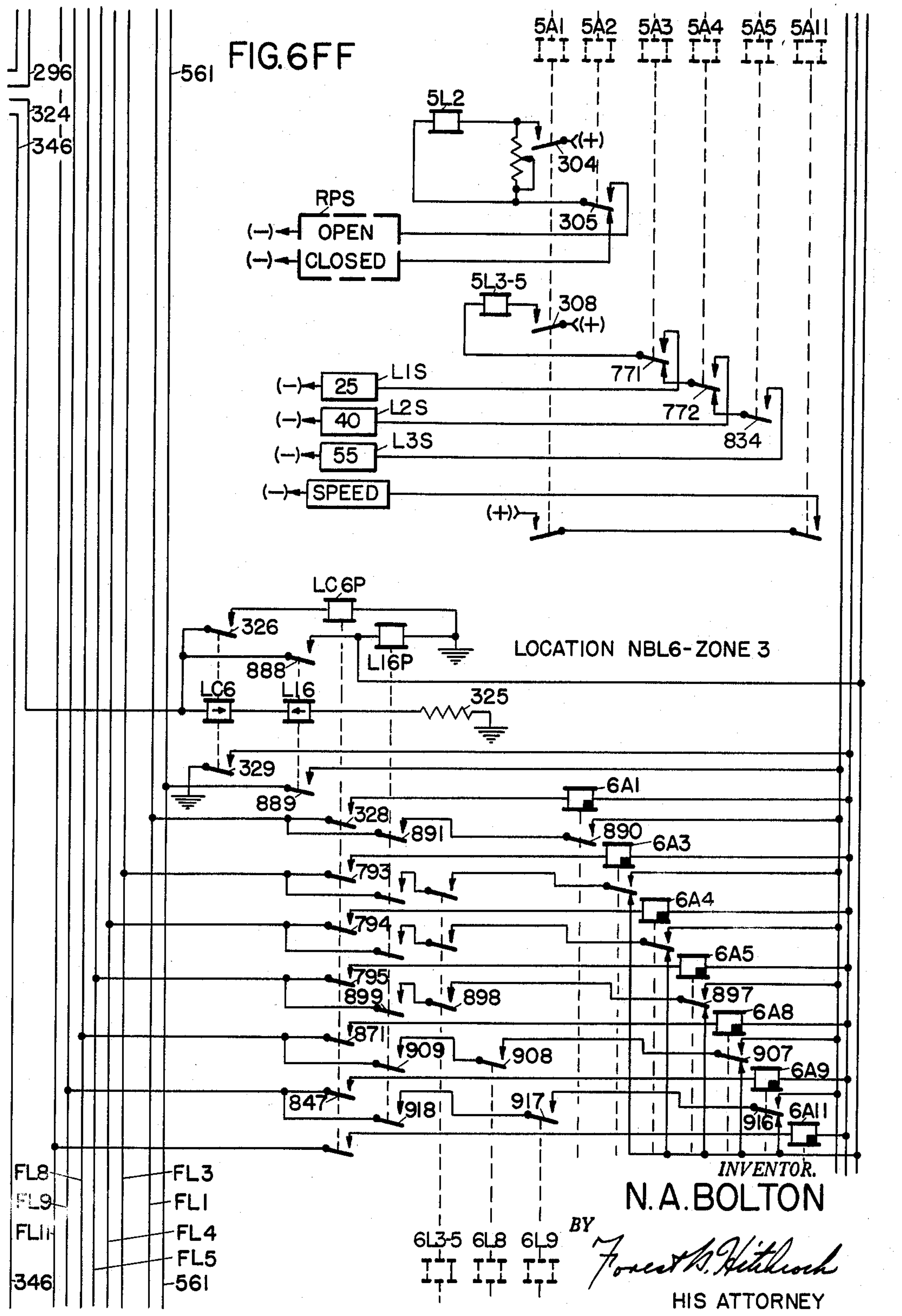
Figure 6G:
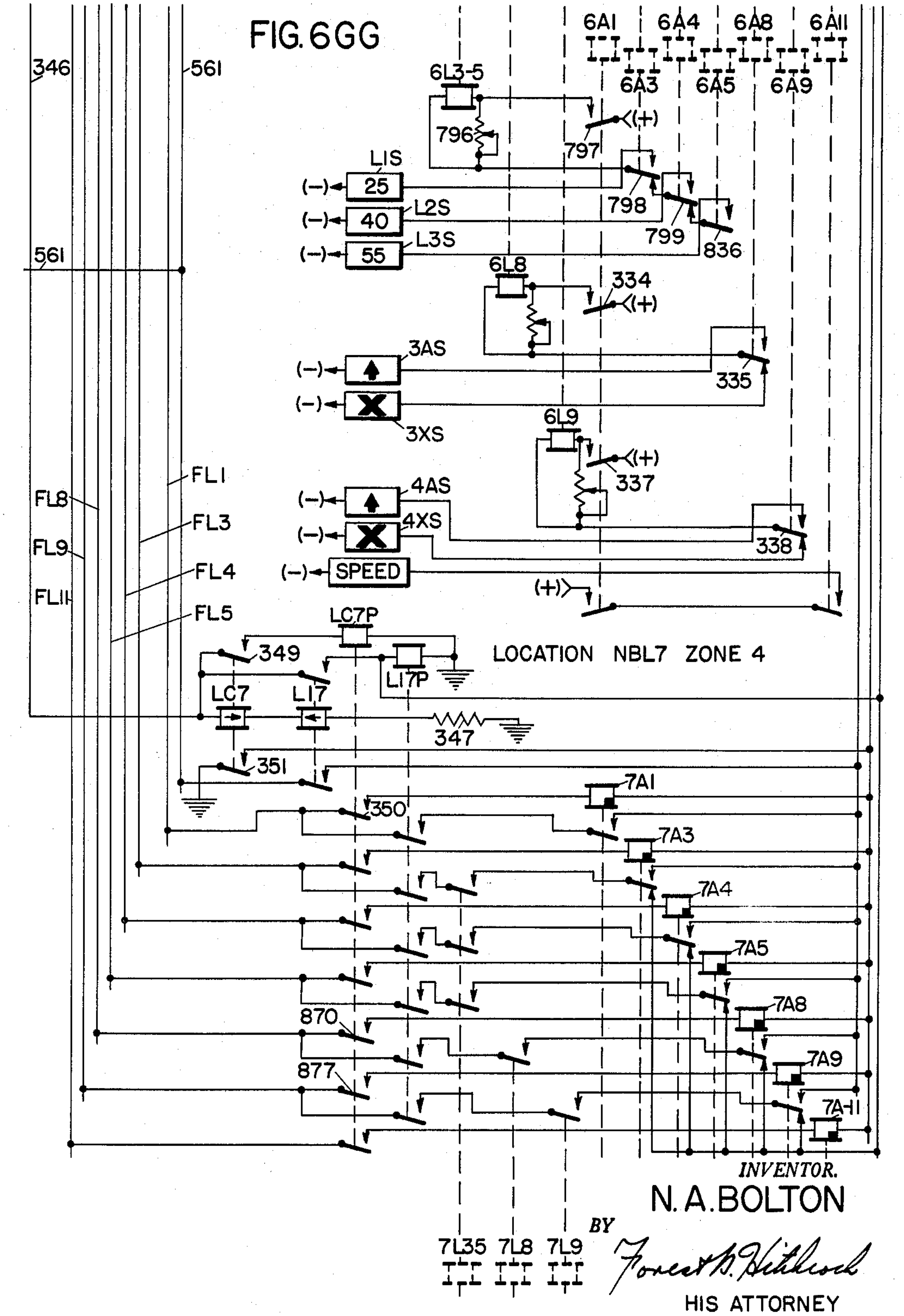
Figures 6H, 7:
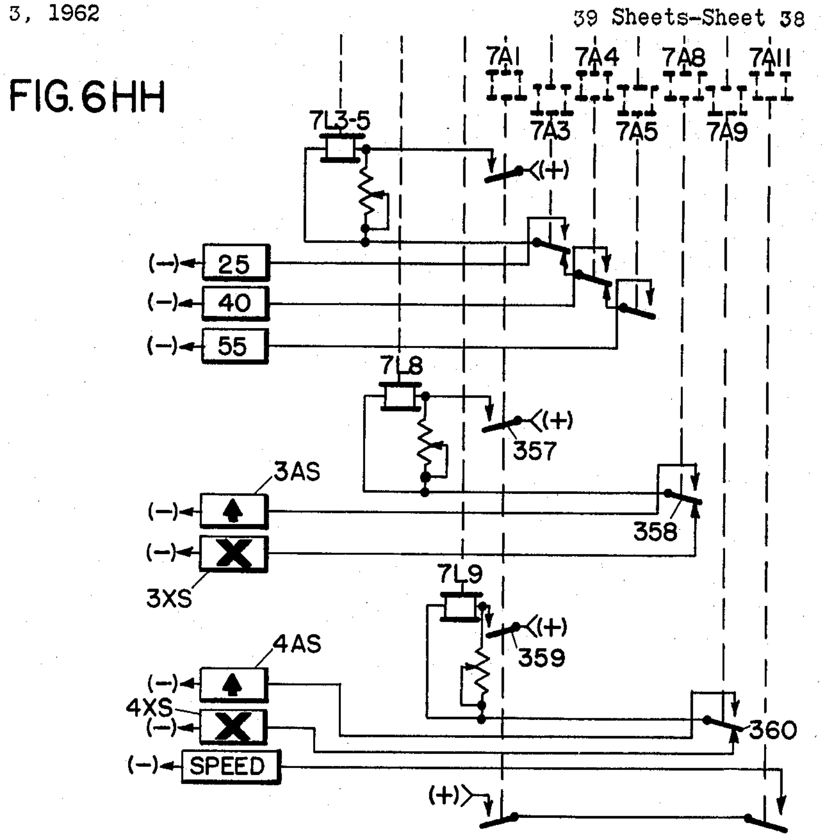
Figure 8:
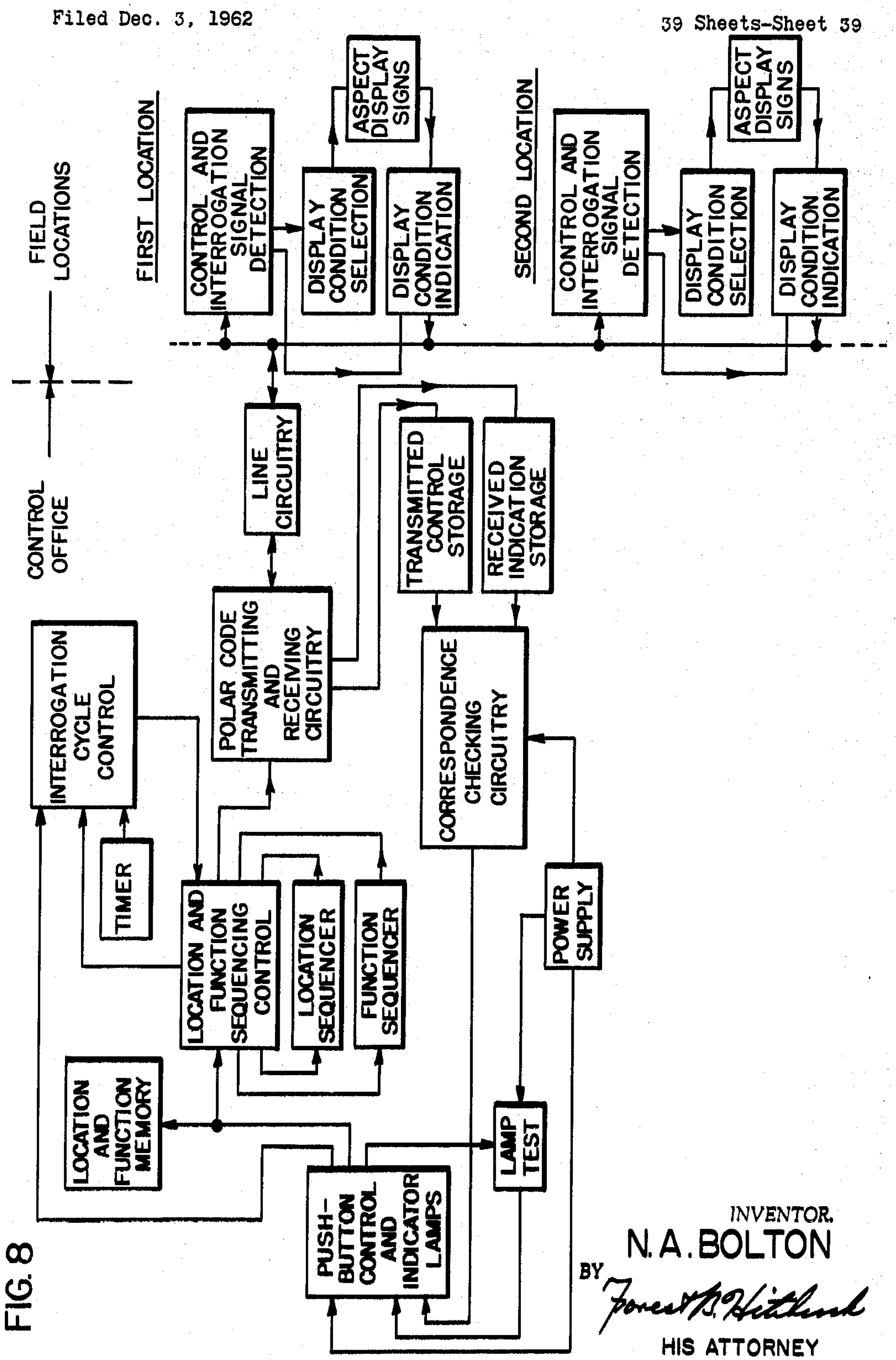

FIGS. 6A to 6Z and FIGS. 6AA to 6HH illustrate in part a typical circuit organization employed at the control office two zones partially defining the given length of multi-lane highway; and FIG. 7 shows in block form the arrangement of FIGS. 6A to 6Z and FIGS. 6AA to 6HH; and FIG. 8 is an operational block diagram illustrating general system operation for one embodiment of the present invention.

GENERAL ORGANIZATION

Figure 1:
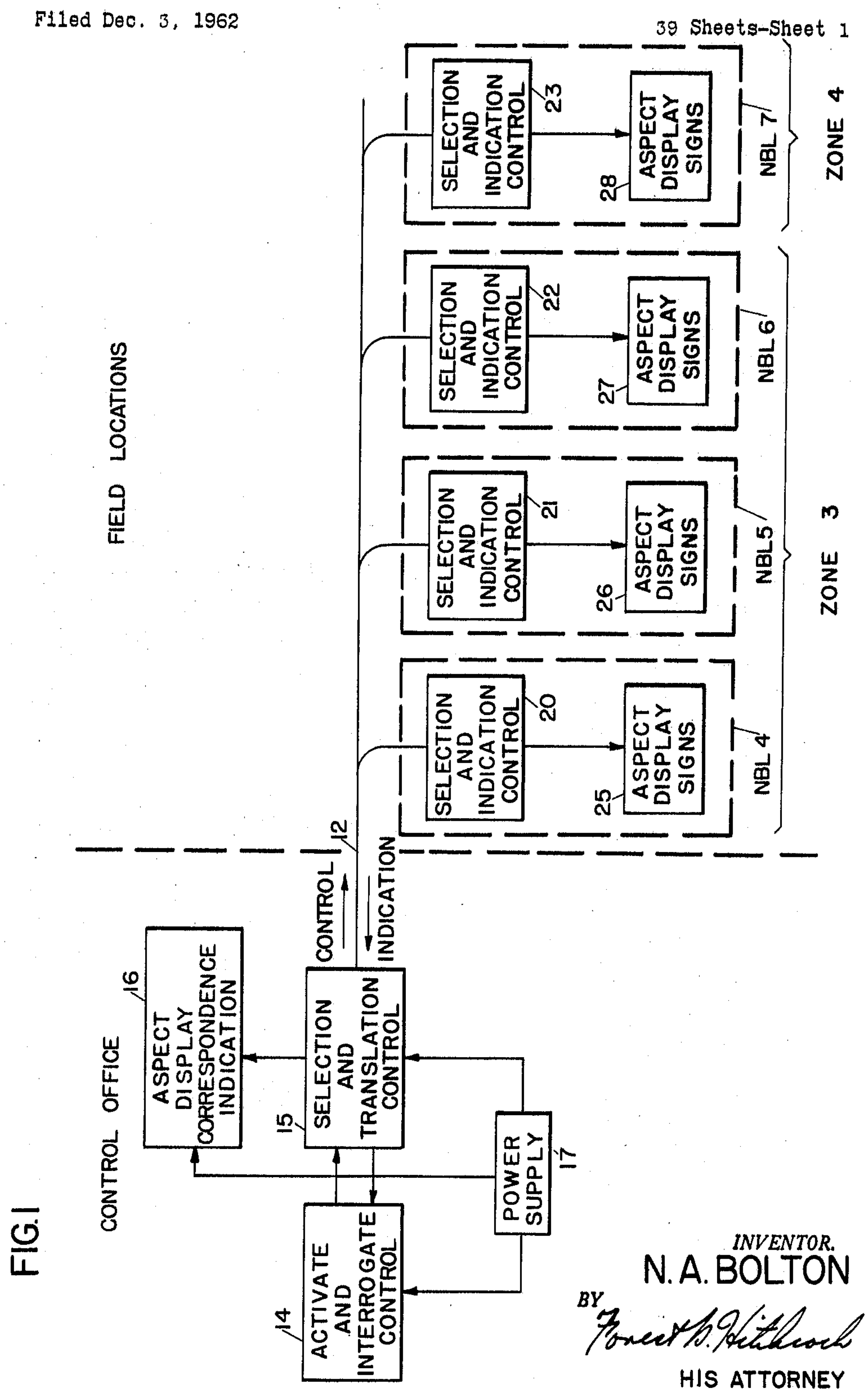
FIG. 1 is a block diagram illustrating the general organization of one embodiment of this invention.

Referring to FIG. 1, the general organization of the system disclosed herein includes a control office and a plurality of field locations interconnected by a transmission facility for control and indication signals. More particularly, control signals are transmitted from the control office over a transmission facility 12 to each selected field location, while indication signals are transmitted from each selected field location to the control office where they are compared with the stored control signals last transmitted for correspondence indication purposes. The transmission facility 12 may be a line wire circuit connecting selectively each field location to the control office, or, alternately, may be a form of code communication system such as a selective radio frequency system wherein selection of each field location requires a particular identifying code therefor.

Each of the control signals transmitted from the control office acts to perform an assigned function on a particular aspect display sign positioned at a selected location. Selective designation of control buttons included with an activate and interrogate control 14 establishes the control signals desired. A selection and translation control 15 responds to the selective designation of such control buttons by selecting the desired field locations as well as the sign functions and translating such selections into suitable control or indication codes suitable for transmission between the control office and selected field locations.

An aspect display correspondence indication 16 functions to provide distinctive visual indications to an operator relative to the existing condition of all aspect display signs positioned relative to the multi-lane highway. The indication signals transmitted from the plurality of field locations are received by selection and translation control 15 where each is respectively compared with the last control signal transmitted to the corresponding aspect display sign positioned at a given one of the plurality of field locations. As will be more fully described, control 15 includes a memory circuit for storing the last control signals transmitted to each sign at each field location and an indication memory circuit which receives the indication signals so that a comparison can be made between the stored and received signals. Power supply 17 functions to provide the necessary control energy for operating activate and interrogate control 14, selection and translation control 15, and aspect display correspondence indication 16.

The system of this invention is capable as shown to control twenty-six different field locations for northbound and southbound traffic movement, but it will be appreciated that the principles of operation hereof could be extended to include a substantially greater number of field locations. Of the twenty-six field locations provided for herein, field locations NBL4, NBL5, NBL6 and NBL7 only are shown in FIG. 1. All of such field locations relate to the northbound traffic flow direction as will be more fully described hereinafter. Moreover, locations NBL4, NBL5 and NBL6 comprise zone 3, while location NBL7 comprises zone 4.

Each of the field locations NBL4–NBL7 includes a selection and indication control which functions to receive control signals transmitted from the control office to the selected location for aspect display sign control and to store the existing indications corresponding to the operated position of the aspect display signs which are transmitted to the control office when called for thereby. More particularly, field locations NBL4, NBL5, NBL6 and NBL7 include selection and indication controls represented by blocks 20, 21, 22 and 23 respectively, while further including aspect display signs represented by blocks 25, 26, 27 and 28 respectively.

GENERAL OPERATIONAL DESCRIPTION

With reference to the operational block diagram of FIG. 8, the supervisory traffic control system provided by the present invention employs a plurality of control push buttons for selectively designating particular traffic directing signs and/or locations to be controlled remotely from the office. These control push buttons, are effective through suitable sequence control circuitry, to control the operation of a so-called location sequencer operable to a plurality of distinct conditions (one for each location being controlled from the office), and, a so-called function sequencer operable to a plurality of distinct conditions (one for each of the various functions or sign display to be remotely controlled from the office).

In accordance with the selected locations and/or functions designated by actuation of particular control push buttons, the location and function sequencers are thus operated in controlled sequence to conditions corresponding to each selected function and location, and, during the time that the sequencers are concurrently in a condition corresponding to a selected function and location, suitable polar code transmitting circuitry is rendered effective to transmit a distinctive polar signal, over suitable line circuitry, to properly control the selected location and function; i.e. to properly operate a particular traffic directing sign to a desired display aspect at a chosen point along the highway.

Inasmuch as the system of the present invention is intended for use in remotely controlling one or more traffic directing signs at one or more spaced locations along the highway, the system is operable in either of two distinct modes of operation, previously described; whereby the operator at the control office can perform his intended control of the remote display sign apparatus in a minimum time. For example, in the so-called location-function mode, the location sequencer is held in a condition corresponding to a designated location, while the function sequencer is advanced through its various function selecting conditions. This location-function mode is particularly useful when controlling a plurality of traffic directing signs at a single location. On the other hand, the system can also be operated in the so-called function-location mode wherein the function sequencer is held in a selected condition corresponding to a designated function, while the location sequencer is advanced through its various location selecting conditions. This function-location mode of operation is particularly useful when controlling a particular sign common to each of a plurality of spaced locations along the highway.

A suitable storage is provided at the control office for storing information distinctive of the particular function and location controlled during each control cycle of the system, as represented by the particular transmitted control signal sent to the field; whereas, during a predetermined interrogation cycle, the existing condition of the various remote display signs is interrogated and indicated back at the office where it is stored, for subsequent comparison with the stored information distinctive of the control information as transmitted. In accordance with this comparison, the correspondence is thereby checked between the actual and desired display condition of the remote highway traffic directing signs; which correspondence check is utilized, as will be described hereinafter, to control the illumination of suitable indicator lamps associated with the control push buttons to thereby indicate to the operator whether or not correspondence exists between the controls designated at the control office and the display aspects at the various field locations.

In the illustrated embodiment of the present invention, this interrogation cycle of operation can be initiated either manually or automatically. More specifically, the manual initiation is accomplished by the operator depressing a particular push button, whereas, the interrogation cycle is automatically initiated in either of two ways:

(1) At the completion of each control cycle of operation to make sure that the remote signs are operated properly in response to the polar control signals transmitted from the office, or, (2) Periodically at regularly timed intervals as controlled by a suitable timer to make sure that the control office apparatus is continually kept up-to-date concerning the display condition of each remote sign.

Figure 2:
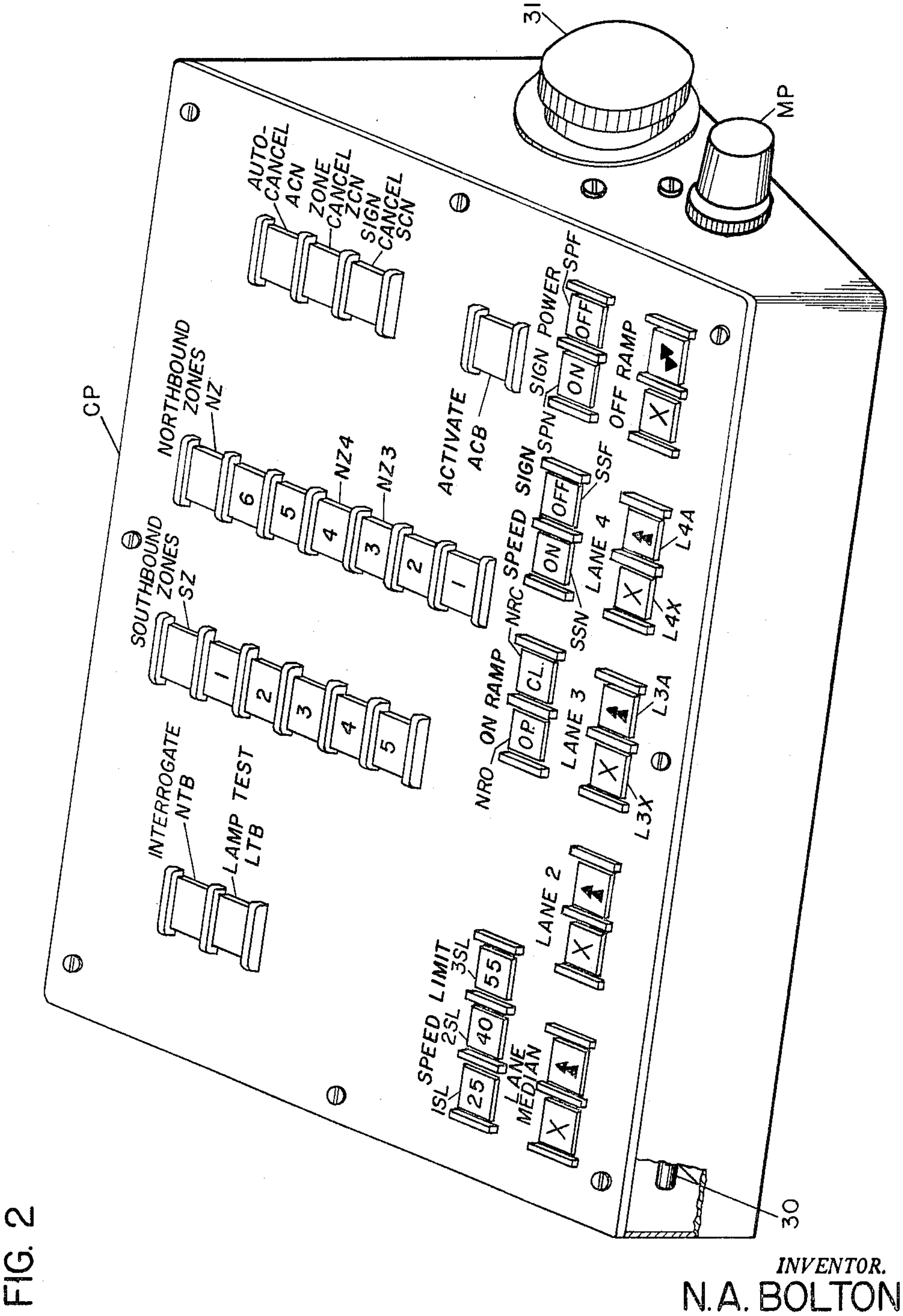
FIG. 2 is an isometric view of a control panel showing control buttons when designated distinctively for establishing control of the system of this invention.

In accordance with the foregoing general operational description, a suitable control panel CP having a plurality of control push buttons is specifically shown in FIG. 2. It has been mentioned that the plurality of field locations are assigned respectively to zones for each direction of vehicular flow wherein one or more field locations may comprise a zone with the number of zones in one direction of vehicular flow being variable with respect to the number of zones in the opposite direction of vehicular flow. On control panel CP, accordingly, control buttons for zones 1 through 6 are provided for northbound traffic, while control buttons for zones 1 through 5 are provided for southbound traffic, each control button being effective to select the field locations comprising that zone. For example, control button NZ3 when designated selects field locations NB4, NB5 and NB6 comprising zone 3, while control button NZ4 when designated selects field location NB7 comprising zone 4. For multiple zone selection, control button NZ functions when designated to select all northbound zones 1 through 6, while control button SZ functions when designated to select all southbound zones 1 through 5. In addition, the two directions of vehicular flow are considered to be northbound and southbound herein, but it should be understood that the two directions eastbound and westbound could as well be employed here.

A plurality of function control buttons are also provided on control panel CP, each when selected for causing a control signal to be transmitted to selected field locations for operating similar signs thereat. More specifically, a first group of three function control buttons represents "SPEED LIMIT." One function control button is provided for each of three speed limits in miles per hour indicated as "25," "40" and "55" with the control buttons being designated 1SL, 2SL and 3SL respectively. Such function control buttons are employed herein separately to select the indicated speed limit so as to operate similar aspect display signs at one or more selected field locations for thereby directing the speed of traffic flow in proximity to such selected field locations.

Another group of two function control buttons represents "ON RAMP." One control button is indicated as "OP" or open and designated NRO, while the other is indicated as "CL" or closed and designated NRC, such buttons when separately designated effective to control aspect display signs at selected field locations which are positioned at the entrance to a highway for permitting traffic to enter onto the highway through the ramp lane according to traffic flow conditions.

Another group of two function control buttons represents "SPEED SIGN" and includes one control button indicated as "ON" and designated SSN, while another button is indicated as "OFF" and designated SSF. Control buttons SSN and SSF are employed respectively to control the illumination of the word "SPEED" employed with each speed limit sign positioned on the highway during periods of poor visibility according to the selection of field locations.

Another group of two function control buttons represents "SIGN POWER" and includes one control button indicated as "ON" and designated SPN, while another button is indicated as "OFF" and designated SPF. Control buttons SPN and SPF are employed respectively to control the application of control energy from a power supply to all selected display signs positioned at the plurality of field locations.

The bottom row of function control buttons generally relates to lane indication aspect display signs. More particularly, the group of two control buttons at the lower left of control panel CP represents "LANE MEDIAN." Located to the right thereof is three groups of two control buttons each representing respectively "LANE 2," "LANE 3" and "LANE 4." For "LANE 3," such buttons are designated L3X and L3A, while for "LANE 4," such buttons are designated L4X and L4A. Located to the extreme right of control panel CP along the bottom row is another group of two control buttons representing "OFF RAMP." For each such group of control buttons, one button is designated with an "X," while the other button is designated with a pointed arrow. The above mentioned function control buttons are employed for controlling given signs at selected field locations for both northbound and southbound traffic directions to thereby regulate traffic flow.

The function control buttons designated respectively with an "X" and an arrow are employed when designated to control the illumination of aspect display signs used as lane signs at field locations in selected zones to alleviate condtions suggestive of traffic congestion. In this respect, the "OFF RAMP" lane signs are operated according to the conditions of traffic congestion which may occur on the ramp or in close proximity thereto. It is noted that the arrow for each lane sign when illuminated green is taken to mean herein that the lane is open for traffic flow, while the "X" for each lane sign when illuminated red is taken to mean herein that the corresponding lane is congested and that the driver must leave that lane as soon as it is safe to do so.

Other control buttons are provided to initiate selected operations of the system after zone control buttons and/or function control buttons are selected. An activate control button designated ACB is employed when selected to initiate the system operation responsive to selection of given function and zone control buttons. An interrogate control button designated NTB is employed when selected to cause the system to call for indications from the aspect display signs at all of the field locations or only those associated with northbound or southbound traffic according to selection of either zone control button NZ or SZ.

An auto-cancel control button designated ACN is employed when selected to cause stored function and zone selection information to be retained at the conclusion of system operation wherein control signals are transmitted to selected field locations, but functions to permit automatic release thereof when not so selected. A zone cancel control button designated ZCN is provided when designated for releasing stored zone information and sign cancel control button designated SCN is provided when designated for releasing the stored function information.

Included with each of the control buttons mentioned above is at least one lamp which is employed to indicate the condition of designation for that control button. These lamps and their specific functions will be considered hereinafter when typical circuits are described.

A master power switch designated MP located on the right side of panel CP is employed when operated to apply or remove control energy from all control office apparatus. A phone jack 30 (partially shown) located on the left side of panel CP is provided to facilitate voice communication between the operator of control panel CP and each of the plurality of field locations. A rotary control knob 31 located on the right side of panel CP is employed to adjust the brilliance of lamps employed as indicators on a display panel included with aspect display correspondence indication 16. Also, lamp test control button designated LT is employed to cause lamp test energy to be applied to all lamp indicators on the display panel which are not energized to indicate the condition of each such indicator.

Figure 3:
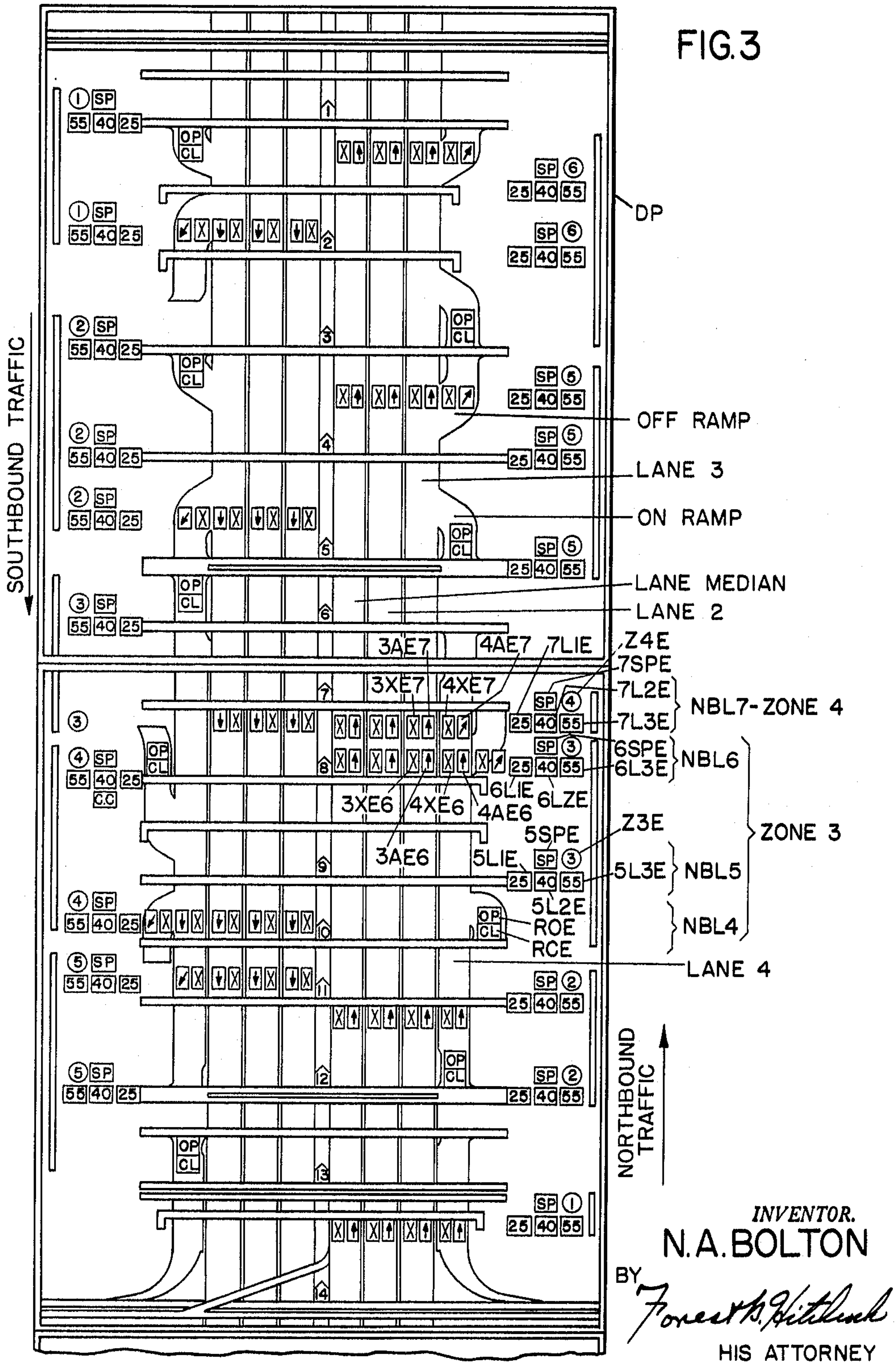
FIG. 3 is a front view of a display panel showing in miniature, a typical length of a multi-lane highway divided into sections and zones with identifying display indicators positioned relative thereto representative of traffic directing signs.

The aspect display correspondence indication 16 includes an indicator display panel DP (see FIG. 3) having in miniature diagram a multi-lane highway system described thereon for two directions of vehicular flow which are indicated to be northbound and southbound. Each direction of vehicular flow is divided into a plurality of zones with the multi-lane highway for northbound traffic being comprised of six zones, while the multi-lane highway for southbound traffic is comprised of five zones. Each of the zones for both northbound and southbound traffic includes at least one field location, but may include up to three field locations. As will be realized, more than three field locations may comprise a zone if desired. As described in connection with FIG. 1, zone 3 for northbound traffic comprises field locations NBL4, NBL5 and NBL6, while zone 4 also for northbound traffic comprises field location NBL7.

Each field location of the plurality of field locations comprising a given multi-lane highway system includes one or more aspect display signs as required to suitably direct the vehicular flow of traffic in the highway lengths governed by the aspect display signs. The indicator display panel DP thus includes at each field location diagrammatically represented thereon a number of display lamp indicators, each corresponding to one of the aspect display signs positioned at that field location. More particularly, at location NBL4 as represented on panel DP, an "ON RAMP" sign is provided which includes a lamp indicator ROE for ramp open sign "OP" and lamp indicator RCE for ramp closed sign "CL." In location NBL5, lamp indicators 5L1E, 5L2E and 5L3E are provided respectively for speed limit signs "25," "40" and "55." A lamp indicator 5SPE is provided for the speed sign represented as "SP." Lamp indicator Z3E is provided for indicating that zone information is stored for location NBL5. Location NBL6 includes lamp indicators 6L1E, 6L2E and 6L3E respectively for speed limit signs "25," "40" and "55" while also including lamp indicator 6SPE for the speed sign and indicator Z3E for location NBL6. Lamp indicators for the lane signs representing lane median, lanes 2, 3 and 4, and off ramp lane are provided. In particular, indicators 3AE6 and 3XE6 for lane 3 and indicator 4AE6 and 4XE6 for lane 4 are provided. Location NBL7 includes lamp indicators 7L1E, 7L2E and 7L3E respectively for the speed limit signs "25," "40" and "55," while also including lamp indicator 7SPE for the speed sign and indicator Z4E for location NBL7. Lamp indicators for the lane signs representing lane median and lanes 2, 3 and 4 are provided. In particular, indicators 3AE7 and 3XE7 for lane 3 and indicators 4AE7 for lane 4 are provided. Other display lamp indicators are provided as shown for the represented locations which correspond to the aspect display signs positioned at the particular field locations.

It has been mentioned above that a closed circuit television system is employed herein to convey the information to an operator so that he might employ the system of this invention. In display panel DP, the positions of television cameras 1 through 14 are suggested as being placed intermediate the opposite directions of vehicular flow so that each television camera can operatively scan a given area for opposite vehicular flow directions. For example, it is suggested that camera 9 be effective to scan the area for northbound traffic governed by location NBL6 and the area for southbound traffic governed by location SBL4. It is suggested that each television camera be positioned on a suitable support such as a bridge so that the highway lengths suggested by display panel DP may be operatively viewed.

As described above, control 15 causes control signals to be transmitted over transmission facility 12 to selected field locations for controlling particular aspect display signs thereat to an "ON" or "OFF" condition. The form of the invention described herein employs polar codes of positive (+) energy and negative (−) energy for the control signals transmitted to selected field locations for operating particular signs threat to "ON" or "OFF" conditions respectively. More particularly, each group of control buttons relating to a sign function described with reference to control panel CP of FIG. 2 is effective to establish a positive (+) energy "ON" control and a negative (−) energy "OFF' control.

Referring to FIG. 4, the sign functions generally mentioned above are designated as SF1–SF11 as shown. For example, sign function SF1 is assigned to "SIGN POWER." In conjunction with each sign function SF1–SF11, the polar code assignment is positive (+) energy for the control signals which operate each aspect display sign selected to an "ON" condition, while the polar code assignment is negative (−) energy for the control signals which operate each aspect display sign to an "OFF" condition. For example, sign function SF8 representing the sign function for lane 3 requires positive (+) energy for operating a selected lane sign to display an arrow, while requiring a negative (−) energy for operating a selected lane sign to display an "X."

FIG. 5 is a chart showing which of the sign functions SF1–SF11 are present at each of the field locations for both northbound traffic and southbound traffic. More specifically, an X is employed to indicate the sign functions SF1–SF11 employed at each of the locations for northbound traffic and southbound traffic such as described for locations NBL4, NBL5, NBL6 and NBL7. In addition, the type of switcher employed to effect control of the aspect display signs when receiving the control signals over facility 12 is indicated for each of the field locations listed. For example, locations NBL5 employs a speed-ramp type switcher indicated as S–R. The field locations as listed are assigned to the northbound and southbound zones into which the length of multi-lane highway is divided such as locations NBL4, NBL5 and NBL6 assigned to zone NBZ3.

DETAILED CIRCUIT ORGANIZATION

FIGS. 6A to 6Z and FIGS. 6AA and 6HH diagrammatically illustrate detailed circuits for the control office and selected field locations as one embodiment with which the objectives hereof may be achieved. More specifically, FIGS. 6A to 6Z and FIGS. 6AA to 6DD illustrate the detailed circuits for the control office which respond distinctively to designation of given control buttons on panel CP of FIG. 2 for transmitting control signals and to the reception of indication signals from selected field locations for operating lamp indicators included with the display panel DP of FIG. 3. FIGS. 6EE to 6HH illustrate the aspect display signs and detailed circuits provided for selective operation thereof for field locations NBL4, NBL5, NBL6 and NBL7 comprising zones 3 and 4 for northbound traffic. The arrangement of FIGS. 6A to 6Z and FIGS. 6AA to 6HH is shown in the block diagram of FIG. 7 for convenience.

It will be appreciated that the system hereof may be embodied by employing different types of electro-mechanical or electronic devices or circuits, but for the most part, relays have been used herein. Generally speaking, such relays take the form of "neutral," "polar-biased," and "magnetic-stick" relays, all of which are well known in the prior art. In setting forth the relays employed, singly and in combination, and their respective functions, reference is made to the specific figure or figures wherein such relays are located.

Initially, reference is made to FIGS. 6A, 6B, 6C, 6D, 6E and 6K wherein the control buttons described for the control panel CP of FIG. 2 are shown diagrammatically. For example, buttons SPN and SPF for "SIGN POWER" are shown diagrammatically in FIG. 6A. Each of the buttons so shown except buttons SCN and ZCN of FIG. 6K include a memory relay responsive to the designation of that control button for storing such condition of designation until released. These relays may be generally designated M. For example, the memory relay PNM stores the designated condition of sign power ON button SPN, while memory relay PFM stores the designated condition of sign power OFF button SPF.

A plurality of call relays generally designated C shown in FIGS. 6B, 6C, and 6E are employed to condition particular circuits for operation in response to memory storages according to the control buttons selected for the functions and zones on control panel CP. More particularly, function call relays PFC, SFC, RFC and LFC are provided respectively for the functions of power, sign, ramp and lane. Zone call relays NZC and SZC are provided respectively for northbound and southbound zones.

Activate memory relay AM (see FIG. 6J) stores the designated condition of activate button ACB (see FIG. 6C). Relays AC and ACP (see FIG. 6N) are activate relays controlled responsive to the operation of relay AM for a control cycle of operation, while relays NT, NT1 and NT2 (see FIG. 6J) are interrogate relays controlled responsive to designation of interrogate control button NTB (see FIG. 6C) for an interrogate cycle of operation. Interrogate relays NT, NT1, and NT2 operate in response to the manual operation of button NTB or automatically as governed by the operation of a timing relay TM (see FIG. 6J).

A location-function relay LFM (see FIG. 6M) functions to establish each of the two modes of operation for the system as mentioned above. In the dropped away position of relay LFM, the function-location mode of operation is effective, while relay LFM being picked up causes the system to operate in the location-function mode. Herein, the location-function mode of operation is employed for each control cycle wherein it is desired to control a speed limit sign at one or more selected locations and for each interrogation cycle of operation irrespective of whether it is initiated manually or automatically. Moreover, the function-location mode of operation is thus employed for all other control cycles of the system.

After each control cycle and automatically at timed intervals determined by relay TM, the positions of all aspect display signs relating to northbound and/or southbound traffic are interrogated in that northbound indication call relay NDC and/or southbound indication call relay SDC (see FIG. 6J) are controlled in response to an initiated control or interrogation cycle.

Northbound sequence relays NS and NSP (see FIG. 6N) and southbound sequnece relay SS (see FIG. 6R) establish control of the system for a control cycle or interrogation cycle so that control or interrogation of northbound field locations normally occurs first (before southbound control or interrogation, when both directions are selected) except where control signals are transmitted to only southbound field locations. Sequence complete relays NSC and SSC (see FIGS. 6N and 6R) for northbound and southbound respectively function to indicate the completion of a sequence operation for either a northbound or southbound sequence. Sequence complete relay SC (see FIG. 6V) functions to indicate the completion of either a northbound or southbound sequence operation.

Location sequence relays LS1, LS4–LS7, LS13 and their repeater relays LS1P, LS4P–LS7P, LS13P (see FIGS. 6I and 6M) partially comprise a location sequencer which functions to select given field locations relative to either northbound or southbound traffic. In other words, the same location sequencer is employed to select the northbound field locations for a northbound sequence cycle and to select the southbound field locations for a southbound sequence cycle. The location sequencer is only partially shown for typical operations to be described hereinafter. In particular, location relays for northbound or southbound locations are controlled in sequence depending upon the sequence of operation, i.e., northbound or southbound. In this embodiment, location relays NL4, NL5, NL6 and NL7 (see FIG. 6U) for locations NBL4–NBL7 are provided.

Function sequence relays FS1–FS11 and function sequence control relays FSA, OFS and EFS (see FIGS. 6H and 6L) comprise a function sequencer which functions to select sign functions as described with reference to FIGS. 2, 3, 4 and 5. Function sequence relays FS1–FS11 correspond respectively to sign functions SF1–SF11. Function relays F1–F5, F8, F9 and F11 (see FIG. 6P) indicate the sign function for which control signal energy is transmitted to one or more selected field locations while also completing other signal circuits at the control office.

For the location sequencer, a locations waiting relay LW (see FIG. 6V) is employed to indicate whether or not the system wants to transmit control signals to one or more field locations, while a locations sequence ready relay LSR (see FIG. 6M) functions to indicate that the location sequencer is advanced to one of such field locations. For the function sequencer, a functions waiting relay FW (see FIG. 6P) functions to indicate whether or not the system wants to transmit control signals for one or more sign functions, while a functions sequence ready relay FSR (see FIG. 6L) functions to indicate that the function sequencer is advanced to a condition where control signals for a sign function may be transmitted.

Sequence time relays ST and STP (see FIG. 6Q) are employed to advance or step the location sequencer and/or function sequencer circuits according to the conditions respectively of relays LW and FW until both are positioned whereat control signal energy is transmitted for a control cycle or indication signal energy is received for an interrogation cycle. In either case, a control time relay CT (see FIG. 6M) functions to allow sufficient time for transmission between the control office and a field location.

A positive polarity analyzer relay PPA with its repeater relay PAP and a negative polarity analyzer relay NPA with its repeater relay NAP (see FIG. 6O) are employed to establish the polar line energy of (+) ON energy or (−) OFF energy which is to be transmitted to a selected field location for a sign function. Repeater relays PAP and NAP function to establish control circuits at the control office depending on which of the relays PPA or NPA is picked up. For a control cycle, either relay PPA or NPA and its repeater relay are picked up according to the function control buttons designated and position of the function sequencer. For an interrogation cycle, a positive energy memory relay PEM (see FIG. 6I) functions to supply positive (+) energy to the field locations for indication purposes.

Each of a plurality of control memory relays of the magnetic-stick type (see FIGS. 6S and 6W), one for each aspect display sign at each of the field locations, functions to store the condition corresponding to the last control signal energy transmitted to that field location having the aspect display sign. For example, and referring to FIG. 6W, relay L6–3A stores the condition corresponding to the control signal last transmitted to northbound location NBL6 and the lane sign thereat for lane 3 until changed.

Each of a plurality of indication memory relays of the neutral type (see FIGS. 6S, 6W and 6AA), one for each aspect display sign at each of the field locations, functions to store an indication signal received during an interrogation cycle from a particular aspect display sign located at a selected field location. For example, and referring to FIG. 6AA, relay 3A–L6 stores the condition corresponding to the indication signal energy received during an interrogation cycle from location NBL6 and the lane sign thereat for lane 3 until released. A plurality of comparison circuits employing contacts of the control memory relays and indication memory relays (see FIGS. 6T, 6U, 6X, 6Y, 6Z, 6BB, 6CC and 6DD) function to control distinctively the energization of the lamp indicators described above for locations NBL4, NBL5, NBL6 and NBL7 located on display panel DP.

An out-of-correspondence relay OCR (see FIG. 6D) functions to indicate whether at least one condition of out-of-correspondence exists between the positions of a control memory relay and the corresponding indication memory relay for a particular aspect display sign. In any event, where an out-of-correspondence condition exists, a bell BL is controlled to provide an audible indication that such out-of-correspondence condition exists after the completion of the interrogation cycle. In addition, flashing relays FL and FLP function in response to the control of relay OCR to provide flashing energy for the lamp indicators in the indicator display panel DP to indicate visually that a condition of out-of-correspondence exists. This may occur during a control cycle where the operation of each selected aspect display sign at a field location is changed from one existing position to another position and where an actual condition of out-of-correspondence exists during an interrogation cycle of operation. Lamp test relay LTR (see FIG. 6A) responds to the designation of button LTB for providing lamp test energy (+LT).

Reset relays are employed with both the location sequencer and function sequencer to cause such sequencers to be reset to an initial condition upon completion of a sequencing cycle. More particularly, a ready locations reset relay RLR and locations reset relay LR (see FIG. 6V) function, respectively, to indicate that a location sequencing cycle is in progress and to indicate that the location sequencing cycle is completed which causes resetting of the location sequencer. Similarly, a ready function reset relay RFR and a functions reset relay FR (see FIG. 6R) function, respectively, to indicate that a function sequencing cycle is in progress and to indicate that the function sequencing cycle is completed which causes resetting of the function sequencer.

A clear out relay CO (see FIG. 6F) functions to reset the function sequencer and location sequencer when it is desired to interrupt an existing interrogation cycle or where a malfunction of one of the sequencers occurs so that the system again assumes an initial operating condition whereat a control cycle may be initiated.

In various circuits, control lamps are employed which function to indicate to an operator the existing condition of operation of the system. More particularly, these control lamps are employed with some of the control buttons shown on control panel CP of FIG. 2. Such control lamps will be hereinafter considered separately when typical operations are described.

In FIGS. 6EE, 6FF, 6GG and 6HH, the apparatus for locations NBL4, NBL5, NBL6 and NBL7 each including different groups of relays comprising the selection and indication control and aspect display signs is shown. More particularly, each of the field locations includes a location control relay which is responsive to positive (+) control energy transmitted from the control office for selecting that field station during a control cycle and a location indication relay which is responsive to negative (−) control energy also transmitted from the control office during an interrogation cycle. For location NBL5, for example (see FIG. 6EE) control relay LC5 as shown responds to positive (+) control energy, while location indication relay LI5 responds to negative (−) control energy. In each of the locations NBL5, NBL6 and NBL7, the control and indication relays each includes a repeater relay which functions to provide contact circuits which are employed to control function application relays responsive to the function control signals transmitted to the field location for operating the respective aspect display signs. For location NBL5, for example, these relays are designated LC5P and LI5P. Location NBL5 also includes function application relays 5A1, 5A2, 5A3, 5A4, 5A5 and 5A11 which correspond to sign functions SF1, SF2, CF3, SF4, SF5 and SF11, respectively. In addition, each field location includes load current relays each of which functions to detect the lack of energizing current through a corresponding sign when it in some way malfunctions. For location NBL5, for example, load current relays 6L3–5, 6L8 and 6L9 (see FIG. 6GG) function to detect any malfunction of respective signs L1S, L2S and L3S, 3AS and 3XS, and 4AS and 4XS.

Due to the complexity of the circuits shown in FIGS. 6A–6Z, and 6AA to 6HH, it is believed that the nature of the invention, its advantages and characteristic features can be best understood with further description be set forth from the standpoint of typical operations for several control cycles which are representative of the system operation as well as interrogation cycles initiated both manually and automatically also representative of system operation.

TYPICAL OPERATIONS

*Power on condition*

It is mentioned above that the control office includes control relays of the magnetic-stick type, one for each sign for storing a condition representing the last control signal energy transmitted to that sign and that each field location includes application relays of the magnetic-stick type for storing a condition representing the last control signal energy received from the control office. Inasmuch as each such magnetic-stick relay remains in its last operated condition even though energy thereto is removed, it is possible that the system when inactive could be in the condition where one or more of such relays is in its picked up condition. Thus, only when all of such relays are dropped away is the system in a completely inactive or at-rest condition. Initially, it is assumed that the system is in a completely at-rest condition.

Thus, to operate a selected sign at one or more field locations, it is first necessary to supply sign power to all signs at the field locations before such control can be effected. To accomplish this, the operator actuates the master power switch MP so that contact MPC (see FIG. 6A) is located in the "ON" position. The button SNP is then actuated while further actuating zone buttons NZ and SZ (see FIG. 6C) prior to actuating the activate button ACB. The controls are thus established for causing the control office apparatus to cause sign power to be partially connected to all aspect display signs at the field locations for both northbound and southbound traffic flow in that the application relay corresponding to sign function SF1 for each field location is picked up.

Initially, with contact MPC of switch MP in the "ON" position, a circuit is completed for picking up master power memory relay MPM. Such circuit extends from (+), through contact MPC, through the winding of relay MPM, to (−). (+) energy is then supplied to the circuits at the control office through front contact 37 of relay MPM. It is here pointed out that the circuits shown in FIGS. 6A to 6Z and FIGS. 6AA to 6DD pertaining to the control office to which (+) is connected is initiated through front contact 37 of relay MPM. It is further suggested here that the (+) control energy may be greater or less than that indicated by the use of suitable transformers where the circuits require such energy levels, while such (+) control energy may be supplied through contacts of particular relays for specific uses where circuits controlled thereby are subject to the existing condition of such relays. Such control energy circuits will be hereinafter described.

As will be described in more detail hereinafter, the relay ACP of FIG. 6N is utilized to control the application of operating energy to various detailed circuits disclosed in the drawings; which energy is, for example, designated by the symbols (F+), (PB+) and (Z+).

In respect to the application of control energy, relay PNM in FIG. 6A is picked up by a circuit extending from (+), through closed contact 39 of control button SPF, through closed contact 40 of control button SPN, through the upper winding of relay PNM, to (−). A stick circuit is completed which extends from (F+), through back contact 41 of relay PFM, through front contact 42 of relay PNM, through the upper winding of relay PNM, to (−). It is noted here that the memory relay for each of the control buttons shown diagrammatically in FIGS. 6B, 6D and 6E is controlled similarly to that described for memory relay PNM of button SPN. With relay PNM picked up, a lamp 45 included with button SPN is energized by a circuit extending from (+), through front contact 44 of relay PNM, through the filament of lamp 45, to (−). Such lamp 45 when illuminated functions to indicate the stored condition of the actuated button SPN. Power function call relay PFC (see FIG. 6B) is picked up by a circuit extending from (+), through front contact 46 of relay PNM, through the winding of relay PFC, to (−).

Referring to FIG. 6C, upon actuation of button NZ, relay NZM is picked up by a circuit extending from (PB+), through back contact 49 of button NZ, through the winding of relay NZM, to (−). The pick-up of relay NZM completes a pick-up circuit for each zone relay relating to northbound traffic flow. Only relays Z3M and Z4M for zones 3 and 4 respectively are included herein. The pick-up circuit for relay Z3M extends from (+), through front contact 51 of relay NZM, through the winding of relay Z3M, to (−). The pick-up circuit for relay Z4M extends from (+), through front contact 52 of relay NZM, through the winding of relay Z4M, to (−). Relays Z3M and Z4M are stuck through respective front contacts 54 and 53 from (Z+) energy. Each of the relays Z3M and Z4M when picked up causes a lamp associated with the corresponding control button to be energized for indicating the stored condition of that memory relay. For example, lamp 55 for relay Z3M and button NZ3 is energized through front contact 56 of relay Z3M. Also, zone lamps Z3E and Z4E for zone relays Z3M and Z4M are energized to provide an indication to the operator via display panel DP that zone information is stored for zones 3 and 4. Zone lamps Z3E, for example, have their energizing circuits completed through front contact 58 of relay Z3M. It is noted here that the actuation of button NZ and the subsequent pick up of relay NZM is sufficient to control all zone relays and associated lamps relating to northbound zones. Moreover, similar zone selection is made for each of the southbound zones 1–5 as well as all southbound zones, but these control circuits are not provided herein, so as to simplify the illustrations and facilitate the disclosure, in that they are substantially the same as the corresponding circuitry just described for northbound zone selection.

Each of the zone memory relays Z3M and Z4M when picked up completes a pick-up circuit for a northbound zone call relay NZC which is picked up as long as at least one such memory relay remains picked up. For example, one pick-up circuit is completed from (+), through front contact 59 of relay Z3M, through the winding of relay NZC, to (−). Similarly, a southbound zone call relay SZC is picked up as long as at least one southbound zone memory relay is picked up in response to actuation of control button SZ.

With activate button ACB now actuated, a pick-up circuit for activate memory relay AM (see FIG. 6J) is completed from (+), through closed contact 60 of button ACB, through front contact 61 of relay PFC, through front contact 62 of relay NZC and through front contact 63 of SZC, over wire 64, through the winding of relay AM, to (−). A lamp 32 associated with button ACB for indicating (red illumination) the picked up condition of relay AM and thus a control cycle storage is energized by a circuit extending from (+), through front contact 82 of relay AM, over wire 83, through back contact 88 of relay ACP, over wire 89, through the filament of lamp 32, to (−). Activate relays AC and ACP (see FIG. 6N) are subsequently picked up. The pick up circuit for relay AC extends from (+) in FIG. 6V, through back contact 67 of relay LR, through back contact 68 of relay RLR, over wire 69, through back contact 70 of relay FR, through back contact 71 of relay RFR, through back contact 72 of relay SSC, over wire 73, through back contact 74 of relay NSC, over wire 75, through front contact 76 of relay AM, through back contact 77 of relay NT2, over wire 78, through the upper winding of relay AC, to (−). A stick circuit for relay AC extends from (+) in FIG. 6V, through back contact 430 of relay SC, over wire 425, through front contact 426 of relay AC, through the lower winding of relay AC, to (−). Capacitor 427, charged through resistor 428 and front contact 426 of relay AC, controls the release thereof. The pick up circuit for relay ACP extends from (+), through front contact 80 of relay AC, through the winding of relay ACP, to (−). The lamp 32 is now deenergized at back contact 88 of relay ACP, but an activate lamp 135 associated with button ACB for indicating (yellow illumination) the picked up conditions of relays AC and ACP is energized by a circuit extending from (+), through front contact 133 of relay ACP, over wire 134, through the filament of lamp 135, to (−).

The pick up of activate relays AC and ACP also cause other circuits to be completed. Northbound sequence relay NS (see FIG. 6N) is picked up by a circuit extending from (+), through front contact 84 of zone call relay NZC, over wire 85, through front contact 86 of relay AC, through back contact 87 of northbound sequence complete relay NSC, through the upper winding of relay NS, to (−). A pick up circuit is also completed for southbound sequence relay SS (see FIG. 6R) which extends from (+), through front contact 90 of relay SZC (which is energized in response to actuation of control button SZ, as previously described), over wire 91, through front contact 92 of relay ACP, over wire 93, through back contact 94 of relay SSC, through the winding of relay SS, to (−). Each of such relays when energized completes a pick-up circuit for a repeater relay; e.g. in accordance with the picking up of relay NS, a pick-up circuit is completed for relay NSP which extends from (+), through front contact 96 of relay NS, through the winding of relay NSP, to (−). A similar repeater relay for relay SS has not been shown inasmuch as only the southbound relays necessary to complete the circuit logic have been included herein.

Responsive to the pick up of relay AC, functions waiting relay FW (see FIG. 6P) is picked up by a circuit extending from (+), through front contact 98 of relay AC, over wire 99 leading to FIG. 6I, through front contact 100 of relay PNM, over wire 101, through back contact 102 of relay FS1, over wire 103, through back contact 104 of relay FR, through the winding of relay FW when, to (−). Relay FW thus picked up functions to indicate that control signals are waiting to be transmitted to selected field locations. In addition, a pick-up circuit for control time relay TC (see FIG. 6M) is completed from (+), through front contact 106 of relay AC, through back contact 107 of relay FSR and back contact 108 of relay LSR connected in shunt, through the winding of relay CT, to (−). A capacitor 110 is charged through a resistor 111 and the circuit described. As charged, capacitor 110 controls the release time of control time relay CT as will be more fully described.

Responsive to the pick up of relay ACP, northbound indication call relay NDC and southbound indication call relay SDC (both illustrated in FIG. 6J) are picked up. More particularly, relay NDC is picked up by a circuit extending from (+), through front contact 114 of relay ACP, over wire 115, through front contact 116 of relay NZC, over wire 117, through the winding of relay NDC, to (−). Relay SDC is picked up by a circuit extending from (+), through front contact 119 of relay ACP, over wire 120, through front contact 121 of relay SZC, over wire 122, through the winding of relay SDC, to (−). In response to the pick up of either relay NDC or relay SDC, a lamp 130 included with interrogate button NTB is energized (illuminated red) by a circuit extending from (+), through front contact 126 of relay NDC or front contact 131 of relay SDC, through back contact 127 of relay NT2, over wire 128, through the filament of lamp 130, to (−) to indicate that a control cycle is in progress and that an interrogate cycle will be initiated automatically upon completion thereof.

Moreover, responsive to the pick up of relay ACP, (PB+) energy normally supplied through back contact 124 of relay ACP is now disconnected so that the circuits described requiring (PB+) energy are now ineffective. Activate (A+) energy is now supplied through front contact 124 of relay ACP to necessary circuits.

The pick up of northbound sequence repeater relay NSP completes a pick up circuit for the locations waiting relay LW through back contacts of relays LS4P–LS7P and LS13P shown in FIGS. 6I and 6M. More particularly, one such circuit extends from (A+), through front contact 138 of relay PFC, through front contact 139 of relay Z3M, over wire 140, through front contact 141 of relay NSP, over wire 142, through back contact 143 of relay LS4P, over wire 144, through back contact 145 of relay LR, through the winding of relay LW, to (—). Similar pick-up circuits may be traced for relay LW through back contacts of relays LS5P, LS6P, LS7P and LS13P. A stick circuit for relay LW is completed from (+), through front contact 147 of relay CT, over wire 148, through front contact 149 of relay LW, through the winding of LW, to (—).

With relays FW and LW now picked up, the system will operate to transmit a control signal for sign function SF1 to each northbound and southbound field location in sequence for thereat operating an application relay corresponding to sign function FS1 to thereby partially connect control energy for operating thereafter respective aspect display signs. In this respect, location-function mode relay LFM remains dropped away so that the system will operate in the function-location mode having the general manner of operation described above. Inasmuch as northbound locations NBL4, NBL5, NBL6, and NBL7 only have been shown herein, circuits therefor have been provided for transmitting control signals to such particular field locations which are typical of circuits for other locations not so shown.

Initially, a pick-up circuit for sequence timing relay ST (see FIG. 6Q) is completed and extends from (+), through front contact 152 of relay LW, over wire 153, through front contact 154 of relay FW, over wire 155, through back contact 156 of relay FSR and back contact 151 of relay LSR, over wire 157, through back contact 158 of relay STP, through the winding of STP, to (—). The same circuit charges a capacitor 160 through a resistor 161, the discharge of which is employed to control the release time of relay ST. Relay STP is picked up by a circuit completed from (+), through front contact 163 of relay ST, through the winding of relay STP, to (—). A capacitor 164 is charged by the same circuit through a resistor 165, the discharge of which is used to control the release time of relay STP.

In response to the pick up of relay ST, the function sequencer circuitry of FIGS. 6H and 6L is controlled to the condition where relay FS1 is picked up. More particularly, relay OFS is initially picked by a circuit extending from (+), through back contact 168 of relay FSR, over wire 169, through front contact 170 of relay ST, over wire 171, through back contact 172 of relay FSA, through back contact 173 of EFS, through the winding of relay OFS, to (—) and is then stuck through its front contact 179. Relay FSA is subsequently picked up by a circuit extending from (+), through front contact 178 of relay OFS, through the winding of relay FSA, to (—). A stick circuit therefor is completed from (+), through back contact 159 of relay FR, over wire 162, through back contact 166 of relay EFS, through front contact 167 of relay FSA, through the winding of relay FSA, to (—). Relay FS1 then has its pick-up circuit completed from (+), through front contact 175 of relay OFS, through back contact 176 of relay FS2, through the winding of relay FS1, to (—). A stick circuit for relay FS1 is completed from (+), through back contact 180 of relay FR, over wire 181, through front contact 182 of relay FS1, through the winding of FS1, to (—). Upon pick up of relay FS1, a pick-up circuit for function relay F1 is completed from (+), through back contact 185 of relay EFS, through front contact 186 of relay FS1, through back contact 187 of relay FS2, over wire 188, through the winding of relay F1 (see FIG. 6P), to (—). The function relay F1 as picked up stores the condition that the sign function SF1 is called for. To more particularly indicate this storage, a lamp 190 is energized through a front contact 191 of relay F1.

Also in response to the pick up of relay ST, the location sequencer circuitry of FIGS. 6I and 6M is controlled to the condition where relay LS1 and its repeater LS1P are picked up. Initially, relay LS1 is picked up by a circuit extending from (+), through back contact 194 of relay LSR, over wire 195, through front contact 196 of relay ST, over wire 197, through back contact 198 of relay LS13P, through back contacts of other repeater relays (not shown) indicated at 199, through back contact 200 of relay LS7P, over wire 201, through back contact 202 of relay LS6P, through back contact 203 of LS5P, through back contact 204 of relay LS4P, through back contacts of other repeater relays (not shown), indicated at 205, through back contact 206 of relay LS1P, through the winding of relay LS1, to (—). Repeater relay LS1P then has its pick-up circuit completed through front contact 208 of LS1. A stick circuit is completed for relay LS1 which includes the circuit described for energizing relay LS1, front contact 206 of relay LS1P and front contact 209 of relay LS1. Also, a stick circuit is completed for relay LS1P which extends from (+), through back contact 211 of relay LR, over wire 212, through front contact 213 of relay LS1P, through the winding of relay LS1P, to (—).

As mentioned above, the purpose of function sequence ready relay FSR is to indicate when the control office apparatus is ready to transmit a control signal representing a selected sign function, while the purpose of the location sequence ready relay LSR is to indicate when the location sequencer has advanced to a position corresponding to the field station requiring control signals. When both relays FSR and LSR are concurrently picked up, such transmission occurs. A pick-up circuit for relay FSR is completed in response to the pick up of relay FS1 as described above. More particularly, the circuit extends from (+), through front contact 98 of relay AC, along wire 99 to the left in the drawings, through front contact 100 of relay PNM and along wire 101, through front contact 102 of relay FS1, through back contact 216 of relay FS2, over wire 217, through the winding of relay FSR, to (—). In response to the pick up of relay LS1P, a pick-up circuit for relay LSR is similarly completed from (A+), through front contact 220 of zone memory relay Z1M (see FIG. 6I) through front contact 221 of relay NSP, through front contact 222 of relay LS1P, through a back contact of relay LS2P (not shown) indicated at 223, over wire 224, through the winding of relay LSR, to (—). The sequencer advance circuits described above employing back contact 168 of relay FSR and back contact 194 of relay LSR are thus opened.

The concurrent pick up of relays FSR and LSR interrupts respective pick-up circuits employing back contact 107 of relay FSR and back contact 108 of relay LSR (connected in multiple in FIG. 6M) for control time relay CT. Control time relay CT remains picked up in that a pick-up circuit is completed through front contact 225 of relay ST according to the control thereof by the discharge of capacitor 160. When, however, relay ST is dropped away following sufficient discharge of capacitor 160 therethrough, control time relay CT is also dropped away in a short period of time according to the discharge of capacitor 110 therethrough. During the period of time starting when relays FSR and LSR become concurrently picked up and until relay CT is dropped away, control circuits are completed for causing control signal energy to be transmitted to field location NBL1 for northbound traffic.

Inasmuch as typical circuits are provided herein for only locations NBL4, NBL5, NBL6 and NBL7, it is necessary to assume that control signal energy is transmitted in sequence to the first three locations for northbound traffic as the location sequencer is advanced according to the operation of relays CT, ST and STP. In each instance, a positive (+) control energy is applied to a function line FL1 which extends to each field location herein contemplated as long as function sequence relay FS1 and function relay F1 remain picked up.

For each concurrent pick up of relays FSR and LSR, and with relay F1 picked up, a pick-up circuit for a positive polarity analyzer relay PPA (see FIG. 6O) is completed which causes the positive (+) control energy to be supplied to all field locations connected in parallel over function line FL1. More particularly, the pick-up circuit for relay PPA extends from (+), through front contact 228 (see FIG. 6K) of relay AC, through front contact 229 of relay FSR, through front contact 230 of relay LSR, over wire 231, through front contact 232 of relay PNM, through back contact 233 of relay PFM, over wire 234, through front contact 235 of function relay F1, over wire 236, through back contact 237 of relay NT1, over wire 238, through the winding of relay PPA, through the winding of relay NPA, through a resistor 239, to ground. Only relay PPA is picked up, however, in that it is responsive to the (+) polarity or direction of current flow. Positive (+) control energy is then supplied to function line FL1 by a circuit extending from (+) through front contact 240 of relay PPA, through a resistor 241, over wire 242, through back contact 243 of relay NT1, over wire 244, through front contact 245 of relay F1, to function line FL1. Inasmuch as the location sequence repeater relays LS–P of FIGS. 6I and 6M are stuck after pick up through back contact 211 of relay LR and the function SF1 is required for each location, relay LSR is stuck during advancing of the location sequencer and until reset. Thus, positive (+) control energy remains on function line FL1 constantly during selection of all field locations for both northbound and southbound traffic except during a reset period of the function sequencer and location sequencer.

A fourth control cycle of operation is initiated following the drop away of relay CT which terminates the third control cycle of operation. Upon drop away of relay CT, relay ST is again picked up through a circuit including back contact 247 of relay CT and the pick up circuit described above including front contacts 152 and 154 of relays LW and FW respectively. Upon pick up of relay ST, the relays STP and CT are picked up while the respective capacitors 164 and 110 are charged once again. In addition, relay LS4 of the location sequencer is picked up in that positive (+) control energy is applied through front contact 168 of relay FSR, through front contact 250 of relay LSR, through back contact 251 of relay LFM, over wire 195, through front contact 196 of relay ST, over wire 197, through the back contacts of the location sequence repeater relays LS4P, LS5P, etc. as described above and through a front contact of relay LS3P (not shown) and a back contact of the relay LS3 (not shown). This dependency of the pick up circuit for one location sequence relay upon a closed back contact of the preceding location sequence relay and upon a closed front contact of the preceding location sequence repeater relay, will become clear shortly, when discussing how the system steps from location NBL4 to location NBL5. Upon pick up of relay LS4, a pick-up circuit is completed for relay LS4P extending from (+), through front contact 253 of relay LS4, through the winding of relay LS4P, to (−). Relay LS4P is stuck through its front contact 254 and the circuit including back contact 211 of relay LR.

Selection of northbound location NBL4 is made in that a pick-up circuit for location relay NL4 is completed upon pick up of relay LS4P and extends from (+), through front contact 258 of relay LS4P, through back contact 259 of relay LS5, through back contact 260 of relay LS5P, over wire 261, through front contact 262 of relay NSP, over wire 263, through the winding of relay NL4, to (−). Positive (+) control energy for location selection is transmitted to northbound location NBL4 for picking location control relay LC4 through back contact 266 of relay NT (see FIG. 6H), over wire 267, through front contact 268 of relay AC, through front contact 269 of relay LSR, over wire 270, through front contact 271 of relay NL4, over wire 272 to the field location 4, through the winding of relay LC4, through the winding of relay LI4, through a resistor 273, to ground. The positive (+) control energy causes current to flow through the winding of relay LC4 in a direction to pick up the relay. With relay LC4 thus picked up, the positive (+) control energy appearing now on function line FL1 is applied through front contact 276 of relay LC4, through the winding of application relay 4A1, through front contact 277 of relay LC4, to ground. Relay 4A1 thus picked up completes a pick-up circuit for load relay 4L2 as well as an energizing circuit for ramp sign RPS. More particularly, a circuit is completed from (−), through front contact 278 of relay 4A1, through the winding of relay 4L2 and variable resistor 279 connected in shunt, through back contact 280 of relay 4A2, through the filaments of lamps (not shown) to indicate "CLOSED" for ramp sign RPS, to ground.

In response to the timing out of relays ST, STP and CT, relay LS4 is dropped away in that its stick circuit includes front contact 196 of relay ST. When relay CT drops away as described above, the pick-up circuit for relay ST including back contact 247 of relay CT is completed. Upon pick up of relay ST, an advance pulse is supplied to the location sequencer through front contact 196 of relay ST and through the circuit described but now including front contact 204 of relay LS4P, back contact 283 of relay LS4, through the winding of relay LS5, to (−) thus initiating a fifth control cycle of operation. Relay LS5 upon pick up completes a pick-up circuit for its repeater relay LS5P which includes front contact 284 of relay LS5.

In response to the pick up of relay LS5, the pick-up circuit for relay NL4 described above is interrupted to drop such relay. A pick-up circuit for relay NL5 for location 5 is now completed and extends from (+), through front contact 288 of relay LS5P, through back contact 289 of relay LS6, through back contact 290 of relay LS6P, over wire 291, through front contact 292 of relay NSP, over wire 293, through the winding of relay NL5, to (−). Positive (+) control energy is then supplied to field location NBL5 over the circuit described and through front contact 295 of relay NL5, over wire 296, through the winding of relay LC5, through the winding of relay LI5, through resistor 297, to ground. Location control relay LC5 is thus picked up and completes the circuit for picking up relay LC5P through its front contact 298. Application relay 5A1 has its pick up circuit completed from the positive (+) control energy appearing on function line FL, through front contact 300 of relay LC5P, through the winding of application relay 5A1, through front contact 301 of relay LC5, to ground. As shown in FIG. 6FF, the energization of relay 5A1 causes control energy to be partially connected to the control circuits for operating respective aspect display signs when control signals corresponding to their sign functions are transmitted from the control office.

It is noted here that the northbound location NBL5 does not actually have a ramp sign RPS located thereat, but it is suggested herein that the sign RPS shown for location NBL4 could be controlled alternatively from location NBL5 so as to reduce apparatus requirements. In particular, ramp sign RPS shown dotted at location NBL5 may be controlled when relay 5L2 is picked up by a circuit extending from (+), through front contact 304 of relay 5A1, through the winding of relay 5L2, through back contact 305 of relay 5A2, through the filaments of lamps (not shown) comprising the "CLOSED" display of sign RPS employed at location NBL4, to (−). In addition, (+) energy is supplied through front contact 308 of relay 5A1 to one side of relay 5L3–5.

A sixth control cycle of operation is initiated following the drop away of relay CT which terminates the fifth control cycle of operation. Relay ST is again picked up causing an advance pulse to be supplied to the location sequencer through its front contact 196 as described above. The advance pulse is applied through the circuit described and through front contact 203 of relay LS5P, through back contact 310 of relay LS5 now dropped away, through the winding of relay LS6, to (−) to cause pick up thereof. The pick-up circuit described for relay NL5 is thus interrupted. Also, a pick-up circuit for relay LC6P is completed through front contact 312 of relay LS6. Relay LS6P is stuck through its front contact 313. Location relay NL6 now has its pick up circuit completed from (+), through front contact 315 of relay LS6P, over wire 316, through back contact 317 of relay LS7, through back contact 318 of relay LS7P, through front contact 319 of relay NSP, over wire 320, through the winding of relay NL6, to (−).

With relay NL6 now picked up, positive (+) control energy is supplied by the circuit described and through front contact 323 of relay NL6, over wire 324, through the winding of relay LC6, through the winding of relay LI6, through resistor 325, to ground which picks up relay LC6 only. Repeater relay LC6P is picked up by a circuit completed through front contact 326 of relay LC6. A pick-up circuit for relay 6A1 is completed from the positive (+) control energy appearing on function line FL1, through front contact 328 of relay LC6P, through the winding of relay 6A1, through front contact 329 of relay LC6, to ground.

Upon pick up of relay 6A1, and as shown in FIG. 6GG, load current relays 6L8 and 6L9 are picked up, while the aspect display lane signs 3XS and 4XS for location NBL6 are illuminated. More particularly, for relay 6L8 and sign 3XS, a circuit extends from (+), through front contact 334 of relay 6A1, through the winding of relay 6L8, through back contact 335 of relay 6A8, through the lamp filaments (not shown) of sign 3XS, to (−). For relay 6L9 and sign 4XS, a circuit extends from (+), through front contact 337 of relay 6A1, through the winding of relay 6L9, through back contact 338 of relay 6A9, through the lamp filaments (not shown) of sign 4XS, to (−). The lane signs 3XS and 4XS at northbound location 6 in zone 3 are thus illuminated as described. In this respect, lane signs displaying an "X" for the other lanes at this location, i.e., the lane median, lane 2 and "OFF RAMP," are also operated, but these circuits are not herein shown.

Upon drop away of relay CT, a seventh control cycle of operation is initiated thus terminating the sixth control cycle of operation in that an advance pulse is supplied to the location sequencer. More particularly, when relay ST releases, the stick circuit for relay LS6 is interrupted to thereby cause the release of relay LS6. When relay ST picks up, a pick-up circuit for relay LS7 is completed through the circuit described and through front contact 202 of relay LS6P, through back contact 333 of relay LS6, over wire 334, through the winding LS7, to (−) thus picking relay LS7. The pick up circuit for relay NL6 is interrupted in that back contact 317 of relay LS7 is now open. In response to the pick up of relay LS7 a pick up circuit for relay LS7P is completed through front contact 336 of relay LS7. Subsequently, a stick circuit is completed for relay LS7P through its front contact 337, while a stick circuit is also completed for relay LS7 through front contact 200 of relay LS7P and front contact 338 of relay LS7.

Northbound location relay NL7 has its pick up circuit completed from (+), through front contact 340 of relay LS7P, through contacts indicated at 341 for relays LS8 and LS8P (not shown), through front contact 342 of relay NSP, over wire 343, through the winding of relay NL7, to (−). Positive (+) control energy is then supplied through the circuit described and continuing through front contact 345 of relay NL7, over wire 346, through the winding of relay LC7 (see FIG. 6GG), through the winding of relay LI7, through a resistor 347, to ground thus picking relay LC7. With relay LC7 picked up, positive (+) control energy is applied through front contact 349 of relay LC7, through the winding of relay LC7P, to ground to pick such relay LC7P. With relays LC7 and LC7P picked up, the pick-up circuit for relay 7A1 is completed from the positive (+) energy appearing on function line FL1, through front contact 350 of relay LC7P, through the winding of relay 7A1, through front contact 351 of relay LC7, to ground. With relay 7A1 picked up, load relays 7L8 and 7L9 are picked up while lane signs 3XS and 4XS are also illuminated (see FIG. 6HH). More particularly, one circuit extends from (+), through front contact 357 of relay 7A1, through the winding of relay 7L8, through back contact 358 of relay 7A8, through the lamp filaments (not shown) of sign 3XS, to (−), while the other circuit extends from (+), through front contact 359 of relay 7A1, through the winding of load relay 7L9, through back contact 360 of relay 7A9, through the lamp filaments (not shown) of sign 4XS to (−).

It is noted here that the location sequencer operates such that the relays appearing after relay LS7 up to and including relay LS31 are sequentially picked up and controlled in the manner described above for relays LS4–LS7. Similarly, their respective repeater relays are picked up and controlled so as to sequentially control location relays such as NL4–NL7 so that the application relays generally referred to as A1 relays can be picked up for each respective field location of northbound traffic.

During the operation of the location sequencer as described, relay LSR (see FIG. 6M) is stuck by circuits completed through contacts of the location sequencer repeater relays. For example, when relay LS4P is picked up and relay LS5P is dropped away, a circuit is completed over wire 142 as described above and continues through front contact 143 of relay LS4P, through back contact 364 of relay LS5P, over wire 365, through the winding of relay LSR, to (−). In sequence position 12, the stick circuit for relay LSR extends through back contact 367 of relay LS13P. When relay LS13P is picked up, the stick circuit for relay LSR includes front contact 369 of relay LS13P in the circuit extending from (A+), through control contacts indicated at 371 and over wire 372 to contact 369. Following completion of the thirteenth control cycle of operation, the location sequencer is reset so that the field locations corresponding to southbound traffic can have positive (+) control energy sent thereto in sequence.

Relay LW (see FIG. 6V) is picked up during the operation of the location sequencer and until such relay LS13P is energized. An example circuit has been described above. The opening of back contact 369 of relay LS13P disconnects the pick up circuit for relay LW which extends from (A+), through control contacts indicated at 371, over wire 372, through back contact 369 of relay LS13P, over wire 144, through back contact 145 of relay LR, through the winding of relay LW, to (−). A stick circuit for relay LW is completed through front contact 147 of CT (see FIG. 6N) as described, but this circuit is interrupted when relay CT drops thus terminating the thirteenth control cycle of operation.

With relay LW picked up, a circuit is completed for picking relay RLR (see FIG. 6V) which extends from (+), through front contact 374 of relay LW, through the winding of relay RLR, to (−). Also, a capacitor 375 is charged through a resistor 376 by such circuit. When relay LW releases and before RLR releases, a pick-up circuit is completed for relay LR which extends from (+), through back contact 374 of relay LW, through front contact 378 of relay RLR, through the winding of relay LR, to (−). At the same time, a capacitor 380 is charged through a resistor 381 and is employed for the purpose of making relay LR slow release. The stick circuit for the repeater relays LS1P, LS4P–LS7P and LS13P includes back contact 211 of relay LR as described. The picking of relay LR opens such stick circuit to drop all of such relays. The location sequencer is thus in condition again to be operated for southbound traffic.

Relay FW has a stick circuit dependent upon the picked up condition of relay LW. As long as relay LW is picked up, such stick circuit extends from (+), through front contact 98 of relay AC, over wire 99, over wire 384 from FIG. 6E to FIG. 6M, through back contact 385 of relay LFM, over wire 386, through front contact 387 of relay LW, over wire 388, through front contact 389 of relay FW, through the winding of relay FW, to (—). Upon release of relay LW, the stick circuit described for relay FW is interrupted to cause relay FW to release.

During the picked up condition of relay FW, however, a circuit is completed for picking relay RFR which extends from (+), through front contact 392 of relay FW, through the winding of relay RFR, to (—). Also, a capacitor 393 is charged through a resistor 394 by the same circuit. Upon release of relay FW and before relay RFR releases, a pick-up circuit is completed for relay FR extending from (+), through back contact 392 of relay FW, through front contact 396 of relay RFR, through the winding of relay FR, to (—). Also, a capacitor 397 is charged through a resistor 398 by the same circuit. The pick up of relay FR opens the stick circuit for relay FS1 which includes back contact 180 of relay FR. With relay FS1 released, relays F1 and FSR also are released. In addition, a stick circuit including back contact 159 of relay FR for relay FSA is also interrupted.

The concurrent pick up of relays FR and LR at the conclusion of the northbound sequencing completes a pick-up circuit for sequence complete relay SC (see FIG. 6V) extending from (+), through front contact 405 of relay FR, over wire 406, through front contact 407 of relay LR, through the upper winding of relay SC, to (—). Once picked, two stick circuits are completed for relay SC, one extending from (+), through front contact 408 of relay FR, over wire 409, through front contact 410 of relay SC and through the lower winding thereof, while the other stick circuit extends from (+), through front contact 411 of relay LR and through front contact 410 of relay SC.

In response to the pick up of relay SC, a pick-up circuit for relay NSC is completed from (+), through front contact 414 of relay SC, over wire 415, through front contact 416 of relay NS, through the winding of relay NSC, to (—). When relay NSC is picked up to particularly register completion of the northbound sequencing, back contact 87 thereof opens to disconnect the pick-up circuit for relay NS. However, a stick circuit for relay NS extends from (+), through front contact 418 of relay SC, over wire 419, through front contact 420 of relay NS, through the lower winding of relay NS, to (—) to stick relay NS until relay SC is dropped away so that both relays NSC and SSC are not picked up during one operation of relay SC.

The system remains activated even though one stick circuit for activate relay AC including back 430 of relay SC is interrupted when relay SC is picked up, in that a second stick circuit is completed from (+), through front contact 424 of relay SS, over wire 425, through front contact 426 of relay AC, through the winding of relay AC, to (—). Also, a capacitor 427 is charged through a resistor 428 by the same circuit to make relay AC slow release.

Upon release of relay FR following the release of relay RFR and sufficient discharge of capacitor 397, the pick-up circuit described above for relay FW including front contact 98 of relay AC and wires 99, 101 and 103 is completed to pick up relay FW. In response to the release of relays NSP and LR, a plurality of pick-up circuits are completed for relay LW one of which extends from (A+), through contacts indicated at 371 which includes a back contact of the relay NSP and a front contact of a zone memory relay for southbound traffic, over wire 372, through back contact 369 of relay LS13P, over wire 144, through back contact 145 of relay LR, through the winding of relay LW, to (—). The stick circuits for relay SC are opened, as previously discussed, thus opening front contact 418 and dropping relay NS. The stick circuit for relay FW is then completed which includes front contact 387 of relay LW.

Upon concurrent pick up of relays FW and LW, sequence time relay ST has its pick-up circuit again completed through front contact 154 and 152 of relays FW and LW respectively. With relay FSR now dropped away and according to the pick up of relay ST, the function sequencer is operated to the condition where relay FS1 is again picked up and stuck which causes relays F1 and FSR to also pick up as described. Also, with relay LSR dropped away, the location sequencer is operated to the condition where relay LS1 and its repeater LS1P are picked up and struck as described above.

The sequential operation of the location sequencer occurs in the manner described above so that a control signal corresponding to sign function SF1 can be transmitted to each southbound location SBL1–SBL13, all as suggested by the charts of FIGS. 4 and 5. In this operation, southbound location relays similar to relays NL4–NL7 are picked up through contacts of the location sequence repeater relays in the manner described and back contacts of the relay NSP shown in FIG. 6M such as back contact 262. In addition, the stick circuits for relays LSR and LW are now completed through back contacts of the relay NSP such as back contact 141 and front contacts of zone memory relays for southbound locations. Thus, positive (+) ON control energy is additionally transmitted to each of the southbound locations SBL1–SBL13 as indicated in the chart of FIG. 4.

During the thirteenth control cycle of operation for southbound location SBL13 and following the pick up of relay LS13P, the circuits for picking relays LSR and LW are again interrupted. The stick circuit for relay LW including front contact 147 of relay CT also opens when relay CT releases. Subsequently, the stick circuit for relay FW including front contact 387 of relay LW is interrupted to cause such relay to drop away. With relays LW and FW dropped away, respective pick-up circuits for relays LR and FR are completed as described so that the reset relays LR and FR are concurrently picked up. Relay SC is picked then through its circuit including front contact 405 of relay FR and front contact 407 of relay LR.

Upon pick up of relay SC, a pick up circuit is completed for relay SSC which extends from (+), through front contact 414 of relay SC, over wire 415, through back contact 416 of relay NS, over wire 432, through the winding of relay SSC, to (—) which indicates that the sequence of southbound traffic locations has been completed. Relay SSC thus being picked opens its back contact 94 in the pick-up circuit described for relay SS.

Inasmuch as both stick circuits described for relay AC are now opened, this relay soon drops away in response to the discharge of capacitor of 427 through the lower winding thereof. Relay ACP releases in response thereto. The release of relay ACP also causes the deenergization of lamp 130 for button NTB (because relays SDC and NDC of FIG. 6J are both released) and lamp 135 for activate button ACB (because front contact 133 in FIG. 6N is open).

As shown in FIG. 6A, power on memory relay PNM employs in its stick circuit function energy (F+). During the control cycles described, the function energy (F+) is supplied through a circuit (see FIGS. 6K, 6O and 6S) extending from (+), through front contact 417 of relay ACP, through back contact 421 of relay SC or front contact 422 of relay SS, through back contact 423 of relay ACNM, to required stick circuits.

As shown in FIG. 6C, zone memory relays Z3M and Z4M employ in their stick circuits zone energy (Z+). During the control cycles described above, zone energy (Z+) is supplied through a circuit extending from (+), through front contact 438 of relay ACP, over wire 439, through front contact 440 of relay SS or back contact 441 of relay SC, over wire 442, through back contact 443 of relay ACNM, to required stick contacts. When, however, relay SC is picked up and relay SS is dropped away indicating the completion of a control cycle as described, the function energy (F+) and zone energy (Z+) is removed from the stick circuits to thus drop all memory relays stuck thereby.

*Automatic interrogation*

It will be recalled from above that the northbound indication call relay NDC and the southbound indication call relay SDC were picked up by circuits completed over wires 117 and 122 respectively extending between FIGS. 6C and 6J, as described. During the described control cycles of operation, relay NDC is stuck by a circuit extending from (+), through back contact 446 of relay NT1, through front contact 447 of relay NDC, through the winding of relay NDC, to (−). Also, during the drop away time of relay NSC, another stick circuit extends from (+), through back contact 448 of relay NSC, over wire 449 and through the circuit described. Similarly, relay SDC is stuck by a circuit completed from (+), through back contact 451 of relay NT2, through front contact 452 of relay SDC, through the winding of relay SDC, to (−). As relay SSC is dropped away, another stick circuit extending through back contact 454 of relay SSC and over the wire 455 is completed.

Upon release of the reset and activate relays described following the completion of the southbound control cycle sequence, relay NT (see FIG. 6J) is picked up by a completed circuit. More particularly, the pick up circuit for relay NT extends from (+), through front contact 458 of activate button ACB (see FIG. 6C), over wire 459, through front contact 460 of relay NDC or front contact 461 of relay SDC connected in parallel, through back contact 462 of relay AM, over wire 463, through back contact 464 of relay LR, through back contact 465 of relay RLR, over wire 466, through back contact 467 of relay FR, through back contact 468 of relay RFR, over wire 469, through back contact 470 of relay ACP, over wire 471, through back contact 472 of relay NT2, through the winding of relay NT, to (−). A stick circuit for relay NT is completed which includes front contacts 478 and 479 of relay NT. Pick up circuits for interrogate repeater relays NT1 and NT2 are completed through front contacts 475 and 476 respectively of relay NT. A lamp 474 associated with interrogate button NTB is energized (illuminated yellow) in response to pick up of relay NT2 through a circuit including front contact 127 of relay NT2 to indicate that an interrogation cycle of operation is in progress.

In response to the pick up of relay NT, relays NS and SS of FIGS. 6N and 6R respectively are picked up. The pick-up circuit for relay NS extends from (+), through front contact 482 of relay NDC, through front contact 483 of relay NT, over wire 484, through back contact 87 of relay NSC, through the upper winding of relay NS, to (−). The pick-up circuit for relay SS extends from (+), through front contact 487 of relay SDC, through front contact 488 of relay NT, over wire 489, over wire 93, through back contact 94 of relay SSC, through the winding of relay SS, to (−). Relay NSP is picked up in response to relay NS being picked up.

With relays NT, NT1 and NT2 picked up, an interrogation cycle of operation is initiated wherein location indication energy is transmitted to each field location for selecting that location so that polar energy, (+) and (−) in character, may be transmitted between the control office and the selected field location for each aspect display sign to determine the existing position of that aspect display sign. The application and load relays corresponding to each aspect display sign are employed in combination to determine the polarity of and to permit the polar energy to be so transmitted between a selected field location and the control office. As mentioned above, for each interrogation cycle of operation, the system operates in the location-function mode in that normally a plurality of signs are positioned at each field location. In this mode of operation, the location sequencer is stopped or halted at each location wherein the function sequencer is stepped through each of its positions to thus select the desired sign functions to be interrogated at each field location.

In response to the pick up of relay NT, relay LFM (see FIG. 6M) is picked up by a circuit extending from (+), through front contact 486 of relay NT, over wire 487, through the lower winding of relay LFM, to (−). In addition, relay LW is picked up by a circuit described including wire 372 extending in FIGS. 6I and 6M, but now including front contact 490 of relay NT. In response to the pick up of relay NT1, a pick-up circuit for relay FW is completed through front contact 493 of relay NT1 and through back contact 102 of relay FS1 and along wire 103 as described above.

With relays FW and LW concurrently picked up, the pick-up circuit for relay ST including front contact 154 of relay FW and front contact 152 of LW is now completed. Relay CT is initially picked up upon pick up of relay NT in that a circuit is completed through front contact 495 of relay NT. The relays ST, STP and CT are then operated as described in response to the concurrent pick up of relays FSR and LST. To indicate that it is desired to interrogate each field location and the position of each aspect display sign thereof, initially, relays FW and LW have stick circuits completed through contacts of relay CT. For relay FW, the stick circuit extends from (+), through front contact 498 of relay NT, over wire 99, over wire 384, through front contact 499 of relay CT, over wire 500, over wire 388, through front contact 389 of relay FW, through the winding of relay FW, to (−). For relay LW, the stick circuit extends from (+), through front contact 147 of relay CT, over wire 148, through front contact 149 of relay LW, through the winding of relay LW, to (−). Upon pick up of relay FW, a second stick circuit is completed for relay LW which extends from (+), through front contact 504 of relay LFM, over wire 505, through front contact 506 of relay FW, through front contact 149 of relay LW, through the winding of relay LW, to (−). These stick circuits are effective to stick relay LW until the location sequencer is reset for interrogating southbound traffic locations. With relay ST picked up, both the function sequencer and location sequencer are advanced to the position where an interrogation signal can be transmitted to location NBL1 with reference to sign function SF1.

Initially, the location sequencer is advanced to a first position wherein relay LS1 is picked up by the circuit described including back contact 194 of relay LSR. As described, relay LS1P is subsequently picked up. Relay LSR is picked up and stuck by a circuit extending from (+), through front contact 507 of relay NT, through front contact 508 of relay LS1P, over wire 509, through the winding of relay LSR, to (−). A location relay (not shown) for location NBL1 is picked up and stuck until all sign positions thereat have been interrogated.

Relays OFS, FS1, and FSA are picked up in response to the picking of relay ST as described above. Stick circuits described for relays FS1 and FSA including back contacts 159 and 180 of relay FR are completed. With relay FS1 now picked up, a pick-up circuit for relay FSR is completed through front contact 102 of relay FS1 and front contact 493 of relay NT1. Relay F1 is also picked up by the circuit described above.

Generally speaking, the interrogation cycle of operation provides that (−) control energy be transmitted to each field location in sequence for selecting that location by picking the location indication relay thereat following which the existing positions of the aspect display signs are determined according to the condition of the application and load relays for each sign at that field location. In this operation, the function sequencer is operated for each sequence before it is reset only to the extent that the existing position to given aspect display signs for each location are interrogated. That is, all sequence relays LS1–LS11 are not operated for each sequence, thus permitting rapid operation of the system.

Inasmuch as circuits and signs are shown diagrammatically for only northbound locations NBL4, NBL5, NBL6 and NBL7 (see FIG. 6EE to FIG. 6HH), it is necessary to describe the operation of the system for an interrogation cycle with respect to one of these locations. In this respect, it is assumed that the function sequencer and location sequencer are operated in sequence for northbound locations NBL1, NBL2, NBL3, and NBL4, the cycle operation therefor being considered similar to the cycle operation described hereinafter with respect to location NBL5 as an example.

During the cycle operations, relays ST and STP along with relay CT operate in the manner described to permit a sufficient control time for interrogating each function at each of the locations. In the operation of relay ST, front contact 170 thereof opens and closes for each step of a cycle operation so that relays EFS and OFS along with relay FSA are operated to control relays FS1–FS11 as required. As described, relay OFS is initially picked up with relays FSA and FS1 also being picked up. A stick circuit described for relay OFS is opened when relay FSR picks up thus dropping relay OFS. To initiate a second stepping cycle, a pick up circuit for relay EFS is completed which extends from (+), through front contact 168 of relay FSR, through front contact 250 of relay LSR, through front contact 251 of relay LFM, over wire 169, through front contact 170 of relay ST, over wire 171, through front contact 172 of relay FSA, through back contact 517 of relay OFS, through the winding of relay EFS, to (−). A stick circuit for relay EFS includes the circuit described and front contact 518 of relay EFS. A pick up circuit for relay FS2 is thereby completed from (+), through front contact 520 of relay EFS, through front contact 521 of relay FS1, through back contact 522 of relay FS3, through the winding of relay FS2, to (−). A stick circuit for relay FS2 then includes its front contact 524 and back contact 159 of relay FR. The function relay F2 is picked up by a circuit extending from (+), through back contact 528 of relay OFS, through front contact 529 of relay FS2, through back contact 530 of relay FS3, over wire 531, through the winding of relay F2, to (−). A lamp 532 is energized through a circuit including front contact 533 of relay F2 to indicate that the system is operating with respect to sign function SF2. The stick circuit for relay FSA including back contact 166 of relay EFS opens upon pick up of relay EFS. The remaining relays FS3–FS10 are operated in sequence only as limited by the release of relay FW and subsequent pick up of reset relay FR. In this respect, it is not desired to interrogate for sign function SF11 which represents the "SPEED" indication; thus, relay FW is dropped away following the tenth stepping cycle where the location then being interrogated includes a lane sign corresponding to sign function SF10. The operation of relay FW is provided by a circuit including front contact 534 of relay NT1 and contact 535 of relay FS10 (see FIG. 6H). Back contact 536 of relay FS11 is employed on a control cycle wherein it is desired to control the indication "SPEED" for a particular speed sign.

During the stepping of the function sequencer and until reset for each cycle of operation, relay LW is picked up in that the described pick up circuit including front contact 490 of relay NT is completed. Upon reset of the function sequencer as caused by the release of relay FW and subsequent pick up of relay FR, a circuit is completed for advancing the location sequencer which extend from (+), through front contact 495 of relay NT (see FIG. 6I), over wire 539, through front contact 540 of relay LFM, over wire 541, through front contact 542 of relay FR, over wire 543, through back contact 544 of relay LR, over wire 545, over wire 197, through the back contacts of the location sequence repeater relays described above and through a combination of a front contact of a sequence repeater relay and a back contact of the corresponding sequence relay to the winding of a location sequence relay. In particular, the pick-up circuit for relay LS5 is completed through back contacts described of the relays LS5P–LS7P and LS13P and back contacts indicated at 199 of relays LS8P–LS12P (not shown), through front contact 204 of relay LS4P, through back contact 283 of relay LS4, through the winding of relay LS5, to (−). Relays LS5P and NL5 are picked up by circuits described.

Upon pick up of relay NL5, relay L15 for location NBL5-zone 3 is picked up by a circuit extending from (−) energy (see FIG. 6H), through front contact 548 of relay NT, over wire 549, through back contact 550 of relay AC, through front contact 269 of relay LSR, over wire 270, through front contact 295 of relay NL5, over wire 296, through the winding of relay LC5, through the winding of relay L15, through resistor 297, to ground. Relay L15 is picked up in that it only is responsive to the negative (−) energy. Its repeater L15P is picked up by the circuit including front contact 551 of relay L15.

During each cycle operation wherein relay ST picks up and then releases, positive (+) indication energy is transmitted between the control office and the selected field location. Such transmission occurs when relay ST releases while relay FSR is picked up. More particularly, a pick-up circuit for relay PEM (see FIG. 6I) is then completed from (+), through back contact 163 of relay ST, over wire 552, through front contact 553 of relay FSR, along wire 554, through front contact 555 of relay NT, through the winding of relay PEM, to (−). For location NBL5-zone 3, for example, positive (+) indication energy is transmitted by the circuit extending from (+), through front contact 558 of relay PEM (see FIG. 6I), over wire 559, through back contact 560 of relay FR, over wire 561, through front contact 562 of relay L15, through front contacts 563 and 564 of relays 5A1 and L15P respectively, over function line FL1 back to the control office, through front contact 245 of function relay F1, over wire 244, through front contact 243 of relay NT1, through front contact 237 of relay NT1, over wire 238, through the winding of relay PPA, through the winding of relay NPA, through resistor 239, to ground. Relay PPA is picked up by the positive (+) indication energy. Repeater relay PAP is picked up by the circuit extending from (+), through front contact 578 of relay PPA, through back contact 579 of relay NAP, through the winding of relay PAP, to (−). A lamp 580 is energized through front contact 581 of relay PAP to indicate the condition of the control office apparatus.

Upon pick up of relay PAP, a circuit is completed for picking up a power on indication memory relay corresponding to the selected field location. For location NBL5-zone 3, for example, a pick-up circuit completed for relay PN15 extends from (+), through front contact 585 of relay NT1, over wire 586, through front contact 587 of relay PAP, through front contact 588 of relay F1, over wire 589, through front contact 590 of relay NL5, through the winding of relay PN15, to (−). A stick circuit for relay PN15 extends from (+), through back contact 594 of relay LS5 which is dropped away when relay ST is released, over wire 595, through front contact 596 of relay PN15, through the winding of relay PN15 to (−). The purpose of each power on indication memory relay such as relay PN15 is to connect control memory relay circuits and indication memory relay circuits corresponding to the aspect display sign to the out-of-correspondence relay OCR (see FIG. 6D) so that any out-of-correspondence between the last control signal transmitted to a field location for operating a sign thereat and the existing sign position may be detected at the control office. Inasmuch as it is presently assumed that only application relay 5A1 is picked up as described while the remaining application relays 5A2–5A5 and 5A11 (see FIG. 6FF) are dropped away, the positive (+) indication energy transmitted from the control office for step operations as indicated by the sequential picking of relays FS2–FS10 for each selected location depending upon the signs thereat is not applied to respective function lines FL2–FL10. This operation is effective for each location of northbound traffic. Accordingly, the condition of the indication memory relays (see FIGS. 6W and 6AA) correspond to the positions of the command memory relays (see FIGS. 6S and 6W), all of which are dropped away. The out-of-correspondence relay OCR thus remains dropped away.

At the conclusion of the interrogation cycle for northbound traffic as indicated by the release of relay CT, relay FW is dropped away in that its stick circuit including front contact 499 of relay CT is opened. Relay LW is then dropped away in that its stick circuit including front contact 506 of relay FW is opened. The reset relays FR and LR are picked up concurrently which causes the pick up circuit described for relay SC to be completed. Relay NSC is picked up by the circuit described, while the stick circuit described for relay NS including front contact 418 of relay SC is completed. Relay NDC is dropped away in that back contact 448 of relay NSC opens. Upon release of relays FR and LR, relay SC is dropped away which opens the stick circuit for relays NS and NSC thus dropping away relay NS and its repeater NSP and relay NSC. While relay NS is picked up, however, a pick up circuit for relay NDR is completed from (+), through front contact 597 of relay NT1, over wire 598, through front contact 599 of relay NS, over wire 600, through the winding of relay NDR, to (−). Upon dropping of relay NDR, stick circuits are provided for all power on indication memory relays for northbound locations through back contacts of relay NDR. For relay PN15, a stick circuit including back contact 601 of relay NDR is completed.

Inasmuch as relays SDC and SS are picked up, the function sequencer and the location sequencer are operated in the manner described so that the power on indication memory relays for southbound locations SBL1–SBL13 are picked up in sequence and stuck through back contacts of respective LS relays and back contacts of a southbound indications release relay (not shown) similar to relay NDR which is operated through a circuit including back contact 599 of relay NS. Upon completion of the interrogation cycle of operation for southbound traffic locations, relay SSC is picked up which opens the stick circuit including back contact 454 of relay SSC for relay SDC. With both relays NDC and SDC dropped away, the stick circuits for relay NT are opened thus causing relay NT to drop away followed by the dropping away of relays NT1 and NT2. Also, the lamp 474 is deenergized to indicate the completion of the interrogation cycle of operation.

*Control cycle—single sign at single location*

It becomes necessary at times to control a single sign at a particular location. At such particular location, one or more aspect display signs may be included such as indicated by the chart shown in FIG. 5. For the present example, it will be assumed that it is desired to operate ramp sign RPS at location NBL4 from a closed or "CL" position to an open or "OP" position. It is assumed that the sign power "ON" operation is completed as described above. It is necessary to actuate three buttons to control ramp sign RPS to display an "OPEN" indication. These buttons include the zone "3" button NZ3, on ramp button NRO, and the actuate button ACB.

With reference to FIG. 6E, and in response to the designation of button NRO, relay NOM is picked up and stuck by a circuit similar to that described for relay PNM. With reference to FIG. 6C, and in response to the designation of button NZ3, relay Z3M is picked up through back contact 603 of button NZ3. It is stuck through its front contact 54 from energy (Z+).

In response to the pick up of the memory relays mentioned above, lamps are energized respectively for the button NRO, and NZ3. These lamps are respectively designated 605 and 55.

Call relays are picked up in response to the pick up of the memory relays described above. Ramp function call relay RFC has its pick up circuit completed through front contact 611 of relay NOM. Northbound zone call relay NZC has its pick up circuit completed through front contact 59 of relay Z3M as described above.

With the call relays picked up as described, the system now is in readiness for operation responsive to designation of activate button ACB. Initially, a pick up circuit is completed for activate memory relay AM which includes closed contact 60 of button ACB and front contact 614 of relay RFC. In response to the pick up of relay AM, the circuit described for lamp 32 associated with button ACB is completed.

Also, the circuit including front contact 76 of relay AM for picking up relay AC is completed. Activate repeater relay ACP is picked up in response to the pick up of relay AC. Lamp 135 is then energized through front contact 133 of relay ACP. In addition, the push button energy (PB+) is released, while activate energy (A+) is now supplied through front contact 124 of relay ACP.

Inasmuch as the relay NZC for northbound zone was energized, relays NS and NSP are sequentially picked up to initiate a northbound sequence operation. In addition, the location sequencer (see FIGS. 6I and 6M) and the function sequencer (see FIGS. 6H and 6L) are controlled similar to that described above as relays FS and LW are picked up.

Relay LW has its pick up circuit completed partly through the circuit described above but now includes front contact 616 of relay RFC, over wire 617, through front contact 139 of zone memory relay Z3M, and through the circuit described above. A pick up circuit for relay FW extends from (+), through front contact 98 of relay AC, over wire 99, through front contact 620 of relay NOM, over wire 621, through back contact 622 of relay FS2, over wire 103, through back contact 104 of relay FR, through the winding of relay FW, to (−). A stick circuit for relay FW then is completed which includes front contact 387 of relay LW as described above.

With both relays FW and LW now picked up, the circuit for picking up relay ST is completed as described above. A first operation including relays ST, STP and CT is then initiated. Until such time as the function sequence ready relay FSR and the location sequence ready relay LSR are concurrently picked up, the function sequencer and location sequencer are repeatedly advanced to the condition where the system is ready to transmit the positive (+) control energy for sign function SF2 over line FL2 to northbound location NBL4.

As described above, relays OFS, EFS and FSA are operated in combination so as to control relays FS1 and FS2 as described above. Relay FSR is picked up in response to the pick up of relay FS2 through a circuit including front contact 622 of relay FS2 and back contact 624 of relay FS3. Upon pick up of relay FSR, the circuit for advancing the function sequencer which includes back contact 194 of relay FSR is interrupted. Thus, the function sequencer halts in the position where relays FS1 and FS2 remain picked up.

The location sequencer is operated to the position where location sequence relay LS4 is picked up while all of the repeater relays LS1P–LS4P are picked up and stuck by the stick circuit described above. More particularly, upon each operation of relay ST sequentially, a pick-up circuit for a location sequence relay is completed through back contact 194 of relay LSR and front contact 196 of relay ST through the back contacts of the location sequencer repeater relays. When, however, relay LS4 is picked up, a pick-up circuit for relay LSR extends through front contact 616 of relay RFC and also front contact 143 of relay LS4P.

With relays FSR and LSR thus picked up, a circuit is completed for applying positive (+) control energy to function line FL2 inasmuch as relay F2 is also picked up through the circuit described. More particularly, a pick up circuit for relay PPA shown in FIG. 6O is now completed which extends from (+), through front contact 228 of relay AC, through front contact 229 of relay FSR, through front contact 230 of relay LSR, over wire 231, over wire 626, through front contact 627 of relay NOM, through back contact 628 of relay NCM, over wire 629, through front contact 630 of relay F2, over wire 236, through back contact 237 of relay NT1, over wire 238, through the winding of relay PPA, through the winding of relay NPA, through a resistor 239, to ground. Relay PPA is thus picked up. Repeater relay PAP is picked up as its pick up circuit including front contact 578 of relay PPA is completed. Positive (+) control energy is supplied through front contact 240 of relay PPA and through the circuit described which now includes front contact 633 of relay F2, to function line FL2.

In response to the pick up of relay LS4P as described above, a pick-up circuit for location relay NL4 is completed. When relay NL4 picks up, a circuit is completed through front contact 271 of relay NL4 to cause positive (+) control energy (see FIG. 6H) to be supplied to wire 272 extending from FIG. 6T to FIG. 6EE which causes the pick up of relay LC4 at location NBL4-zone 3 (see FIG. 6EE). With relay LC4 picked up, application relay 4A2 is picked up by a circuit extending from positive (+) control energy on function line FL2, through front contact 634 of relay LC4, through the winding of relay LC4, to ground. With relay 4A2 thus picked up, an energizing circuit for the "OPEN" portion of sign RPS is completed and extends from negative (−) energy, through front contact 278 of relay 4A1, through the winding of relay 4L2 and resistor 279 connected in parallel, through front contact 280 of relay 4A2, through the filaments of lamps (not shown) for the "OPEN" portion of sign RPS, to ground.

In response to the pick up of relay NL4, relay L4–RO at the control office is picked up to store the control signal transmitted to the ramp sign RPS. More particularly, the energizing circuit for relay L4–RO extends from (+), through front contact 637 of relay PAP, through back contact 638 of relay NAP, over wire 639, through front contact 640 of relay AC, over wire 641, through front contact 642 of relay F2, over wire 643, through front contact 644 of relay NL4, through the winding of relay L4–RO, over wire 645, through resistor 646, through back contact 647 of relay NAP, through front contact 648 of relay PAP, to (−).

The position of relay L4–RO is compared with the existing indication as indicated by respective positions of indication relays RO–L4 (see FIG. 6W). This comparison of relay positions depends upon the conditioning of the indication circuits for a prior interrogation cycle. This has been described above with regard to an automatic interrogation cycle following the power on operation. In other words, certain of the indication relays shown in FIGS. 6W and 6WA are picked up in combination according to the sequencing of the function sequencer during the interrogation cycle.

As described above when considering the automatic interrogation cycle of operation, location indication relay LI4 is picked up by negative (−) control energy supplied over wire 272 from the control office. Such (−) energy is also supplied through back contact 672 of relay 4A2 (since it's assumed that the control cycle has not as yet been initiated), through front contact 673 of relay 4L2, through front contact 674 of relay LI4, over function line FL2, through front contact 633 of relay F2, over wire 244, through front contact 243 of relay NT1, through front contact 237 of relay NT1, over wire 238, through the winding of relay PPA, through the winding of relay NPA, through resistor 239, to ground. Relay NPA is picked up while relay PPA remains dropped away. A circuit is then completed for picking relay RC–L4 which extends from (+), through front contact 585 of relay NT1, over wire 586, through front contact 660 of relay NAP, through front contact 661 of relay F2, over wire 662, through front contact 663 of relay NL4, over wire 664, through the winding of relay RC–L4, to (−). Relay RC–L4 is stuck by a circuit extending from (+), through back contact 668 of relay NDR (see FIG. 6P), over wire 669, through front contact 670 of relay RC–L4, through the winding of relay RC–L4, to (−).

Thus, returning to the present control cycle which has been initiated as previously discussed, an out-of-correspondence condition now exists when control memory relay L4–RO (see FIG. 6S) is in a position different than relay RO–L4 (see FIG. 6W). The circuits (see FIGS. 6T and 6X) employing contacts of these relays control a lamp ROE employed when distinctively illuminated to indicate the existing position of ramp sign RPS for northbound location NBL4. Under the assumed operating conditions wherein relay L4–RO is picked up and relay RC–L4 is picked up, lamp ROE is energized with flashing energy which extends from (+FL), through front contact 677 of relay RC–L4, over wire 678, through front contact 679 of relay L4–RO, through the filament of lamp ROE, to (−) to provide an indication of out-of-correspondence.

When operating the system to control ramp sign RPS from a "CLOSED" to an "OPEN" position, the indications release relay NDR (see FIG. 6R) is picked up by the circuit described in response to the pick up of interrogate relay NT2. The stick circuits for the indication memory relays employing back contacts of relay NDR are thus interrupted, but the stick circuits for the indication memory relays corresponding to respective field locations are released during the interrogation cycle of operation in groups when the corresponding location sequence relay is picked up, as will be described in detail hereinafter. Thus, in the present example, indication memory relay RO–L4 is released upon pick up of relay LS4.

With relay 4A2 now picked up, the "OPEN" portion of sign RPS is illuminated. During the interrogation cycle when negative (−) control energy is supplied through front contact 548 of relay NT (see FIG. 6H) to the location NBL4-zone 3 over wire 272 to pick up indication relay LI4, a circuit is also completed from a positive (+) energy (see FIG. 6I), through front contact 558 of relay PEM, over wire 559, through back contact 560 of relay FR, over wire 561 to the location NBL4-zone 3, through front contact 689 of relay LI4, through front contact 672 of relay 4A2, through front contact 673 of relay 4L2, through front contact 674 of relay LI4, to function line FL2 which extends to the control office and is connected to relay PPA over the circuit described to cause pick up thereof. Relay PAP is picked up as described to cause a pick up circuit for relay RO–L4 to be completed through its front contact 587 for supplying positive (+) energy appearing on wire 586 through front contact 691 of relay F2 and front contact 692 of relay NL4 to pick up relay RO–L4. Relay RO–L4 is stuck through its front contact 695. Lamp ROE is then energized with steady (+) energy to indicate correspondence between transmitted and received signals through front contact 697 of relay RO–L4 and back contact 677 of relay RC–L4 in FIG. 6X, wire 678, and front contact 629 of relay L4–RO; relay RC–L4 being now dropped away since its stick circuit includes the now opened back contact 698 of relay LS4.

*Control cycle—single sign at multiple locations*

At times, it becomes desirable to control a single sign at each of several locations. For example, it may be desirable to control the speed signs at locations NBL5 and NBL6 in zone 3. To effect operation of the system to control the speed sign L2S at each of the locations NBL5 and NBL6, it is necessary that the operator designate on the control panel CP the northbound zone button NZ3, the speed limit button 2SL for the speed limit "40," and the activate button ACB.

In response to designation of button NZ3, relay Z3M is picked up and stuck through its front contact 54 with northbound zone call relay NZC being subsequently picked up, all as shown in FIG. 6C.

In response to designation of speed limit button 2SL (see FIG. 6B), a circuit is completed for picking up speed limit memory relay L2M which extends from (+), through closed contact 702 of button 3SL, through closed contact 703 of button 1SL, through closed contact 704 of button 2SL, through the upper winding of relay L2M, to (−). A stick circuit for relay L2M then extends from (F+), through back contact 706 of relay L3M, through front contact 707 of relay L2M, through back contact 708 of relay L1M, through the upper winding of relay L2M, to (−). A lamp 710 included with button 2SL is then energized through front contact 711 of relay L2M. Speed function call relay SFC is picked up by a circuit including front contact 714 of relay L2M.

The system is then initiated into operation responsive to the designation of button ACB in that relay AM is picked up through the circuit including front contact 717 of relay SFC and front contact 62 of relay NZC. Activate relays AC and ACP and northbound sequence relays NS and NSP are all picked up in the sequence described above. Also, northbound indication call relay NDC is picked up through the circuit described including front contact 116 of relay NZC.

In response to the pick up of relay L2M, relay LFM (see FIG. 6M) is picked up by a circuit extending from (+), through front contact 720 of relay L2M, over wire 721, through the upper winding of relay LFM, to (−). The pick up of relay LFM changes the mode of operation from the function-location mode as recognized by the description provided above to the location-function mode of operation.

Initially, the relays LW and FW are picked up as described above to indicate that both locations and functions are waiting to be selected for control. More particularly, one pick up circuit completed for relay LW extends from (+), through front contact 735 of relay SFC, through front contact 736 of relay Z3M, over wire 737, through front contact 738 of relay NSP, over wire 739, through back contact 740 of relay LS5P, over wire 741, over wire 144, through back contact 145 of relay LR, through the winding of relay LW, to (−). Another pick-up circuit for relay LW includes front contact 744 of relay SFC, front contact 745 of relay Z3M, and back contact 746 of relay LS6P as may be readily traced. With relay FW also picked up, the stick circuit for relay LW which included front contact 506 of relay FW and front contact 504 of relay LFM is completed.

Initially, location sequencer relay LS1 is picked up by the circuit described above in response to the pick up of relay ST as picked up through front contact 154 of relay FW and front contact 152 of relay LW. According to the description provided, relays LS2–LS5 and their respective repeater relays are picked up in sequence according to the operation of the sequence time relays ST and STP, while relay CT remains picked up. When relay LS5P is picked up, however, a circuit is completed for picking up relay LSR which includes front contact 740 of relay LS5P and back contact 748 of relay LS6P. With relay LSR picked up, the location sequencer is halted in a position where only relays LS1P–LS5P are stuck through back contact 211 of relay LR During the same time, the function sequencer is operating to the extent that relays FS1, FS2, FS3 and FS4 are sequentially picked up according to the operation of relays EFS, OFS, and FSA in the manner described above. As soon as relay FS3 is picked up, however, a circuit is completed for energizing function sequence ready relay FSR which partly includes the energizing circuit described above for relay FW. More particularly, the circuit starts at front contact 98 of relay AC and then includes wire 729, front contact 751 of relay FS3, back contact 752 of relay FS6, wire 217, the winding of relay FSR, to (−).

During the period that the location sequencer and function sequencer are being controlled, the relays ST and STP are picked up and dropped away as described so as to permit front contacts 196 and 170 of relay ST to be opened and closed for thus advancing the respective sequencers. However, control time relay CT remains picked up as long as one of the relays FSR or LSR is dropped away. When both relays FSR and LSR are picked up concurrently, relay CT is dropped away following the release of relay ST and the discharge of capacitor 119 as described above. During this period of time, however, a control energy is transmitted to location NBL5 over function line FL3 to control application relay 5A3. Subsequently, application relays 5A4 and 5A5 are controlled in sequence.

Before describing the detailed circuitry to effect control of relays 5A3, 5A4 and 5A5, it is considered expedient to explain the purpose of controlling all three relays even though it is desired to operate speed sign L2S to display a "40" mile per hour speed limit. In this connection, it may be desirable to use a speed sign such as shown in the pending application Ser. No. 233,808, filed on October 29, 1962 by A. J. Jackson and entitled "Highway Sign." The speed sign disclosed therein generally includes an array of incandescent lamps which are controlled distinctively to provide any one of a plurality of variable speed limits. In the present case, magnetic stick relays are employed as the application relays. In this respect, it is possible that one of such relays would be erroneously operated so that the operation of a particular speed sign to display a speed limit would result in an incorrect display thus confusing those drivers or motorists viewing it.

With relay FS3 picked up, negative (−) control energy is transmitted to location NBL5 over function line FL3 to control application relay 5A3 thereat. More particularly, relay NPA is picked up following the pick up of relay FS3 and its function relay F3 through a circuit extending from (−) energy (see FIG. 6K) and through the circuit described including wire 656 extending to FIG. 6A, through back contact 754 of relay L1M, over wire 755, through front contact 756 of relay F3, over wire 236, through back contact 237 of relay NT1, over wire 238, through the winding of relay PPA, through the winding of relay NPA, through resistor 239, to ground. Negative (−) control energy is then supplied through front contact 249 of relay NPA and over the circuit described including wire 244, through front contact 758 of relay F3, to function line FL3.

Positive (+) control energy is supplied from the control office (see FIG. 6H) through back contact 266 of relay NT when the location sequencer is operated to the condition where LS5P is picked up and relay NL5 is subsequently picked up as described above to cause relays LC5 and LC5P at location NBL5 to be picked up. The negative (−) control energy appearing on function line FL3 is supplied through front contact 760 of relay LC5P, through the winding of relay 5A3, through front contact 301 of relay LC5, to ground. The negative (−) control energy thus insures that relay 5A3 is dropped away to cause the speed sign L1S to be deenergized.

Upon release of relay CT, the pick-up circuit for relay ST is again completed which advances the function sequencer through front contact 170 of relay ST. It is noted here that the control circuit for advancing the function sequencer includes front contact 168 of relay FSR, front contact 250 of relay LSR, and front contact 251 of relay LFM. Relay FS4 is then picked up in the manner described above followed by the pick up of function relay F4. A pick up circuit is completed for relay PPA which includes front contact 763 of relay L2M (see FIG. 6A) and front contact 765 of relay F4 (see FIG. 60). Positive (+) control energy is applied to function line FL4 through the circuit including front contact 240 of relay PPA and front contact 767 of relay F4. Inasmuch as relays LC5 and LC5P remain picked up, a pick up circuit for relay 5A4 is completed through front contact 769 of relay LC5P causing relay 5A4 to be picked up. Speed sign L2S for location NBL5 indicating "40" miles per hour is then energized by the circuit extending from (+), through front contact 308 of relay 5A1, through the winding of relay 5L3–5, through back contact 771 of relay 5A3, through front contact 772 of relay 5A4, through the filaments of lamps (not shown) included with speed sign L2S, to (−).

Following the operation of relays CT and ST, relay ST is again picked up to advance the function sequencer to the position where function sequence relay FS5 is picked up followed by the pick up of function relay F5. Negative (−) control energy is then applied to function line FL5 in that relay NPA is picked up through a circuit similar to those described above but including back contact 776 of relay L3M (see FIG. 6A) and front contact 777 of relay F5 (see FIG. 60). The negative (−) control energy is then supplied to line FL5 through a circuit including front contact 249 of relay NPA and front contact 778 of relay F5. A circuit for applying this (−) initially to relay 5A5 at location NBL5-zone 3 is then completed through front contact 780 of relay LC–5P to cause relay 5A5 to remain dropped away thus insuring that sign L3S remains deenergized.

The control memory relays L5–L1, L5–L2 and L5–L3 (see FIG. 6S) are sequentially controlled according to the operation of function relays F3, F4 and F5 in sequence and relays PAP and NAP. Relays L5–L1 and L5–L3 each has (−) energy supplied thereto in a direction to cause it to remain dropped away, while relay L5–L2 has (+) energy supplied thereto which cause it to be picked up. More particularly, relay L5–L1, for example, has its circuit completed from negative (−) control energy extending through the circuit including front contact 638 of relay NAP (see FIG. 60), front contact 783 of relay F3 and front contact 784 of relay NL5. On the subsequent cycle, however, relay L5–L2 is picked up by circuit extending from (+) and including front contact 637 of relay PAP, front contact 786 of relay F4 and front contact 787 of relay NL5.

Following the pick up of relay FS5, the pick up circuit for relay FW including back contact 730 of relay FS5 (see FIG. 6L) is interrupted to cause the release of relay FW when relay CT is dropped away. Relay LW is, however, stuck by a circuit completed through back contact 746 of relay LS6P (in FIG. 6I), front contact 745 of relay Z3M in FIG. 6B and front contact 744 of relay SFC. Thus, only reset relay FR is picked up to cause relays FS1–FS5 to be reset or dropped away. When relay FS5 is dropped away, a pick up circuit for relay FW including back contact 730 of relay FS5 is completed for picking up relay FW. Relay FR is released according to the discharge of capacitor 397 as described above, while relay FSR is also released.

Relay LS6 and its repeater LS6P of FIG. 6I are picked up in that when relay FR is picked up, as previously described, and advance circuit for the location sequencer is completed through front contact 542 of relay FR (see FIG. 6R) and back contact 544 of relay LR (see FIG. 6U) for picking up relay LS6. The function sequencer is then controlled as described above to the condition wherein function sequence relay FS3 is again picked up.

According to the operation of the function sequencer, the function lines FL3 and FL5 are again supplied with negative (−) control energy in that memory relays L1M and L3M are dropped away, while function line FL4 is supplied with positive (+) control energy in that relay L2M is picked up similar to that described above. In addition, control memory relays L6–L1 and L6–L3 remain dropped away, while relay L6–L2 is picked up by circuits easily traced.

Inasmuch as relays LC6 and LC6P (see FIG. 6FF) are picked up as described above, in response to the selection of location NBL6 by the location sequencing circuitry (relay NL6 of FIG. 6U picked up), application relays 6A3, 6A4 and 6A5 are controlled according to the energy appearing on the corresponding function lines FL3, FL4 and FL5 in sequence. More particularly, negative (−) control energy on line FL3 is supplied through front contact 793 of relay LC6P, through the winding of relay 6A3, through front contact 329 of relay LC6, to ground to cause relay 6A3 to remain dropped away. Positive (+) control energy on line FL4 is supplied through front contact 794 of relay LC6P, through the winding of relay 6A4, through front contact 329 of relay LC6, to ground to cause relay 6A4 to pick up. Negative (−) control energy on function line FL5 is supplied through front contact 795 of relay LC6P, through the winding of relay 6A5, through front contact 329 of relay LC6, to ground, to cause relay 6A5 to remain dropped away.

A circuit is now completed for causing speed sign L2S for location NBL6 to be illuminated for displaying a "40" miles per hour speed limit, while insuring that the speed signs L1S and L3S thereat remain deenergized. More specifically, a circuit extends from (+), through front contact 797 of relay 6A1, through the winding of relay 6L3–5 and variable resistor 796, through back contact 798 of relay 6A3, through front contact 799 of relay 6A4, through the filaments of lamps (not shown) included with sign L2S for displaying the speed limits "40," to (−).

Inasmuch as it is assumed in the present example, that only the speed signs L2S for locations NBL5 and NBL6 are operated to display the "40" mile speed limit, the apparatus at the control office now functions to reset in the manner described above. When the function sequencer, location sequencer and the other relays employed for the control cycle are thus reset, an interrogation cycle of operation is initiated in that relay NDC is picked up by the circuit described above at the start of the control cycle of operation. It is noted here that an interrogation cycle of operation for only the northbound locations and signs thereat is initiated in that the southbound indication call relay SDC remains dropped away. As shown in FIG. 6J, the stick circuit for relay NT includes only front contact 460 of relay NDC as long as relay SDC is dropped away. Thus, an interrogation cycle of operation similar to that described above is automatically initiated and completed as long as no control signal is initiated.

*Control cycle—multiple signs at single location*

At times, it becomes desirable to control multiple signs at a single location. For example, it may be desirable to control speed sign L3S to display "55" miles per hour and the lane "4" arrow sign 4AS at location NBL6 in zone 3. It is noted that the signs L3S and 4AS display different aspects, but similar signs such as 4AS and 3AS could be controlled to display similar aspects as is apparent from the description thus given. To effect operation of the system to control speed sign L3S to display "55" miles per hour speed limit as well as operating lane 4 sign 4AS for location NBL6, it is necessary that the operator designate on the control panel CP the northbound zone button NZ3, the speed limit button 3SL for the speed limit "55," the lane 4 arrow button L4A, and the activate button ACB.

In response to designation of button NZ3, relay Z3M is picked up and stuck through its front contact 54, while causing the pick up of relay NZC (see FIG. 6C).

In response to designation of speed limit button 3SL, a circuit is completed for picking up memory relay L3M which extends from (+), through closed contact 704 of button 2SL, through closed contact 703 of button 1SL, through closed contact 702 of button 3SL, through the upper winding of relay L3M, to (−). A stick circuit is completed for relay L3M which extends from (F+), through back contact 803 of relay L1M, through back contact 804 of relay L2M, through front contact 805 of relay L3M, through the upper winding of relay L3M, to (−). A lamp 807 included with button 3SL is then energized through front contact 808 of relay L3M. Speed function call relay SFC is picked up by a circuit including front contact 809 of relay L3M.

Referring to FIG. 6D, designation of arrow button L4A for lane 4 causes relay 4AM to be picked up and stuck. Lamp 811 associated with button L4A is energized then through front contact 812 of relay 4AM. Lane function call relay LFC (see FIG. 6E) is picked up by the circuit including front contact 814 of relay 4AM.

Location function mode relay LFM (see FIG. 6M) is picked up by the circuit described above but including front contact 817 of relay L3M (see FIG. 6B). The pick up of relay LFM thus changes the mode of operation for the system from the function-location mode similar to that described to the location-function mode inasmuch as it is desired to control speed sign L3S at location NLB6.

The activation circuits are now operated in that activate memory relay AM has its pick up circuit completed upon designation of activate button ACB. The pick up circuit is similar to that described above except that it now includes front contact 819 of relay LFC (see FIG. 6F). Activate relays AC and ACP are then picked up with associated lamps being energized as described above to indicate the activation condition of the system. Also, northbound sequence relays NS and NSP are picked up in the sequence described above.

Both the locations waiting relay LW and the functions waiting relay FW are initially energized as described above to indicate that both locations and functions are waiting to be selected for control. Inasmuch as the call relays SFC and LFC are now picked up, two circuits are completed for picking relay LW, one being completed through front contact 745 of relay Z3M and back contact 740 of relay LS5P and the other being completed through front contact 745 of relay 23M and back contact 746 of relay LS6P. Two pick up circuits are also completed for functions waiting relay FW. One such circuit extends from (+), through front contact 98 of relay AC, over wire 724, through back contact 725 of relay NL4, through back contacts of northbound and southbound location relays not including the speed sign indicated at 726, over wire 727, through front contact 821 of relay L3M, over wire 729, through back contact 730 of relay FS5, over wire 731, over wire 103, through back contact 104 of relay FR, through the winding of relay FW, to (−). The other pick up circuit further extends through the contacts indicated at 726 (see FIG. 6U, through back contacts of southbound location relays not having lane signs indicated at 823, through back contact 824 of relay NL5, through back contacts of northbound location relays not having lane signs indicated at 825, over wire 826, through front contact 827 of relay LFM, over wire 828, through front contact 829 of relay 4AM, over wire 830, through back contact 831 of relay FS9, over wire 103, through the winding of relay FW as described.

With relays LW and FW picked up concurrently, the sequencing circuits including relays ST and STP and the control time relay CT are operated in the manner described above for advancing the location sequence and function sequencer to respective positions whereat control energy is transmitted to location NBL5.

In the present embodiment, the speed limit circuits are so organized that all of the speed signs within a particular zone are controlled in sequence to display the same speed limit. More particularly, and in view of the present example, the speed signs L3S for locations NBL5 and NBL6 in zone 3 are controlled for displaying the speed limit of "55" miles per hour even though it is desired to operate sign L3S at location NBL6 as assumed. Separate control of the speed signs for a zone could be attained by merely providing additional selection circuits similar to that provided herein.

Initially, relay LS1 is picked up by the circuit described above in response to the pick up of relay ST. Relays ST and STP are operated as described above to picked up and released conditions for picking, in this instance, relays LS1–LS5, in sequence. Also, repeater relays LS1P–LS5P are picked up and stuck through the circuit described. When relay LS5P is picked up, a pick up circuit for relay LSR is completed through front contact 740 of relay LS5P and back contact 748 of relay LS6P as described above. Thus, the advance circuit for the location sequencer is interrupted in that back contact 194 of relay LSR is now open.

During the same time, the function sequencer is operated in the manner described above as relay ST is picked up and then dropped away repeatedly in that the advancing circuit over wire 171 is completed through front contact 170 of relay ST and back contact 168 of relay FSR. When relay FS3 is picked up, a pick-up circuit is completed for relay FSR which includes front contact 751 of relay FS3 and back contact 752 of relay FS6 (see FIG. 6H). As will be recalled from above, the function lines FL3, FL4 and FL5 have either negative (—) control energy or positive (+) control energy applied thereto depending upon the designation of the speed limit button and thus the memory relay held picked up. As described above, the application relays 5A3, 5A4 and 5A5 are provided to control the energizations of respective signs L1S, L2S and L3S, for location NBL5 in zone 3.

In response to the pick up of relay FS3, relay NPA (see FIG. 60 is picked up in that memory relay L1M is dropped away by the circuit described. This causes negative (—) control energy to be placed on function line FL3 through front contact 249 of relay NPA as described above. Inasmuch as relay LS5 is picked up which causes relay NL5 to also be picked up, relays LC5 and LC5P at location NBL5 are picked up in the manner described above. Thus, relay 5A3 has its control circuit completed through front contact 760 of relay LC5P and front contact 301 of relay LC5. Relay 5A3 remains dropped away.

When relay ST is again picked up, the function sequencer is advanced to cause relay FS4 to be picked up. Negative (—) control energy is subsequently applied to line FL4 in that relay NPA is again picked up inasmuch as memory relay L2M is dropped away. The control circuit for application relay 5A4 at location NBL5 then is completed as described above to insure that relay 5A4 remains dropped away.

The function sequencer is sequentially advanced according to the pick up of relay ST once again to cause relay FS5 to be picked up. Positive (+) control energy is subsequentially applied to line FL5 in that relay PPA has its pick up circuit completed through front contact 776 of relay L3M (see FIG. 6A). Application relay 5A5 is then picked up in that current flows through the pick up winding thereof. Sign L3S for location NBL5 is controlled to display the "55" miles per hour speed limit in response to the completion of the circuit extending from (+), through front contact 308 of relay 5A1, through the winding of relay 5L3–5, through back contact 771 of relay 5A3, through back contact 772 of relay 5A4, through front contact 834 of relay 5A5, through the filaments of lamps (not shown) with signs L3S, to (—).

Upon release of control time relay CT, the function sequencer is reset inasmuch as relay FW is released in spite of the fact that relay 4AM is picked up. As shown in the chart of FIG. 5, location NBL5 in zone 3 does not include any lane signs as indicated by the absences of "X" in the columns headed SF6–SF10 pertaining to lanes 1 through 5. Thus, the pick-up circuit for relay FW is seen to include back contact 824 of northbound location relay NL5. Inasmuch as relay NL5 is picked up, relay FW is dropped away. The stick circuit therefor including front contact 499 of relay CT is interrupted when relay CT releases following the fifth stepping cycle. As described above, reset relay FR is picked up upon release or relay FW, to cause resetting of the function sequencer relays FS1–FS5 to dropped away positions.

Upon pick up of relay FR, the location sequencer is advanced to the condition where relay LS6 is picked up through a circuit as described above including front contact 542 of relay FR (see FIG. 6R). Repeater relay LS6P is subsequently picked up through front contact 312 of relay LS6 as described above. In this operation, relays LW and LSR are maintained picked up by easily traceable circuits.

With relays FS1–FS5 now dropped away, a pick-up circuit as described above is completed for picking up relay FW. With relay LW also picked up, relays ST and STP are controlled as described above, while relay CT is maintained picked up through back contact 107 of relay FSR. Thus, relays FS1, FS2 and FS3 are sequentially picked in as the function sequencer is advanced in the manner described. With relay FS3 picked up, a pick-up circuit as described above is completed for relay FSR. An operation is then initiated to cause application relay 6A3 at the next location NBL6 in FIG. 6FF to be supplied with (—) control energy for insuring that such relay remains dropped away. That is, negative (—) control energy is supplied over function line FL3 in that relay NPA is picked up by the circuit described above. Also, inasmuch as relay NL6 is picked up in response to the pickup of relay LS6P, positive (+) control energy is supplied over wire 324 to the location NBL6 in zone 3 for causing relays LC6 and LC6P to be picked up. Negative (—) control energy then appearing on function line FL3 is supplied to the winding of relay 6A3 to insure that such relay is dropped away.

The function sequencer subsequently receives an advance pulse over wire 171 as relay ST operates so that relay FS4 is picked up. The system then operates to cause function line FL4 to be energized with a negative (—) control energy, which is applied to the winding of relay 6A4 so that it is insured that relay 6A4 remains dropped away.

The function sequencer subsequently receives an advance pulse over wire 171 as relay ST again operates so that relay FS5 is picked up. Inasmuch as relay L3M is held picked up, relay PPA is picked up by the circuit described above to cause positive (+) control energy to be supplied to function line FL5. Application relay 6A5 at location NBL6 is picked up in that such positive (+) control energy is applied thereto through the circuit described above. As shown in FIG. 6GG, speed limit sign L3S for displaying the "55" miles per hour speed limit is controlled through a circuit including front contact 836 of relay 6A5.

The function sequencer is advanced to the condition where function sequence relay FS9 is picked up. In this condition, a pick-up circuit is completed for relay FSR which includes front contact 831 of relay FS9 and back contact 841 of relay FS10 while relay FW is dropped away. Also, function relay F9 is picked up upon pick up of relay FS9.

Function line FL9 is supplied with a positive (+) control energy in that relay PPA is picked up by a circuit including front contact 842 of relay 4AM and back contact 843 of relay 4XM (see FIG. 6D) as well as front contact 844 of relay F9. Application relay 6A9 is subsequently picked up, in response to the energization of line FL9, by a circuit including front contact 847 of relay LC6P. Sign 4AS for location NBL6 (see FIG. 6GG) is controlled through a circuit including front contact 338 of relay 6A9 to display a green arrow.

Inasmuch as there are no other signs to control for northbound locations, both relays FW and LW are dropped away. More particularly, the stick circuit for relay FW including front contact 499 of relay CT opens when relay CT drops away. Also, the stick circuit for relay LW including front contact 506 of relay FW is thus interrupted to cause relay LW to drop away. The system apparatus is then reset in that the relays FR and LR are concurrently picked up to cause all relays employed for the control cycle of operation to be dropped away so that an automatic interrogation cycle of operation of the northbound zones may be initiated. With indication call relay NDC picked up and stuck, interrogate relay NT is picked up which causes circuits to be completed for initiating an automatic interrogation of the positions of all northbound aspect display signs at the locations NBL1–NBL13.

*Control cycle—multiple signs at multiple zones*

At times, it becomes desirable to control multiple signs in each of several locations which locations may comprise more than one zone. For example, it may be desirable to control the lane signs 3AS and 4XS at each of the locations NBL6 and NBL7 included respectively in zones 3 and 4. To effect operation of the system to thus control such signs 3AS and 4XS at each of the locations NBL6 and NBL7, the operator must designate the northbound zone buttons NZ3 and NZ4, the lane 3 arrow button L3A, the lane 4 "X" button 4XS and the activate button ACB.

In response to designation of button NZ3, relay Z3M (see FIG. 6C) is picked up and stuck through its front contact 54 as described above. In response to designation of button NZ4, relay Z4M is picked up and stuck through its front contact 53, as described above. Northbound zone call relay NZC is subsequently picked up when its pick-up circuit is completed through front contacts of relays Z3M and Z4M such as front contact 59 of relay Z3M as described.

Relays 4XM and 3AM (see FIG. 6D) are picked up in response to designation of buttons L4X and L3A, respectively. Also, lamps 850 and 851 for buttons L4X and L3A respectively are energized through front contacts of respective relays 4XM and 3AM as shown. The lane function call relay LFC (see FIG. 6E) is picked up in that two pick-up circuits are completed, one including front contact 853 of relay 3AM and the other including front contact 854 of relay 4XM.

The activation circuits are operated in that activate memory relay AM (see FIG. 6J) has its pick-up circuit completed upon designation of activate button ACB which includes front contact 819 of relay LFC and front contact 62 of relay NZC. Activate relays AC and ACP are subsequently picked up with associated lamps being controlled to indicate the activated condition of the system. Also, northbound sequence relays NS and NSP are picked up in the sequence described above.

Both the locations waiting relay LW and the functions waiting relay FW are initially picked up as described above to indicate that both locations and functions are waiting to be selected for control purposes. Two pick-up circuits are completed for relay LW, one of which includes front contact 855 of relay LFC and back contact 746 of relay LS6P shown respectively in FIGS. 6E and 6I, while the other circuit includes front contact 856 of relay Z4M and back contact 857 of relay LS7P. Two pick up circuits are completed for relay FW, one of which includes front contact 859 of relay 4XM, while the other includes front contact 860 of relay 3AM (see FIG. 6E).

With relays LW and FW now picked up, the sequencing circuits including relays ST and STP and the control time relay CT are operated in the manner described above. In this connection, one stick circuit for relay FW includes front contact 387 of relay LW (see FIG. 6U) and back contact 385 of relay LFM (see FIG. 6M), while a second stick circuit includes front contact 499 of relay CT as described above. In this respect, relay LFM remains dropped away which indicates that the system operates in the function-location mode of operation. Thus, the function sequencer is halted in each of the positions where one of the relays FS8 and FS9 is picked up, while the location sequence is advanced through its different positions with control signals being transmitted for sign functions SF8 and SF9 in sequence. The stick circuit for relay LW includes front contact 147 of relay CT (see FIG. 6N).

During the initial operation of the location sequencer, relay LS1 therein is picked up by the circuit described above including front contact 196 of relay ST. As described, relays ST and STP operate to picked up and dropped away conditions in a sequence according to the discharge of respective capacitors 160 and 164 (see FIG. 6Q). In this operation, the location sequencer relays LS1–LS6 are picked up in sequence so as to cause respective repeater relays LS1P–LS6P to also be picked up in sequence and stuck through back contact 211 of relay LR (see FIG. 6U). When relay LS6P is picked up, however, a pick-up circuit for relay LSR is completed through front contact 746 of relay LS6P and back contact 862 of relay LS7P which causes the location sequencer advance circuit including back contact 194 of relay LSR to be interrupted. The location sequencer is thus momentarily stopped in the position where relays LS1P–LS6P are picked up, while the remaining relays LS7P–LS13P are still dropped away so that a control signal may be transmitted to location NBL6.

During approximately the same time, the function sequencer is operated in the manner described above as relay ST is picked up and dropped away repeatedly in that the sequence circuit including front contact 170 of relay ST is intermittently closed. Inasmuch as lane 3 corresponds to sign function SF8 according to the chart of FIG. 4, sequential operation of the function sequencer continues until relay FS8 is picked up. When relay FS8 is picked up, however, a pick-up circuit is completed for relay FSR which includes front contact 864 of relay FS8 and back contact 865 of relay FS9 (see FIG. 6H). With relay FSR picked up, the advancing circuit as described above including back contact 168 of relay FSR is interrupted. The system is now in condition for transmitting a control signal to the field location NBL6 to operate lane sign 3AS. As shown in the code chart of FIG. 4, positive (+) ON control energy is required to operate sign 3AS for lane 3, to an "ON" or energized condition.

Northbound location NBL6 in zone 3 is selected as relay LC6 thereat is picked up when positive (+) control energy is applied to wire 324 extending to FIG. 6FF through front contact 323 of relay NL6. Relay LC6P is also picked up as described above so that a circuit for the application relay 6A8 is completed to function line FL8. Relay PPA is picked up in that its pick-up circuit is completed through front contact 867 of relay 3AM and back contact 868 of relay 3XM (see FIG. 6D). Thus, positive (+) control energy is supplied to function line FL8 through a circuit including front contact 240 of relay PPA and front contact 869 of relay F8. The pick up circuit for relay 6A8 is subsequently completed through front contact 871 of relay LC6P and front contact 329 of relay LC6. Relay 6A8 is picked up and completes a circuit for controlling sign 3AS (see FIG. 6GG) which includes front contact 334 of relay 6A1 and front contact 335 of relay 6A8 as described above.

Control time relay CT is maintained picked up for a sufficient time as determined by the discharge of capacitor 110 so that relay 6A8 may be properly controlled. Upon release of relay CT, relays ST and STP are again picked up in sequence. Inasmuch as relay LFM is dropped away, only the location sequencer is advanced upon pick up of relay ST through front contact 196 thereof and through the circuit described above including back contact 251 of relay LFM and front contacts 168 and 250 of relays FSR and LSR, respectively. A pick-up circuit is thus completed for relay LS7 to cause pick up thereof. Repeater relay LS7P is subsequently picked up as its pick up circuit including front contact 336 of relay LS7 is completed. Relay LSR remains picked up in that a pick up circuit is completed through front contact 857 of relay LS7P and back contact 873 of relay LS8P (see FIG. 6M) and front contact 856 of relay Z4M (see FIG. 6C). The system is now in condition for transmitting a control signal to location NBL7-zone 4 for controlling application relay 7A8 (see FIG. 6GG).

Relay LC7 has its pick-up circuit completed over wire 346 in that the location relay NL7 is now picked up. Its repeater relay LC7P is also picked up as the circuit through front contact 349 of relay LC7 is completed. A pick-up circuit for relay 7A8 is completed to function line FL8 through front contact 870 of relay LC7P and front contact 351 of relay LC7. Sign 3AS at location NBL7 is thereby actuated.

Upon release of relay CT, the stick circuit for relay LW including front contact 147 of relay CT is opened thus causing relay LW to drop away. Reset relay LR is picked up to cause the relays LS1P–LS7P to release. Upon release of relays LS6P and LS7P, the pick up circuits described above including back contacts 746 and 857 thereof for relay LW are completed once again. With relay LW thus picked up and relay LSR dropped away, the location sequencer is advanced to the position where relays LS6 and LS1P–LS6P are picked up.

Upon pick up of relay LR, the function sequencer is advanced by a circuit including front contact 402 of relay LR and back contact 540 of relay LFM as described above. Relay FS9 is thus picked up.

Relay NPA (see FIG. 6O) is picked up by a circuit including front contact 844 of relay F9 and front contact 843 of relay 4XM. Thus, negative (−) control energy is supplied to function line FL9 through a circuit including front contact 249 of relay NPA and front contact 879 of relay F9. The negative (−) control energy on function line FL9 when applied to relay 6A9 causes such relay to remain dropped away. As shown in FIG. 6GG, sign 4XS for lane 4 at northbound location NBL6 in zone 3 is illuminated as its energizing circuit is completed through back contact 338 of relay 6A9 as described above.

Control time relay CT is maintained picked up for a sufficient time as determined by the discharge of capacitor 110 so that relay 6A9 may be properly controlled. Upon release of relay CT, relays ST and STP are again picked up in sequence. Inasmuch as relay LFM is dropped away, only the location sequencer is advanced upon pick up of relay ST through front contact 196 thereof and through the circuit described above including back contact 251 of relay LFM and front contacts 168 and 250 of relay FSR and LSR, respectively. A pick-up circuit is thus completed for relay LS7 to cause pick up thereof. Repeater relay LS7P is sequentially picked up as the pick-up circuit including front contact 336 of relay LS7 is completed. Relay LSR remains picked up in that a pick up circuit is completed through front contact 857 of relay LS7P and back contact 873 of relay LS8P (see FIG. 6M) and front contact 856 of relay Z4M (see FIG. 6C). The system is now in condition for transmitting a control signal to location NBL7-zone 4 for controlling application relay 7A9 (see FIG. 6GG).

Relay LC7 has its pickup circuit completed over wire 346 in that the location relay NL7 is now picked up. Its repeater relay LC7P is completed. A pick up circuit for relay 7A9 is completed to function line FL9 through front contact 877 of relay LC7P and front contact 351 of relay LC7. The negative (−) control energy on function line FL9 when applied to relay 7A9 causes such relay to remain dropped away. As shown in FIG. 6HH, sign 4XS for lane 4 at northbound location NBL7 in zone 4 is illuminated as its energizing circuit is completed through back contact 360 of relay 7A9 as described above.

Upon release of control time relay CT, the stick circuit for relay LW including front contact 147 of relay CT is interrupted. Relay LW drops away thus opening the stick circuit for relay FW which includes front contact 387 of relay LW to cause relay FW to drop away. The reset circuit then becomes effective in that reset relays LR and FR are picked up concurrently in that their circuits are completed through back contact 374 of relay LW and back contact 392 of relay FW, respectively. The location sequencer repeater relays LS1P–LS7P are dropped away, while the function sequence relays FS1–FS9 are also dropped away. Upon release of the relays employed during the control cycle of operation for the northbound sequence, an automatic interrogation cycle of operation is initiated by the system in that northbound indication call relay NDC is picked up and stuck initially so that a pick-up circuit is completed for interrogate relay NT when the control office apparatus is reset. A typical example of an automatic interrogation cycle of operation following a control cycle of operation will be considered hereinafter.

*Control signal storage*

In each of the operations described above, the control signal transmitted to the selected field location is stored in a relay memory irrespective of the polarity of the control signal transmitted. The relay storage for the typical circuits shown herein is found in FIGS. 6S and 6W. In this respect, there is one relay of the magnetic-stick type for each of the aspect display signs which requires positive (+) control energy for turn-on and negative (−) control energy for turn-off as shown in the chart of FIG. 4.

It is described above how relays L4–RO and L5–L2 are picked up for typical operations, while negative (−) control energy is supplied to relays L5–L1 and L5–L3 to cause such relays to drop away.

In the above example where speed sign L3S for location NBL6 is controlled to display the speed limit "55" while negative control (−) energy is provided for insuring that signs L1S and L2S are deenergized, memory relays L6–L1 and L6–L2 are supplied with negative (−) control energy to insure that such relays are dropped away, while relay L6–L3 is supplied with (+) control energy to cause pick up thereof. The operation for these memory relays is similar to that described for relays L5–L1, L5–L2 anud L5–L3 except that relay L6–L3 is picked up. Assuming that signs 4AS for locations NBL6 and NBL7 are initially displaying a green arrow, storage relays L6–4A and L7–4A (see FIG. 6W) would be initially picked up. In a succeeding example, the lane sign 4XS for both locations NBL6 and NBL7 in zones 3 and 4, respectively, are subsequently energized. Accordingly, the storage relay L6–4A would then be supplied with negative (−) control energy to cause it to drop away. Similarly, it will furthermore be assumed that signs 3AS at locations NBL6 and NBL7 have been energized so that relay L7–4A is supplied with negative (−) control energy to cause it to drop away. Also, relays L6–3A and L7–3A are supplied with positive (+) control energy in sequence according to location selection to cause pick up of such relays.

Considering the operation of relay L6–4A as being typical of the operations of other storage relays, it will be clear therefrom how each relay may store either a positive (+) or negative (−) control signal which represents the existing condition of the sign at the field location. In the first instance, positive (+) control energy is supplied to location NBL6 and sign 4AS thereat to turn it on. In this operation, relay PPA is picked up which causes its repeater relay PAP to also be picked up. Upon pick-up of relay PAP, a pick-up circuit for relay L6–4A is completed from (+), through front contact 637 of relay PAP, through back contact 638 of relay NAP, over wire 639, through front contact 640 of relay AC, over wire 641, through front contact 880 of relay F9, over wire 881, through front contact 882 of relay NL6, over wire 883, through the winding of relay L6–4A, over wire 645, through resistor 646, through back contact 647 of relay NAP, through front contact 648 of relay PAP, to (−). In the second instance, negative (−) control energy is supplied to location NBL6-zone 3 to drop away application relay 6A9, thus causing sign 4XS for location NBL6 to be turned on and causing sign 4AS to be turned off. To effect transmission of this negative (−) control energy, relay NPA is picked up while its repeater NAP is subsequently picked up. Upon pick up of relay NAP, a drop away circuit for relay L6–4A is completed which includes front contacts 638 and 647 of relay NAP. The other control memory relays mentioned for storing the last control signals transmitted to the respective field locations are either picked up or dropped away according to the polarity of control signal transmitted. The circuits therefor may be readily traced in FIGS. 6K, 6O, 6S and 6W.

*Automatic interrogation following control cycle*

After each control cycle of operation such as the typical control cycles of operation described above, an automatic interrogation of the existing positions or conditions of the aspect display signs at the respective field locations is initiated. It is described above, in particular, how the interrogation cycle of operation is completed after the sign power function is initiated to cause power to be applied to the aspect display signs at all field locations. As shown in the drawings, all aspect display signs are in the off condition in that the sign power application relays, such as application relay 6A1 for location NBL6, are initially dropped away which interrupts the energizing circuits for the particular aspect display signs at each field location.

Considering now the above described control cycle of operation wherein the lane signs 4XS and 3AS for both locations NBL6 and NBL7 are controlled, the automatic interrogation cycle of operation following completion of the reset operation wherein the relays of the function sequencer and the location sequencer are reset to dropped away conditions and the relays employed for the control cycle are also dropped away will now be described.

Inasmuch as relay NDC is picked up and stuck during the control cycle through its stick circuit including the front contact 447 thereof and back contact 446 of relay NT1 (see FIG. 6J), a pick-up circuit for relay NT is completed at the end of the control cycle which includes front contact 460 of relay NDC. The interrogation cycle of operation is thus initiated as interrogate repeater relays NT1 and NT2 are subsequently picked up.

Inasmuch as only northbound locations are controlled as indicated by the pick up of relay NDC, a northbound sequence is initiated upon pick up of northbound sequence relay NS and its repeater NSP. In order that all prior indication signals stored by the indication memory relays (see FIGS. 6W and 6AA) be released, northbound indications release relay NDR (see FIG. 6R) is picked up in response to the pick up of relay NS. However, back contacts of the location sequence relays (see FIGS. 6H and 6L) are employed in stick circuits for the particular indication relays shown corresponding to northbound locations NBL4–NBL7. Thus, although relay NDR is picked up, the indication memory relays are not released until such time as a corresponding location sequence relay is also picked up.

On all interrogation cycles of operation, the location function mode relay LFM is picked up in that a pick-up circuit for relay LFM described above and including front contact 486 of relay NT is completed. Thus, the mode of operation selected is the location-function mode wherein the location sequencer stops or halts at each location while the function sequencer is stepped through the sign functions depending on those present for the existing location. In this connection, relay LW is stuck through a circuit including front contact 490 of relay NT (see FIG. 6I) and back contact 369 of relay LS13P (see FIG. 6M). In addition, a pick-up circuit for relay LSR includes front contact 507 of relay NT and front contact 508 of relay LS1P which sticks relay LSR until the location sequencer is reset. The advance circuit for the location sequencer initially includes back contact 194 of relay LSR for picking up relay LS1, but thereafter includes front contact 495 of relay NT (see FIG. 6I) and front contact 542 of relay FR (see FIG. 6R) when the reset circuit for the function sequencer is effective.

The function sequencer relays FS1–FS10 are picked up in sequence only as limited by the sign functions required for a given location in that relays FW and FSR are initially picked up and stuck until relay FS10 is picked up or the sequence relay FS3–FS9 corresponding to the last sign function transmitted to a given location is picked up, at which time, relay FW is dropped away following the release of relay CT, but relay FSR is maintained stuck until such times as the reset circuit becomes effective. More particularly, relay FW is initially picked up by the circuit including back contact 102 of relay FS1 and front contact 493 of relay NT1, and is stuck through its stick circuit including front contact 499 of relay CT. As the function sequencer is advanced, a plurality of pick-up circuits for relays FW and FSR including front contacts 493, 534, 885, 886 and 887 of relay NT1 and front contact 498 of relay NT are completed only as limited by the contacts of the location relays (see FIG. 6U).

In the present example, it is assumed that the location sequencer is halted so that indication signals are received from each of the field locations NBL1–NBL5, while for each of the field locations, the function sequencer is operated so that the function sequencer relays FS1–FS10 are sequentially picked up depending on the field location selected with sufficient control time being alloted to the steps wherein the particular location has a sign corresponding to the function step. When the location sequencer advances to the position wherein relay LS6 is picked up, during interrogation of location NBL6, all of the indication memory relays (see FIGS. 6W and 6AA) pertaining to location NBL6 will be controlled in sequence. With relay LS6 picked up, the stick circuits described employing back contact 602 of relay LS6 are opened.

Initially, with relay ST dropped away during the first stepping cycle and before relay CT drops away, a pick-up circuit is completed for energizing relay PEM (see FIG. 6I) which includes back contact 163 of relay ST and front contact 553 of relay FSR as described above. Inasmuch as northbound location relay NL6 is picked up, negative (−) control energy is supplied through front contact 548 of relay NT (see FIG. 6H) and through the circuit including front contact 323 of relay NL6 and over wire 324 to field location NBL6 in zone 3 to cause the location indication relay LI6 to be picked up and the subsequent pick up of relay LI6P through front contact 888 of relay LI6. A circuit is thereby completed for picking up relay PPA (see FIG. 6O) which extends from (+), through front contact 558 of relay PEM, over wire 559, through back contact 560 of relay FR, over wire 561 to location NBL6-zone 3, through front contact 889 of relay LI6, through front contact 890 of relay 6A1, through front contact 891 of relay LI6P, over function line FL1, through front contact 245 of function relay F1, over wire 244, through front contact 243 of relay NT1, through front contact 237 of relay NT1, over wire 238, through the winding of relay PPA, through the winding of relay NPA, through resistor 239, to ground. The positive (+) control energy is of the polarity to pick up relay PPA which subsequently causes relay PAP to be picked up. A pick-up circuit for relay PNI6 is completed from (+), through front contact 585 of relay NT1, over wire 586, through front contact 587 of relay PAP, through front contact 588 of relay F1, over wire 589, through front contact 893 of relay NL6, through the winding of relay PNI6, to (−). Relay PNI6 is held picked up through its front contact 895 following the release of relay LS6.

Inasmuch as northbound location NBL6 does not have a ramp sign, the function relay FS2 is picked up, but no circuit is completed for picking up either relay PPA or relay NPA (see FIG. 6O) in that location NBL6-zone 3 does not include an application relay for step 2. Thusly, the absence of an "X" for sign function SF2 opposite to location NBL6 in zone 3 in the chart of FIG. 5 indicates the absence of a ramp sign thereat.

Upon pick-up of relay ST following the drop away of relay CT, the function sequencer is advanced to the position where relay FS3 is picked up. Inasmuch as application relay 6A3 is dropped away, the pick-up circuit for relay L1–L6 (see FIG. 6W) which is the memory relay for sign L1S at location NBL6 is not completed, thus causing such relay to remain dropped away. The sequence continues as relay CT is dropped away and relay ST is subsequently picked up for causing relay FS4 to be picked up. Similarly, relay 6A4 at location NBL6 is dropped away which causes the corresponding memory relay L2–L6 at the control office to remain dropped away.

The next step causes the function sequencer to be advanced to the position where relay FS5 is picked up with relay F5 also being picked up in the manner as described above. If it is assumed that application relay 6A5 at location NBL6 in zone 3 is picked up to indicate that sign L3S is on, a circuit is completed for picking up relay PPA and its repeater PAP (see FIG. 6O). The pick-up circuit extends from positive (+) control energy appearing on wire 561 as described, through front contact 889 of relay LI6, through front contact 897 of relay 6A5, through front contact 898 of relay 6L3–5, through front contact 899 of relay LI6P, over function line FL5, through front contact 778 of relay F5, over wire 244, through front contact 243 of relay NT1, through front contact 237 of relay NT1, over wire 238, through the winding of relay PPA, through the winding of relay NTA, through resistor 239, to ground. Relay PPA and its repeater PAP are thus picked up. A pick up circuit is then completed for relay L3–L6 (see FIG. 6AA) which extends from (+), through front contact 585 of relay NT1, over wire 586, through front contact 587 of relay PAP, through front contact 900 of relay F5, over wire 901, through front contact 902 of relay NL6, over wire 903, through the winding of relay L3–L6, to (−). The stick circuit for relay L3–L6 is completed through its front contact 905.

In the present disclosure, only the circuits for lanes 3 and 4 are considered. Thus, although not shown, it should be obvious that if it is here assumed that the lane signs for lanes 1 and 2 at location NBL6 are not in condition to display an arrow (see FIG. 4), then the corresponding application relays 6A6 and 6A7 would be dropped away so that their corresponding memory relays at the control office would also remain dropped away.

During the eighth stepping cycle, relays FS8 and F8 are picked up according to the description provided above, and, assuming that lane sign 3AS for location NBL6 has been energized to display an arrow, relay PPA and its repeater PAP would consequently be picked up in sequence. The pick-up circuit for relay PPA is completed from the positive (+) control energy appearing on wire 561 and further including front contact 889 of relay LI6, front contact 907 of relay 6A8, front contact 908 of relay 6L8, front contact 909 of relay LI6P and over function line FL8 as described above. The corresponding memory relay 3A–L6 (see FIG. 6AA) is picked up by a circuit completed through front contact 911 of relay F8 and front contact 912 of relay NL6. The stick circuit therefor is completed through its front contact 913.

The next step causes the function sequencer to be advanced to the position where relay FS9 is picked up. Function relay F9 is subsequently picked up. Inasmuch as application relay 6A9 is dropped away, relay NPA at the control office is picked up by a circuit which extends from (−), through front contact 548 of relay NT, over wire 549, through back contact 550 of relay AC, through front contact 269 of relay LSR, over wire 270, through front contact 323 of relay NL6, over wire 324, through front contact 888 of relay LI6, through back contact 916 of relay 6A9, through front contact 917 of relay 6L9, through front contact 918 of relay LI6P, over function line FL9, through front contact 879 of relay F9, over wire 244, through front contact 243 of relay NT1, through front contact 237 of relay NT1, over wire 238, through the winding of relay PPA, through the winding of relay NPA, through resistor 239, to ground. The polarity is such that relay NPA is picked up with its repeater relay NAP thus being subsequently picked up. A pick-up circuit is then completed for relay 4X–L6 which extends from (+), through front contact 585 of relay NT1, over wire 586, through front contact 660 of relay NAP, through front contact 920 of relay F9, over wire 921, through front contact 922 of relay NL6, over wire 923, through the winding of relay 4X–L6, to (−). A stick circuit is completed through front contact 924 of relay 4X–L6.

In a similar manner, the function sequencer would subsequently step to a condition for interrogating the lane 5 sign aspect (see FIG. 4), and thereafter, upon completion of the control time as indicated by the release of relay CT, the stick circuit for relay FW including front contact 499 of relay CT is opened. Thus, relay FW is dropped away which causes the function sequence relays FS1–FS10 to be also dropped away in that function reset relay FR is picked up in the manner described above.

The location sequencer receives an advance pulse upon the pick up of relay FR through its front contact 542 included in the circuit described to cause relay LS7 to be picked up. According to the operation of sequence time relay ST, the function sequencer is operated similar to that described above where the function sequence relays FS1–FS10 are picked up in sequence. In the control time periods between sequence relay pick ups, the indication memory relays PN17, 3A–L7 and 4X–L7 would be picked up through easily traceable circuits if it is assumed that the signs for location NBL7 are in such display conditions that the corresponding application relays 7A1 and 7A8 are picked up, while relay 7A9 is dropped away at location NBL7 in zone 4.

For each of the remaining northbound locations NBL8–NBL13, a similar sequence of operation is effected as the location sequencer relays LS8–LS13 are sequentially picked up For each such location sequence relay, the function sequencer is stepped or advanced to cause relays FS1–FS10 to be picked up in sequence as limited by the pick up circuits for relay FW including back contacts of the location sequencing relays. With relay LS13P picked up, the pick-up circuit described above for relay LW is released which causes relay LW to be dropped away when its stick circuit including front contact 147 of control time relay CT is opened. Also, the functions waiting FW is dropped away. The reset circuits are thus initiated in that relays FR and LR are picked up concurrently, while the sequence circuits are dropped away in that relay NSC is picked up which further drops away the interrogate relays NT, NT1 and NT2 along with northbound indication call relay NDC.

During the interrogation cycle of operation, lamps located on the display panel DP (see FIG. 3) are energized by steady or flashing control energy through contacts of the control storage relays and the indication storage relays depending upon the correspondence in position of the two relays corresponding to the same aspect display sign at a particular field location. Steady energy is employed herein to indicate an in-correspondence condition, while flashing energy is employed herein to indicate an out-of-correspondence condition. Thus, the operator is apprised by distinctive lamp energization of the existing condition of each aspect display sign located at the respective field locations.

When power is turned on as indicated by the pick up of master power relay MPM (see FIG. 6A) as described above, steady (+) energy is supplied to certain of the lamps located on display panel DP for indication purposes. More particularly, this steady (+) energy is variable by the control knob 31 shown on the control panel CP of FIG. 2 so that the intensity of illumination for the lamps energized can be changed according to the surrounding illumination conditions. The control knob 31 may be employed to variably adjust the output from the secondary of a transformer (not shown) which output is applied to respective lamps on the display panel DP.

The flashing energy indicated as (+FL) energy (see FIGS. 6P, 6U, 6X, 6Z, 6CC and 6DD) is obtained when an out-of-correspondence condition is detected to cause the pick up of the out-of-correspondence relay OCR (see FIG. 6D). This condition occurs when the two relays for the same aspect display sign, i.e., the control storage relay for storing the last control signal transmitted and the indication storage relay for storing the last indication signal received, are not in similar positions. This condition may occur during a control cycle according to the description provided above, as well as by the failure of either the aspect display sign or the indication circuits corresponding thereto located at the control office.

It is described above how the lane sign 3XS for location NBL6 in zone 3 is energized when application relay 6A1 is picked up. During this control cycle of operation, the control storage relay L6–3A is supplied with negative (−) control energy to insure that it is dropped away. In addition, during the interrogation cycle of operation, the corresponding indication storage relay 3X–L6 is supplied with positive (+) energy to cause pick up of such relay. An energizing circuit is thus completed for lamp 3XE6 shown on display panel DP for lane 3 at northbound location NBL6 and diagrammatically shown in FIG. 6Y. Such circuit extends from steady (+) energy, through front contact 930 of relay 3X–L6, over wire 931, through back contact 932 of relay L6–3A, through the filaments of lamp 3XE6, to (−). Lamp 3XE6 thus remains energized with steady (+) energy until a succeeding control cycle or malfunction causes relay 3X–L6 to drop away.

It is also described above how the lane sign 3AS for lane 3 at location NBL6 in zone 3 is energized which occurs when the application relay 6A8 is picked up, thus causing sign 3XS for location NBL6 to be deenergized. During the control cycle of operation, control storage relay L6–3A (see FIG. 6W) is picked up. During the interrogation cycle of operation, with relay L6–3A picked up and before relay 3X–L6 is released, flashing (+FL) energy is supplied to lamp 3AE6 (see FIG. 6Y) through a circuit extending from (+FL), through front contact 935 of relay 3X–L6, over wire 936, through front contact 937 of relay L6–3A, through the filament of lamp 3AE6, to (−). Also, the energizing circuit for lamp 3XE6 is interrupted when relay L6–3A is picked up.

During the initial part of the indication cycle of operation before the location sequencer picks up relay LS6, relay 3X–L6 is stuck through the circuit including back contact 602 of relay LS6. When relay LS6 is picked up, however, the stick circuit for relay 3X–L6 is interrupted to cause the drop away thereof. The circuit for supplying flashing (+FL) energy to lamp 3AE6 is thus interrupted. As the cycle continues, relay 3A–L6 is picked up by a circuit easily traceable if sign 3AS at location NBL6 is correctly operated. Lamp 3AE6 is then supplied with steady (+) energy through front contact 939 of relay 3A–L6 and back contact 935 of relay 3X–L6.

Lamp 3AE6 is initially supplied with flashing (+FL) energy in that the indication signal from location NBL6 indicating that sign 3AS is energized has not yet been received. Until such indication signal is received, the positions of relays L6–3A and 3A–L6 are out-of-correspondence which causes positive (+) energy to be supplied to the out-of-correspondence bus OCB. More particularly, such circuit extends from (+), through back contact 941 of relay 3A–L6 (see FIG. 6CC), over wire 942, through front contact 943 of relay L6–3A, over wire 944, through front contact 945 of relay PNI6, to bus OCB. As long as positive (+) energy is supplied to bus OCB, the out-of-correspondence relay OCR (see FIG. 6D) is picked up. In response to the pick up of relay OCR, flashing relay FL is picked up as its pick-up circuit is completed through front contact 950 of relay OCR and back contact 951 of relay FLP. A capacitor 953 is charged through a resistor 954 by the described circuit. In response to the pick up of relay FL, repeater relay FLP is picked up through a pick-up circuit including front contact 956 of relay FL. A capacitor 957 is charged through resistor 958 by the pick-up circuit for relay FLP. (+) energy is supplied from (+), through front contact 960 of relay FL, through front contact 961 of relay FLP, to the included lamp circuits. The positive (+) energy becomes flashing (+FL) in that relays FL and FLP are intermittently dropped away and picked up as long as relay OCR remains picked up and as controlled by the discharge of respective capacitors 953 and 957.

For location NLB7, lamps 3AE7 and 4XE7 (see FIGS. 6Z and 6DD) are energized with steady (+) energy and flashing (+FL) energy in a sequence according to the operation of control storage relays L7–3A and L7–4A as well as indication storage relays 3A–L7 and 4X—L7. Relay OCR is picked up as bus OCB has positive (+) energy supplied thereto through one circuit including front contact 968 of relay PN17 (see FIGS. 6V, 6Z and 6DD). An audible alarm is sounded at the conclusion of the interrogation cycle of operation in that bell BL is energized through front contact 959 of relay OCR and front contacts 962 and 963 of relays NDC and SDC respectively to apprise the operator of the out-of-correspondence condition. Moreover, it is desirable to know that the aspect display signs at the various field locations are illuminated to display the function which was last called for. In this connection, it is possible that a sign may not be illuminated inasmuch as the filaments may burn out or some other condition occur which interrupts the circuit completed to the sign lamp filaments. When this occurs, the respective load relay, for example, load relay 6L8 for signs 3AS and 3XS for location NBL6 in zone 3, is dropped away. As will be recalled, the indication signal is returned through front contact 908 of relay 6L8. Thus, an out-of-correspondence condition will continue to result even though the interrogation cycle of operation is completed causing bell BL to sound.

*Miscellaneous control operations*

Inasmuch as it is desirable to know that all of the lamps included on the display panel DP are operative, a circuit is provided for testing each of the nonilluminated lamps by applying lamp test (+LT) control energy thereto. This operation is effected when an operator presses the lamp test button LP shown on control panel 6P. As diagrammatically illustrated in FIG. 6A, lamp test relay LTR has its pick up circuit completed through closed contact 964 of button LTB when actuated. Upon pick up of relay LTR, a lamp 965 is energized through front contact 966 of relay LTR to indicate that the lamp test operation is in effect. Also, lamp test (+LT) energy is supplied through front contact 966 of relay LTR to the indication circuits for display panel DP. For example, assuming relay L6–3A is picked up as described above, lamp test (+LT) energy is supplied to lamp 3XE6 through front contact 932 of relay L6–3A (see FIG. 6Y). According to the positions of other control storage and indication storage relays, the nonilluminated lamps are energized with lamp test (+LT) energy in order that the operative condition of all lamps employed on panel DR may be determined.

With reference to FIG. 6K, the stick energy (F+) for function memory relays is supplied through front contact 417 of relay ACP, while the stick energy (Z+) for zone memory relays is supplied through front contact 348 of relay ACP during a control cycle of operation. Such stick energy is further supplied respectively through back contact 423 and 443 of relay ACNM. The (F+) energy and (Z+) energy is removed upon the pick up of sequence complete relay SC while relay SS is dropped away. Should it be desired to maintain the storage of the zones and functions selected at the end of the control cycle, auto-cancel button ACN may be actuated to complete the pick up circuit for relay ACNM which extends from (+), through the closed contact of button ACN, through back contact 970 of relay ACP, through the winding of relay ACNM, to (−). A stick circuit therefor is then completed from (+), through front contact 971 of relay AC, through front contact 972 of relay ACNM, through the winding of relay ACNM, to (−). A lamp RE is illuminated red when its energizing circuit is completed through front contact 973 of relay ACNM to indicate to the operator that manual release of the zone and function information must be effected by respective control buttons ZCN and SCN in that the contacts 423 and 443 of relay ACNM are now closed as front contacts. To indicate that automatic release of zone and function information is in effect, a lamp YE is illuminated yellow by a circuit which is completed when the sequence complete relay SC is picked up which extends from (+), through front contact 975 of relay ACP, through back contact 976 of relay LSR, over wire 977, through back contact 978 of relay SS, over wire 979, through front contact 980 of relay SC, over wire 981, through closed contact 982 of button ACN, through the filament of lamp YE, to (−).

As shown in FIG. 6J, a timer 983 is effective to control its contact 984 for completing a pick-up circuit for time memory relay TM. The timer is conditioned through back contacts 985 of relay TM. Each time relay TM is picked up, the northbound indications call relay NDC is picked up by a circuit including front contact 986 of relay TM and back contact 987 of relay SDC, while relay SDC is picked up by a circuit including front contact 988 of relay TM and back contact 454 of relay SSC. The interrogation cycle of operation is then initiated automatically for both northbound and southbound traffic locations in that the pick up circuit for relay NT is completed through front contacts 460 and 461 of relays NDC and SDC respectively.

An operation counter 926 (see FIG. 6J) is pulsed through front contact 927 for each control cycle of operation and through front contact 928 of relay TM for each automatically timed interrogation cycle of operation. Counter 926 thus serves to record the number of operations of the system.

A manual interrogation cycle of operation may be initiated by actuating button NTB (see FIG. 6C) which completed the circuits for relays NDC and SDC through respective closed contacts 990 and 991 of button NTB. The interrogation cycle of operation is then initiated as relay NT is picked up for both northbound and southbound locations, but may be limited to only northbound zones or southbound zones by additionally designating the respective zone button NZ or SZ.

During a control cycle of operation, it may be desirable to return the system to an at-rest condition after once designating certain function and zone buttons while further designating the activate button ACB. This may be accomplished by simultaneously actuating buttons ACB and NTB. When such buttons ACB and NTB are simultaneously actuated, a pick-up circuit for clear out relay CO (see FIG. 6F) is completed through closed contact 993 of button ACB and closed contact 994 of button NTB. A capacitor 995 normally charged through a resistor 996 and back contact 997 of relay CO is employed to control the release of relay CO. Upon pick up of relay CO, a pick-up circuit is completed for relays FR, LR and SSC through front contact 998 of relay CO.

Clear out relay CO may be picked up by either of two additional circuits each of which may be completed when a malfunction of the system occurs. One such circuit is completed when relays EFS and FS11 of the function sequencer circuits are simultaneously energized which causes positive (+) energy to be supplied to wire 999 through front contact 520 of relay EFS and front contact 523 of relay FS11 which picks up relay CO to cause the reset relays FR and LR as well as relay SSC to be all picked up. The other circuit which may be completed due to a malfunction supplies a positive (+) energy to wire 999 over wire 197, through front contact 198 of relay LS13P and through back contact 256 of relay LS13. Relay CO is thus picked up to cause the reset circuits to become effective to return the system to an at-rest condition.

Having described a supervisory traffic control system, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

In a supervisory traffic control system for selectively controlling a plurality of highway traffic directing display signs in sequence remotely from a control office, one or more of said signs being positioned at each of a plurality of spaced locations along the highway and each display condition of said signs representing a distinct function to be remotely controlled relating to the directing of traffic along said highway, the combination of, manually actuated means at the control office for selectively designating particular functions and locations to be remotely controlled from said control office during a predetermined control cycle, a first plurality of sequencing relays including at least one relay associated with each location along said highway, a second plurality of sequencing relays including at least one relay associated with each function to be controlled, a communication facility interconnecting said control office with each of said traffic directing display signs and including transmitting means at said control office when rendered effective for transmitting a distinctive sign controlling signal over said communication facility to control a designated location and function, first energizing circuitry operably connecting said first and second plurality of sequencing relays to said manually actuated means for energizing the relays of each of said first and second plurality of relays one after another in sequence towards a first condition corresponding to a designated function and location to be controlled, a location sequencer ready relay having front and back contacts and an energizing circuit completed whenever a relay associated with a location designated to be controlled by said manually actuated means becomes energized, a function sequencer ready relay having front and back contacts and an energizing circuit completed whenever a relay associated with a function designated to be controlled by said manually actuated means becomes energized, a slow dropaway control relay having front and back contacts and an energizing circuit including a back contact of each of said location sequencer ready relay and said function sequencer ready relay connected in multiple whereby said energizing circuit for said control relay is interrupted when said location sequencer ready relay and said function sequencer ready relay are concurrently energized, said slow dropaway control relay requiring a predetermined dropaway time interval after being deenergized before it opens its front contact and closes its back contact, transmission control circuit means responsive to said location sequencer ready relay, said function sequencer ready relay and said slow dropaway control relay for rendering said transmitting means effective to transmit a distinct sign controlling signal over said communication facility to control said designated function and location during the predetermined interval wherein said function sequencer ready relay and said location sequencer ready relay are concurrently energized, but said control relay has not as yet opened its front contact, and sequencer advancing circuit means responsive to said slow dropaway control relay for causing said first and second plurality of sequencing relays to advance from said first condition to the next subsequent condition corresponding to a designated function and location to be controlled when said slow dropaway control relay closes its back contact.

References Cited by the Examiner

UNITED STATES PATENTS

| | | | |
|---|---|---|---|
| 2,535,954 | 12/1950 | Preston et al. | 340—23 |
| 2,588,930 | 3/1952 | Kendall et al. | |
| 2,677,119 | 4/1954 | Luck | 340—23 |
| 2,849,701 | 8/1958 | Clark | 340—22 |
| 2,999,999 | 9/1961 | Bartelink | 340—31 |
| 3,078,442 | 2/1963 | Jeffers | 340—40 |
| 3,107,340 | 10/1963 | Silliman et al. | |
| 3,112,908 | 12/1963 | Hailes | 340—23 X |

NEIL C. READ, *Primary Examiner.*

ROBERT M. ANGUS, *Assistant Examiner.*